(12) United States Patent
Sheng et al.

(10) Patent No.: US 12,465,601 B2
(45) Date of Patent: Nov. 11, 2025

(54) USES OF PHOSPHODIESTERASE INHIBITORS

(71) Applicant: TRANSTHERA SCIENCES (NANJING), INC., Jiangsu (CN)

(72) Inventors: Zejuan Sheng, Jiangsu (CN); Frank Wu, Jiangsu (CN)

(73) Assignee: TRANSTHERA SCIENCES (NANJING), INC., Jiangsu (CN)

( * ) Notice: Subject to any disclaimer, the term of this patent is extended or adjusted under 35 U.S.C. 154(b) by 1009 days.

(21) Appl. No.: 17/436,879

(22) PCT Filed: Mar. 6, 2020

(86) PCT No.: PCT/CN2020/078215
§ 371 (c)(1),
(2) Date: Sep. 7, 2021

(87) PCT Pub. No.: WO2020/182076
PCT Pub. Date: Sep. 17, 2020

(65) Prior Publication Data
US 2022/0160696 A1    May 26, 2022

(30) Foreign Application Priority Data

Mar. 8, 2019  (CN) .......................... 201910174522.6
Mar. 27, 2019  (CN) .......................... 201910235722.8

(51) Int. Cl.
A61K 31/4545    (2006.01)
A61P 9/04    (2006.01)

(52) U.S. Cl.
CPC ............ *A61K 31/4545* (2013.01); *A61P 9/04* (2018.01)

(58) Field of Classification Search
CPC ................ A61K 31/4545; A61K 45/06; A61K 31/4375; A61K 31/55; A61K 31/438; A61K 31/496; A61K 31/5377; A61P 9/04; C07D 471/04
See application file for complete search history.

(56) References Cited

U.S. PATENT DOCUMENTS

| | | | |
|---|---|---|---|
| 6,740,662 | B1 | 5/2004 | Iwata et al. |
| 10,376,504 | B2 * | 8/2019 | Converso ................. A61P 25/14 |
| 12,234,233 | B2 * | 2/2025 | Wan ....................... C07D 471/04 |
| 2004/0266736 | A1 | 12/2004 | Wunder et al. |
| 2007/0203236 | A1 | 8/2007 | Smith et al. |
| 2018/0354955 | A1 | 12/2018 | Arasappan et al. |
| 2021/0130366 | A1 | 5/2021 | Wu et al. |

FOREIGN PATENT DOCUMENTS

| | | | | |
|---|---|---|---|---|
| CA | 3064938 | A1 * | 12/2018 | ........... A61K 31/519 |
| CN | 1382141 | A | 11/2002 | |
| CN | 1839133 | A | 9/2006 | |
| CN | 1856470 | A * | 11/2006 | ............. A61P 43/00 |
| CN | 101382141 | A | 3/2009 | |
| CN | 101839133 | A | 9/2010 | |
| CN | 101856470 | A | 10/2010 | |
| CN | 109575016 | A | 4/2019 | |
| EP | 1225173 | A1 | 7/2002 | |
| EP | 3689876 | A1 | 5/2020 | |
| EP | 3939978 | A1 | 1/2022 | |
| JP | 2001-192385 | A2 | 7/2001 | |
| JP | 2005-511575 | A | 4/2005 | |
| JP | 2005-511619 | A | 4/2005 | |
| JP | 2007-506739 | A | 3/2007 | |
| RU | 2383539 | C2 | 3/2010 | |
| RU | 2448087 | C2 | 4/2012 | |
| WO | 03/037899 | A1 | 5/2003 | |
| WO | 03/041725 | A2 | 5/2003 | |
| WO | 2005021546 | A1 | 3/2005 | |
| WO | 2005030792 | A2 | 4/2005 | |

(Continued)

OTHER PUBLICATIONS

International Search Report mailed May 27, 2020, in International Application No. PCT/CN2020/078215.
Wu, Yue et al., "Advances in Heart Failure using Phosphodiesterase 9"; Journal of Southeast University (Medical Science Edition), vol. 35, No. 1, Feb. 29, 2016 (with English Language Abstract).
Extended European Search Report dated Dec. 14, 2022, directed to EP Application No. 20768911.8; 11 pages.
Sumita et al., (Nov. 6, 2018). "Phosphodiesterase Inhibition Improves Cardiometabolic Profile in Female Mice Independent of Estrogen Status," Biosciences Information Service, abstract only.

(Continued)

*Primary Examiner* — Joseph K Mckane
*Assistant Examiner* — Meghan C Heasley
(74) *Attorney, Agent, or Firm* — Michele V. Frank; Venable LLP

(57) ABSTRACT

Disclosed are uses of a compound represented by general formula (I) and pharmaceutically acceptable salts, isomers and deuterated compounds thereof in the preparation of a medicine for treating heart failure diseases. Experiments prove that the compound can improve the heart function of rats with heart failure, reverse myocardial remodeling caused by heart failure, and reduce fibrosis in the marginal zone of infarction.

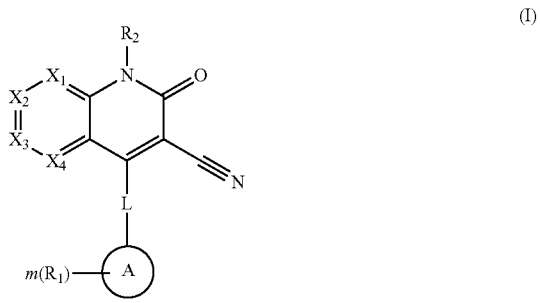

10 Claims, 4 Drawing Sheets

(56) References Cited

FOREIGN PATENT DOCUMENTS

| WO | 2017/019723 A1 | 2/2017 |
| WO | 2017/019724 A1 | 2/2017 |
| WO | 2018/009899 A1 | 1/2018 |
| WO | 2019/062733 A1 | 4/2019 |
| WO | 2020/187165 A1 | 9/2020 |

OTHER PUBLICATIONS

First Written Opinion dated Nov. 7, 2022, directed to SG Application No. 11202109781Q; 9 pages.
Notice of Reasons for Refusal dated Dec. 28, 2022, directed to JP Application No. 2021-553378; 28 pages.
Kim et al., (2017) "Cardiac Phosphodiesterases and their Modulation for Treating Heart Disease," Handb Exp Pharmacol: 243: 249-269 (doi:10.1007/164_2016_82.).
Lee et al., (Mar. 2015) "Phosphodiesterase 9A controls nitric oxide-independent cGMP and hypertrophic disease," Nature, vol. 519; 17 pages.
Notice of Allowance directed to Korean Patent Application No. 10-2021-7032529 dated Jul. 4, 2025.

\* cited by examiner

***P<0.001 vs sham group , ###P<0.001 vs model group, t-test

***P<0.001 vs sham group , ###P<0.001 vs model group, t-test

***P<0.001 vs sham group, ##P<0.01 vs model group, t-test

***P<0.001 vs sham group, #P<0.05 vs model group, t-test

Sham group    Model group    Compound 102
                             30mpk

USES OF PHOSPHODIESTERASE INHIBITORS

This application is a National Stage Application under 35 U.S.C. § 371 PCT/CN2020/078215, filed Mar. 6, 2020, which claims priority benefit from Chinese Patent Application No. 201910235722.8, filed on Mar. 27, 2019 and Chinese Patent Application No. 201910174522.6, filed Mar. 8, 2019, the entire content of which is incorporated herein by reference. All references cited anywhere in this specification, including the Background and Detailed Description sections, are incorporated by reference as if each had been individually incorporated.

TECHNICAL FIELD

The present invention belongs to the technical field of medicine, and specifically relates to uses of a phosphodiesterase 9 (PDE9) inhibitor compound represented by general formula (I) and pharmaceutically acceptable salts, isomers, and deuterated compounds thereof in the manufacture of a medicament for treating heart failure diseases in mammals.

BACKGROUND ART

Heart failure is a clinical syndrome, which is characterized by dyspnea, ankle edema, fatigue, and other pathological and physiological conditions that can also be accompanied by signs, such as increased jugular venous pressure, pulmonary rales, and peripheral edema, which are caused by a decrease in cardiac output and/or an increase in intracardiac pressure at rest or under stress due to abnormal heart structure and/or function. According to indicators such as the measurement of left ventricular ejection fraction (LVEF), the level of a natriuretic peptide, and abnormal heart function, heart failure is divided into heart failure with preserved ejection fraction (HFpEF, LVEF >50%), heart failure with median ejection fraction (HFmrEF, LVEF of 40%-49%) and heart failure with reduced ejection fraction (HFrEF, LVEF <40%). According to the time course or severity of heart failure, heart failure is further divided into acute heart failure, chronic heart failure, decompensated heart failure, pre-heart failure, pre-clinical heart failure, clinical heart failure and refractory end-stage heart failure; and according to heart function, it is classified into grade I, grade II, grade III, and grade IV heart failure by the New York Heart Association (NYHA). The onset of heart failure is related to abnormal load (hypertension, defects in valve and myocardial structure, pericardial and endocardial cardiomyopathy, high output state, volume overload, pulmonary disease), cardiomyopathy (ischemic heart disease, toxicity damage, immune mediation and inflammatory damage, myocardial infiltrative lesion, endocrine and metabolic disease, genetic or stress-induced cardiomyopathy, etc.), and arrhythmia (tachycardia, bradycardia), and infection, anemia, pregnancy, childbirth, arrhythmia, pulmonary embolism, diabetes, and taking drugs that inhibit the heart function can aggravate heart failure. In developed countries, the incidence of heart failure is about 1%-2% of the adult population, and rises to over 10% in people older than 70 years of age. The lifetime risk of heart failure at the age of 55 is 33% for men and 28% for women.

According to researches, the myocardial remodeling (such as myocardial hypertrophy, heart enlargement, thinning of the heart wall, etc.) caused by the activation of the neuroendocrine system is a key factor that causes the occurrence and development of heart failure. Initially, myocardial remodeling can partially compensate for heart function, but with the increasing myocardial remodeling, heart function gradually changes from compensation to decompensation, leading to more obvious symptoms and signs. Therefore, how to prevent or reverse cardiac remodeling has become one of the main treatment goals of chronic heart failure. (Heart Failure Group of Chinese Society of Cardiology, Editorial Board of Chinese Journal of Cardiology, Heart Failure Professional Committee of Chinese Medical Doctor Association. Chinese Heart Failure Diagnosis and Treatment Guidelines 2018 P T Chinese Journal of Cardiology, 2018, 46 (10): 760-789. DOI: 10.3760/cma-.j.issn.0253-3758.2018.10.004)

At present, medicaments are used in most of the treatments for heart failure to alleviate disease symptoms, but cannot significantly improve heart function. At the same time, most of the existing treatment medicaments have certain side effects. Meanwhile, many existing treatments failed to improve the prognosis of patients with HFpEF, nor did they reduce the mortality rate. The HFpEF type heart failure accounts for about 50% of the total heart failure.

Phosphodiesterases (PDEs) is a type of protease that can selectively degrade the important second messengers cGMP (cyclic guanosine monophosphate) and cAMP (cyclic adenosine monophosphate) in the body, thereby participating in physiological processes such as metabolism, neurotransmission, cell growth and differentiation. According to the sequence homology of genes and the selectivity to cGMP or cAMP, PDEs can be divided into 11 members (PDE1 to PDE11). PDE9 is an important member of a PDE family, and is widely expressed in the testis, brain, small intestine, skeletal muscle, heart, lung, thymus and pancreas. With progress in research work in recent years, many literature reports and clinical data have proved that PDE9 inhibitors can be used to treat diseases with respect to cognitive impairment caused by central nervous system disorders, such as Alzheimer's disease and schizophrenia, and neurodegenerative disease of brain.

According to literature research, in myocardial cells, the increase of cGMP can activate protein kinase G (PKG), and this protein can play a role in myocardial protection. Therefore, this pathway is an important signaling pathway when treating heart failure. PDE9 can selectively hydrolyze cGMP, thereby reducing the cardioprotective effects of PKG. At the same time, the expression of PDE9 is significantly increased during heart failure, in particular in HFpEF, so the cardioprotective capability is greatly weakened. Therefore, inhibiting PDE9 in patients with heart failure can protect the heart. The inventors have had a further study on biological functions of PDE9, aiming to explore uses thereof in treating heart failure.

SUMMARY OF THE INVENTION

The present invention studies the use of a PDE9 inhibitor in the field of heart failure, and it is found in the study that the PDE9 inhibitor compounds of the present invention and pharmaceutically acceptable salts, isomers and deuterated compounds thereof have significant effects on the treatment of heart failure. Therefore, the objective of the present invention is to provide the new use of the PDE9 inhibitor in the treatment of heart failure.

The technical solutions used in the present invention are as follows:

Use of a phosphodiesterase 9 (PDE9) inhibitor compound represented by general formula (I) and pharmaceutically acceptable salts, isomers, and deuterated compounds thereof in the manufacture of a medicament for treating heart failure diseases in mammals,

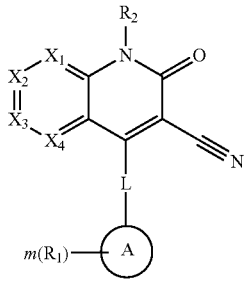

wherein $X_1$, $X_2$, $X_3$ and $X_4$ are each independently selected from $CR_3$ or N, and N heteroatom may be optionally oxidized to

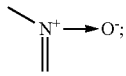

$R_3$ at each occurrence is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy are not substituted or optionally substituted with one or more groups independently selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino, $C_{1-6}$ alkylsulfonylamino, $C_{1-6}$ alkylcarbonyloxy, $C_{3-6}$ cycloalkyl, $C_{2-8}$ alkynyl, halo $C_{1-6}$ alkyl, $C_{2-8}$ alkenyl, halo $C_{1-6}$ alkoxy, 4-6 membered heterocyclyl unsubstituted or optionally substituted with a substituent and heteroaryl unsubstituted or optionally substituted with a substituent;

the substituents of the above-mentioned 4-6 membered heterocyclyl optionally substituted with a substituent and heteroaryl optionally substituted with a substituent are selected from hydroxyl, amino, carboxyl, cyano, nitro, halogen, $C_{1-6}$ alkyl and $C_{1-6}$ alkoxy;

L is a bond and —NH—$(CH_2)$t-, and t is 0, 1, 2 or 3;

ring A is 3-12 membered heterocyclyl, aryl, 5-10 membered heteroaryl, 3-12 membered cycloalkyl, and 3-12 membered cycloalkenyl, wherein the heteroatom of the 3-12 membered heterocyclyl is selected from one of O, S, and N or any combination thereof, the S atom may be optionally oxidized to S(O) or S(O)$_2$, the C atom may be optionally oxidized to C(O), the N heteroatom may be optionally oxidized to

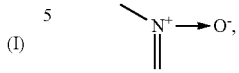

and the heteroatom of the 5-10 membered heteroaryl is selected from one of O, S and N or any combination thereof;

each $R_1$ is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl are not substituted or optionally substituted with groups selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino and $C_{1-6}$ alkylsulfonylamino;

m is 0, 1, 2 or 3;

and $R_2$ is selected from hydrogen, $C_{1-6}$ alkyl, $C_{2-8}$ alkenyl, $C_{2-8}$ alkynyl, and halo $C_{1-6}$ alkyl.

In one embodiment, $X_1$, $X_2$ and $X_4$ are each independently CH, and $X_3$ is $CR_3$.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In one embodiment, $X_1$, $X_2$, $X_3$ and $X_4$ are not $CR_3$ at the same time.

In another embodiment, provided is the use of a phosphodiesterase 9 (PDE9) inhibitor compound represented by general formula (I) and pharmaceutically acceptable salts, isomers, and deuterated compounds thereof in the manufacture of a medicament for treating heart failure diseases in mammals, wherein, $X_1$, $X_2$, $X_3$, and $X_4$ are each independently selected from $CR_3$ or N, and $X_1$, $X_2$, $X_3$, and $X_4$ are not $CR_3$ at the same time;

wherein $R_3$ at each occurrence is independently selected from hydrogen, deuterium, amino, cyano, halogen, carboxyl, $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl, wherein the $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl are not substituted or optionally substituted with one or more groups independently selected from hydroxyl, amino, cyano, halogen, $C_{1-4}$ alkyl, $C_{1-4}$ alkoxy, $C_{1-4}$ alkylamino, $(C_{1-4}$ alkyl$)_2$ amino, cyclopropyl, $C_{1-4}$ alkylcarbonyloxy, and 4-6 membered heterocyclyl unsubstituted or substituted with $C_{1-4}$ alkyl;

ring A is 3-12 membered heterocyclyl, and the heteroatom of the 3-12 membered heterocyclyl is selected from one of O, S and N or any combination thereof, and the S atom may be optionally oxidized to S(O) or $S(O)_2$;

each $R_1$ is independently selected from hydrogen, deuterium, hydroxyl, cyano, halogen, $C_{1-4}$ alkyl, $C_{1-4}$ alkoxy and 5-6 membered heteroaryl, wherein the $C_{1-4}$ alkyl, $C_{1-4}$ alkoxy and 5-6 membered heteroaryl are not substituted or substituted with hydroxyl;

m is 0, 1 or 2;

$R_2$ is selected from hydrogen or $C_{1-6}$ alkyl.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In one embodiment, A is 3-12 membered heterocyclyl, preferably 4-7 membered heterocyclyl.

In one embodiment, A is 3-12 membered heterocyclyl, preferably 7-12 membered spiroheterocyclyl.

In another embodiment, provided is the use of a phosphodiesterase 9 (PDE9) inhibitor compound represented by general formula (I) and pharmaceutically acceptable salts, isomers, and deuterated compounds thereof in the manufacture of a medicament for treating heart failure diseases in mammals, wherein, $X_1$, $X_2$, $X_3$, and $X_4$ are each independently selected from $CR_3$ or N, and $X_1$, $X_2$, $X_3$, and $X_4$ are not $CR_3$ at the same time;

$R_3$ at each occurrence is independently selected from hydrogen, deuterium, halogen, $C_{1-4}$ alkyl, $C_{1-4}$ alkoxy, $C_{2-6}$ alkenyl, $C_{1-4}$ alkylcarbonyl, cyclopropyl, $C_{1-4}$ alkylaminocarbonyl and aminocarbonyl, wherein the $C_{1-4}$ alkyl, $C_{1-4}$ alkoxy, $C_{2-6}$ alkenyl, $C_{1-4}$ alkylcarbonyl, $C_{1-4}$ alkylaminocarbonyl and aminocarbonyl are not substituted or optionally substituted with one or more groups independently selected from hydroxyl, amino, $C_{1-4}$ alkyl, $C_{1-4}$ alkoxy, cyclopropyl, $C_{1-4}$ alkylamino, $(C_{1-4}$ alkyl$)_2$ amino and 4-6 membered heterocyclyl unsubstituted or substituted with $C_{1-4}$ alkyl;

L is a bond;

ring A is

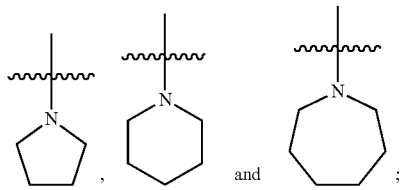

each $R_1$ is independently selected from hydrogen, deuterium, $C_{1-4}$ alkyl and $C_{1-4}$ alkoxy;

and m is 0, 1 or 2.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In another embodiment, provided is the use of a phosphodiesterase 9 (PDE9) inhibitor compound represented by general formula (I) and pharmaceutically acceptable salts, isomers and deuterated compounds thereof in the manufacture of a medicament for treating heart failure diseases in mammals wherein, $X_1$, $X_2$, $X_3$, and $X_4$ are each independently selected from $CR_3$ or N, and $X_1$, $X_2$, $X_3$, and $X_4$ are not $CR_3$ at the same time;

$R_3$ at each occurrence is independently selected from hydrogen, deuterium, cyano, amino, halogen, carboxyl, $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, and piperazinyl, wherein the $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, piperazinyl are not substituted or optionally substituted with one or more groups independently selected from hydroxyl, amino, halogen, $C_{1-4}$ alkyl, $C_{1-4}$ alkylamino, $(C_{1-4}$ alkyl$)_2$ amino, cyclopropyl, and $C_{1-4}$ alkylcarbonyloxy;

L is a bond;

ring A is selected from

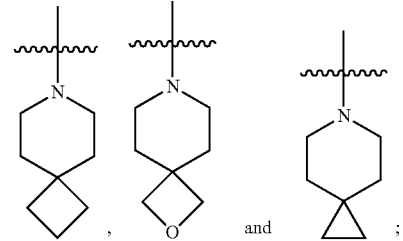

and m is 0.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

A phosphodiesterase 9 (PDE9) inhibitor compound represented by general formula (I) and pharmaceutically acceptable salts, isomers, and deuterated compounds thereof, for use in treating heart failure diseases in mammals, wherein $X_1$, $X_2$, $X_3$ and $X_4$ are each independently selected from $CR_3$ or N, and N heteroatom may be optionally oxidized to

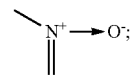

$R_3$ at each occurrence is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy are not substituted or optionally substituted with one or more groups independently selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino, $C_{1-6}$ alkylsulfonylamino, $C_{1-6}$ alkylcarbonyloxy, $C_{3-6}$ cycloalkyl, $C_{2-8}$ alkynyl, halo $C_{1-6}$ alkyl, $C_{2-8}$ alkenyl, halo $C_{1-6}$ alkoxy, 4-6 membered heterocyclyl unsubstituted or optionally substituted with a substituent and heteroaryl unsubstituted or optionally substituted with a substituent;

the substituents of the above-mentioned 4-6 membered heterocyclyl optionally substituted with a substituent and heteroaryl optionally substituted with a substituent are selected from hydroxyl, amino, carboxyl, cyano, nitro, halogen, $C_{1-6}$ alkyl and $C_{1-6}$ alkoxy;

L is a bond and —NH—(CH$_2$)t-, and t is 0, 1, 2 or 3;

ring A is 3-12 membered heterocyclyl, aryl, 5-10 membered heteroaryl, 3-12 membered cycloalkyl, and 3-12 membered cycloalkenyl, wherein the heteroatom of the 3-12 membered heterocyclyl is selected from one of O, S, and N or any combination thereof, the S atom may be optionally oxidized to S(O) or S(O)$_2$, the C atom may be optionally oxidized to C(O), the N heteroatom may be optionally oxidized to

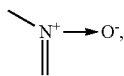

and the heteroatom of the 5-10 membered heteroaryl is selected from one of O, S and N or any combination thereof;

each $R_1$ is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl are not substituted or optionally substituted with groups selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino and $C_{1-6}$ alkylsulfonylamino;

m is 0, 1, 2 or 3;

and $R_2$ is selected from hydrogen, $C_{1-6}$ alkyl, $C_{2-8}$ alkenyl, $C_{2-8}$ alkynyl, and halo $C_{1-6}$ alkyl.

In one embodiment, $X_1$, $X_2$ and $X_4$ are each independently CH, and $X_3$ is CR$_3$.

In one embodiment, $X_1$ and $X_4$ are each independently CH, $X_2$ is N, and $X_3$ is CR$_3$.

In one embodiment, $X_1$ and $X_2$ are each independently CH, $X_3$ is CR$_3$, and $X_4$ is N.

In one embodiment, $X_1$, $X_2$, $X_3$ and $X_4$ are not CR$_3$ at the same time.

In another embodiment, provided is a phosphodiesterase 9 (PDE9) inhibitor compound represented by general formula (I) and pharmaceutically acceptable salts, isomers, and deuterated compounds thereof, for use in treating heart failure diseases in mammals, wherein, $X_1$, $X_2$, $X_3$, and $X_4$ are each independently selected from CR$_3$ or N, and $X_1$, $X_2$, $X_3$, and $X_4$ are not CR$_3$ at the same time;

wherein $R_3$ at each occurrence is independently selected from hydrogen, deuterium, amino, cyano, halogen, carboxyl, $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl, wherein the $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl are not substituted or optionally substituted with one or more groups independently selected from hydroxyl, amino, cyano, halogen, $C_{1-4}$ alkyl, $C_{1-4}$ alkoxy, $C_{1-4}$ alkylamino, $(C_{1-4}$ alkyl$)_2$ amino, cyclopropyl, $C_{1-4}$ alkylcarbonyloxy, and 4-6 membered heterocyclyl unsubstituted or substituted with $C_{1-4}$ alkyl;

ring A is 3-12 membered heterocyclyl, and the heteroatom of the 3-12 membered heterocyclyl is selected from one of O, S and N or any combination thereof, and the S atom may be optionally oxidized to S(O) or S(O)$_2$;

each $R_1$ is independently selected from hydrogen, deuterium, hydroxyl, cyano, halogen, $C_{1-4}$ alkyl, $C_{1-4}$ alkoxy and 5-6 membered heteroaryl, wherein the $C_{1-4}$ alkyl, $C_{1-4}$ alkoxy and 5-6 membered heteroaryl are not substituted or substituted with hydroxyl;

m is 0, 1 or 2;

$R_2$ is selected from hydrogen or $C_{1-6}$ alkyl.

In one embodiment, $X_1$ and $X_4$ are each independently CH, $X_2$ is N, and $X_3$ is CR$_3$.

In one embodiment, $X_1$ and $X_2$ are each independently CH, $X_3$ is CR$_3$, and $X_4$ is N.

In one embodiment, A is 3-12 membered heterocyclyl, preferably 4-7 membered heterocyclyl.

In one embodiment, A is 3-12 membered heterocyclyl, preferably 7-12 membered spiroheterocyclyl.

In another embodiment, provided is a phosphodiesterase 9 (PDE9) inhibitor compound represented by general formula (I) and pharmaceutically acceptable salts, isomers, and deuterated compounds thereof, for use in treating heart failure diseases in mammals, wherein, $X_1$, $X_2$, $X_3$, and $X_4$ are each independently selected from CR$_3$ or N, and $X_1$, $X_2$, $X_3$, and $X_4$ are not CR$_3$ at the same time;

$R_3$ at each occurrence is independently selected from hydrogen, deuterium, halogen, $C_{1-4}$ alkyl, $C_{1-4}$ alkoxy, $C_{2-6}$ alkenyl, alkylcarbonyl, cyclopropyl, $C_{1-4}$ alkylaminocarbonyl and aminocarbonyl, wherein the $C_{1-4}$ alkyl, $C_{1-4}$ alkoxy, $C_{2-6}$ alkenyl, alkylcarbonyl, $C_{1-4}$ alkylaminocarbonyl and aminocarbonyl are not substituted or optionally substituted with one or more groups independently selected from hydroxyl, amino, $C_{1-4}$ alkyl, $C_{1-4}$ alkoxy, cyclopropyl, $C_{1-4}$ alkylamino, $(C_{1-4}$ alkyl$)_2$ amino and 4-6 membered heterocyclyl unsubstituted or substituted with $C_{1-4}$ alkyl;

L is a bond;
ring A is

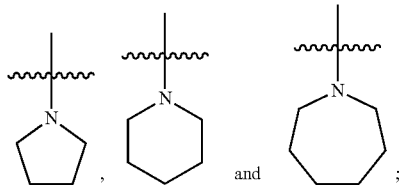

each $R_1$ is independently selected from hydrogen, deuterium, $C_{1-4}$ alkyl and $C_{1-4}$ alkoxy;
and m is 0, 1 or 2.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In another embodiment, provided is a phosphodiesterase 9 (PDE9) inhibitor compound represented by general formula (I) and pharmaceutically acceptable salts, isomers, and deuterated compounds thereof, for use in treating heart failure diseases in mammals, wherein, $X_1$, $X_2$, $X_3$, and $X_4$ are each independently selected from $CR_3$ or N, and $X_1$, $X_2$, $X_3$, and $X_4$ are not $CR_3$ at the same time;

$R_3$ at each occurrence is independently selected from hydrogen, deuterium, cyano, amino, halogen, carboxyl, $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, and piperazinyl, wherein the $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, piperazinyl are not substituted or optionally substituted with one or more groups independently selected from hydroxyl, amino, halogen, $C_{1-4}$ alkyl, $C_{1-4}$ alkylamino, $(C_{1-4}$ alkyl$)_2$ amino, cyclopropyl, and $C_{1-4}$ alkylcarbonyloxy;

L is a bond;
ring A is selected from

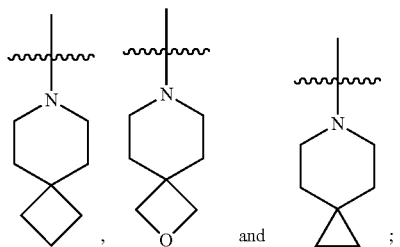

and m is 0.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

A method for treating heart failure diseases in mammals, comprising administering a phosphodiesterase 9 (PDE9) inhibitor compound represented by general formula (I) and pharmaceutically acceptable salts, isomers, and deuterated compounds thereof to patients or subjects, wherein $X_1$, $X_2$, $X_3$ and $X_4$ are each independently selected from $CR_3$ or N, and N heteroatom may be optionally oxidized to

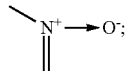

$R_3$ at each occurrence is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy are not substituted or optionally substituted with one or more groups independently selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino, $C_{1-6}$ alkylsulfonylamino, $C_{1-6}$ alkylcarbonyloxy, $C_{3-6}$ cycloalkyl, $C_{2-8}$ alkynyl, halo $C_{1-6}$ alkyl, $C_{2-8}$ alkenyl, halo $C_{1-6}$ alkoxy, 4-6 membered heterocyclyl unsubstituted or optionally substituted with a substituent and heteroaryl unsubstituted or optionally substituted with a substituent;

the substituents of the above-mentioned 4-6 membered heterocyclyl optionally substituted with a substituent and heteroaryl optionally substituted with a substituent are selected from hydroxyl, amino, carboxyl, cyano, nitro, halogen, $C_{1-6}$ alkyl and $C_{1-6}$ alkoxy;

L is a bond and —NH—(CH$_2$)t-, and t is 0, 1, 2 or 3;
ring A is 3-12 membered heterocyclyl, aryl, 5-10 membered heteroaryl, 3-12 membered cycloalkyl, and 3-12 membered cycloalkenyl, wherein the heteroatom of the 3-12 membered heterocyclyl is selected from one of O, S, and N or any combination thereof, the S atom may be optionally oxidized to S(O) or S(O)$_2$, the C atom may be optionally oxidized to C(O), the N heteroatom may be optionally oxidized to

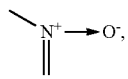

and the heteroatom of the 5-10 membered heteroaryl is selected from one of O, S and N or any combination thereof;
each $R_1$ is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl are not substituted or optionally substituted with groups selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino and $C_{1-6}$ alkylsulfonylamino;

m is 0, 1, 2 or 3;

and $R_2$ is selected from hydrogen, $C_{1-6}$ alkyl, $C_{2-8}$ alkenyl, $C_{2-8}$ alkynyl, and halo $C_{1-6}$ alkyl.

In one embodiment, $X_1$, $X_2$ and $X_4$ are each independently CH, and $X_3$ is $CR_3$.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In one embodiment, $X_1$, $X_2$, $X_3$ and $X_4$ are not $CR_3$ at the same time.

In another embodiment, provided is a method for treating heart failure diseases in mammals, comprising administering a phosphodiesterase 9 (PDE9) inhibitor compound represented by general formula (I) and pharmaceutically acceptable salts, isomers, and deuterated compounds thereof to patients or subjects, wherein, $X_1$, $X_2$, $X_3$, and $X_4$ are each independently selected from $CR_3$ or N, and $X_1$, $X_2$, $X_3$, and $X_4$ are not $CR_3$ at the same time;

wherein $R_3$ at each occurrence is independently selected from hydrogen, deuterium, amino, cyano, halogen, carboxyl, $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl, wherein the $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl are not substituted or optionally substituted with one or more groups independently selected from hydroxyl, amino, cyano, halogen, $C_{1-4}$ alkyl, $C_{1-4}$ alkoxy, $C_{1-4}$ alkylamino, $(C_{1-4}$ alkyl$)_2$ amino, cyclopropyl, $C_{1-4}$ alkylcarbonyloxy, and 4-6 membered heterocyclyl unsubstituted or substituted with $C_{1-4}$ alkyl;

ring A is 3-12 membered heterocyclyl, and the heteroatom of the 3-12 membered heterocyclyl is selected from one of O, S and N or any combination thereof, and the S atom may be optionally oxidized to $S(O)$ or $S(O)_2$;

each $R_1$ is independently selected from hydrogen, deuterium, hydroxyl, cyano, halogen, $C_{1-4}$ alkyl, $C_{1-4}$ alkoxy and 5-6 membered heteroaryl, wherein the $C_{1-4}$ alkyl, $C_{1-4}$ alkoxy and 5-6 membered heteroaryl are not substituted or substituted with hydroxyl;

m is 0, 1 or 2;

$R_2$ is selected from hydrogen or $C_{1-6}$ alkyl.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In one embodiment, A is 3-12 membered heterocyclyl, preferably 4-7 membered heterocyclyl.

In one embodiment, A is 3-12 membered heterocyclyl, preferably 7-12 membered spiroheterocyclyl.

In another embodiment, provided is a method for treating heart failure diseases in mammals, comprising administering a phosphodiesterase 9 (PDE9) inhibitor compound represented by general formula (I) and pharmaceutically acceptable salts, isomers, and deuterated compounds thereof to patients or subjects, wherein, $X_1$, $X_2$, $X_3$, and $X_4$ are each independently selected from $CR_3$ or N, and $X_1$, $X_2$, $X_3$, and $X_4$ are not $CR_3$ at the same time;

$R_3$ at each occurrence is independently selected from hydrogen, deuterium, halogen, $C_{1-4}$ alkyl, $C_{1-4}$ alkoxy, $C_{2-6}$ alkenyl, $C_{1-4}$ alkylcarbonyl, cyclopropyl, $C_{1-4}$ alkylaminocarbonyl and aminocarbonyl, wherein the $C_{1-4}$ alkyl, $C_{1-4}$ alkoxy, $C_{2-6}$ alkenyl, $C_{1-4}$ alkylcarbonyl, $C_{1-4}$ alkylaminocarbonyl and aminocarbonyl are not substituted or optionally substituted with one or more groups independently selected from hydroxyl, amino, $C_{1-4}$ alkyl, $C_{1-4}$ alkoxy, cyclopropyl, $C_{1-4}$ alkylamino, $(C_{1-4}$ alkyl$)_2$ amino and 4-6 membered heterocyclyl unsubstituted or substituted with $C_{1-4}$ alkyl;

L is a bond;

ring A is

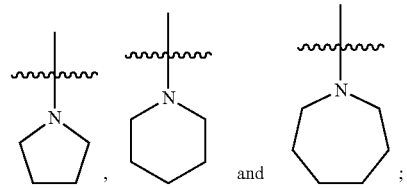

each $R_1$ is independently selected from hydrogen, deuterium, $C_{1-4}$ alkyl and $C_{1-4}$ alkoxy;

and m is 0, 1 or 2.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In another embodiment, provided is a method for treating heart failure diseases in mammals, comprising administering a phosphodiesterase 9 (PDE9) inhibitor compound represented by general formula (I) and pharmaceutically acceptable salts, isomers, and deuterated compounds thereof to patients or subjects, wherein, $X_1$, $X_2$, $X_3$, and $X_4$ are each independently selected from $CR_3$ or N, and $X_1$, $X_2$, $X_3$, and $X_4$ are not $CR_3$ at the same time;

$R_3$ at each occurrence is independently selected from hydrogen, deuterium, cyano, amino, halogen, carboxyl, $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, and piperazinyl, wherein the $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, piperazinyl are not substituted or optionally substituted with one or more groups independently selected from hydroxyl, amino, halogen, $C_{1-4}$ alkyl, $C_{1-4}$ alkylamino, $(C_{1-4}$ alkyl$)_2$ amino, cyclopropyl, and $C_{1-4}$ alkylcarbonyloxy;

L is a bond;

ring A is selected from

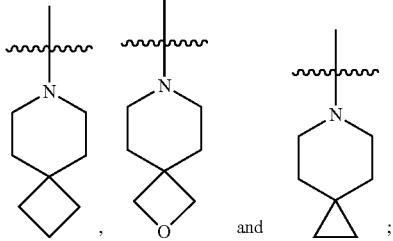

and m is 0.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

A pharmaceutical composition, comprising (a) a phosphodiesterase 9 (PDE9) inhibitor compound represented by general formula (I) and pharmaceutically acceptable salts, isomers, and deuterated compounds thereof, for use in treating heart failure diseases in mammals.

A kit, comprising (a) a phosphodiesterase 9 (PDE9) inhibitor compound represented by general formula (I) and pharmaceutically acceptable salts, isomers, and deuterated compounds thereof and (b) a medicament instruction for use of the compound and the pharmaceutically acceptable salts or isomers or deuterated compounds thereof in the treatment of heart failure diseases in mammals.

In an embodiment involving the pharmaceutical composition and the kit, provided is the general formula (I):

wherein $X_1$, $X_2$, $X_3$ and $X_4$ are each independently selected from $CR_3$ or N, and N heteroatom may be optionally oxidized to

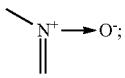

$R_3$ at each occurrence is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy, wherein the $C_{1-6}$ alkyl, $C_{1-6}$ alkoxy, alkylamino, $(C_{1-6}$ alkyl$)_2$ amino, halo $C_{1-6}$ alkoxy, $C_{2-8}$ alkenyl, $C_{2-8}$ alkynyl, $C_{1-6}$ alkylsulfonyl, $C_{1-6}$ alkylthio, $C_{3-6}$ cycloalkyl, 4-6 membered heterocyclyl, $C_{1-6}$ alkylcarbonyl, aminocarbonyl, $C_{1-6}$ alkylaminocarbonyl, $(C_{1-6}$ alkyl$)_2$ aminocarbonyl, 4-6 membered heterocyclylcarbonyl and 5-6 membered heteroaryl-oxy are not substituted or optionally substituted with one or more groups independently selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino, $C_{1-6}$ alkylsulfonylamino, $C_{1-6}$ alkylcarbonyloxy, $C_{3-6}$ cycloalkyl, $C_{2-8}$ alkynyl, halo $C_{1-6}$ alkyl, $C_{2-8}$ alkenyl, halo $C_{1-6}$ alkoxy, 4-6 membered heterocyclyl unsubstituted or optionally substituted with a substituent and heteroaryl unsubstituted or optionally substituted with a substituent;

the substituents of the above-mentioned 4-6 membered heterocyclyl optionally substituted with a substituent and heteroaryl optionally substituted with a substituent are selected from hydroxyl, amino, carboxyl, cyano, nitro, halogen, $C_{1-6}$ alkyl and $C_{1-6}$ alkoxy;

L is a bond and —NH—(CH$_2$)t-, and t is 0, 1, 2 or 3;

ring A is 3-12 membered heterocyclyl, aryl, 5-10 membered heteroaryl, 3-12 membered cycloalkyl, and 3-12 membered cycloalkenyl, wherein the heteroatom of the 3-12 membered heterocyclyl is selected from one of O, S, and N or any combination thereof, the S atom may be optionally oxidized to S(O) or S(O)$_2$, the C atom may be optionally oxidized to C(O), the N heteroatom may be optionally oxidized to

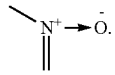

and the heteroatom of the 5-10 membered heteroaryl is selected from one of O, S and N or any combination thereof;

each $R_1$ is independently selected from hydrogen, deuterium, hydroxyl, amino, carboxyl, cyano, nitro, halogen, $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl, wherein the $C_{1-6}$ alkyl, $C_{1-6}$ alkoxy, $C_{1-6}$ alkylamino, $(C_{1-6}$ alkyl$)_2$ amino, halo $C_{1-6}$ alkyl, halo $C_{1-6}$ alkoxy, $C_{2-8}$ alkenyl, $C_{2-8}$ alkynyl, $C_{1-6}$ alkylsulfonyl, $C_{1-6}$ alkylthio, 3-12 membered cycloalkyl, 3-12 membered cycloalkenyl, 3-12 membered heterocyclyl, aryl and 5-10 membered heteroaryl are not substituted or optionally substituted with groups selected from hydroxyl, amino, carboxyl, cyano, nitro, halogen, $C_{1-6}$ alkyl, $C_{1-6}$ alkoxy, $C_{1-6}$ alkoxy $C_{1-6}$ alkoxy, $C_{1-6}$ alkylamino, $(C_{1-6}$ alkyl$)_2$ amino, $C_{1-6}$ alkylcarbonylamino and $C_{1-6}$ alkylsulfonylamino;

m is 0, 1, 2 or 3;

and $R_2$ is selected from hydrogen, $C_{1-6}$ alkyl, $C_{2-8}$ alkenyl, $C_{2-8}$ alkynyl, and halo $C_{1-6}$ alkyl.

In one embodiment, $X_1$, $X_2$ and $X_4$ are each independently CH, and $X_3$ is $CR_3$.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In one embodiment, $X_1$, $X_2$, $X_3$ and $X_4$ are not $CR_3$ at the same time.

In another embodiment, the present invention relates to a pharmaceutical composition, comprising (a) a phosphodiesterase 9 (PDE9) inhibitor compound represented by general formula (I) and pharmaceutically acceptable salts, isomers, and deuterated compounds thereof, for use in treating heart failure diseases in mammals.

In another embodiment, provided is a kit, comprising (a) a phosphodiesterase 9 (PDE9) inhibitor compound represented by general formula (I) and pharmaceutically acceptable salts, isomers, and deuterated compounds thereof and (b) a medicament instruction for use of the compound and the pharmaceutically acceptable salts or isomers or deuterated compounds thereof in the treatment of heart failure diseases in mammals.

In an embodiment involving the pharmaceutical composition and the kit, provided is the general formula (I):
wherein, $X_1$, $X_2$, $X_3$, and $X_4$ are each independently selected from $CR_3$ or N, and $X_1$, $X_2$, $X_3$, and $X_4$ are not $CR_3$ at the same time;
wherein
$R_3$ at each occurrence is independently selected from hydrogen, deuterium, amino, cyano, halogen, carboxyl, $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl, wherein the $C_{1-4}$ alkyl, $C_{1-4}$ alkoxy, $C_{1-4}$ alkylamino, $(C_{1-4}$ alkyl$)_2$ amino, $C_{2-6}$ alkenyl, $C_{2-6}$ alkynyl, $C_{1-4}$ alkylcarbonyl, $C_{1-4}$ alkylaminocarbonyl, $(C_{1-6}$ alkyl$)_2$ aminocarbonyl, $C_{1-4}$ alkylsulfonyl, $C_{1-4}$ alkylthio, aminocarbonyl, cyclopropyl, azetidinyl, morpholinyl and piperazinyl are not substituted or optionally substituted with one or more groups independently selected from hydroxyl, amino, cyano, halogen, $C_{1-4}$ alkyl, $C_{1-4}$ alkoxy, $C_{1-4}$ alkylamino, $(C_{1-4}$ alkyl$)_2$ amino, cyclopropyl, $C_{1-4}$ alkylcarbonyloxy, and 4-6 membered heterocyclyl unsubstituted or substituted with $C_{1-4}$ alkyl;
ring A is 3-12 membered heterocyclyl, and the heteroatom of the 3-12 membered heterocyclyl is selected from one of O, S and N or any combination thereof, and the S atom may be optionally oxidized to S(O) or $S(O)_2$;
each $R_1$ is independently selected from hydrogen, deuterium, hydroxyl, cyano, halogen, $C_{1-4}$ alkyl, $C_{1-4}$ alkoxy and 5-6 membered heteroaryl, wherein the $C_{1-4}$ alkyl, $C_{1-4}$ alkoxy and 5-6 membered heteroaryl are not substituted or substituted with hydroxyl;
m is 0, 1 or 2;
$R_2$ is selected from hydrogen or $C_{1-6}$ alkyl.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In one embodiment, A is 3-12 membered heterocyclyl, preferably 4-7 membered heterocyclyl.

In one embodiment, A is 3-12 membered heterocyclyl, preferably 7-12 membered spiroheterocyclyl.

In another embodiment, the present invention relates to a pharmaceutical composition, comprising (a) a phosphodiesterase 9 (PDE9) inhibitor compound represented by general formula (I) and pharmaceutically acceptable salts, isomers, and deuterated compounds thereof, for use in treating heart failure diseases in mammals.

In another embodiment, provided is a kit, comprising (a) a phosphodiesterase 9 (PDE9) inhibitor compound represented by general formula (I) and pharmaceutically acceptable salts, isomers, and deuterated compounds thereof and (b) a medicament instruction for use of the compound and the pharmaceutically acceptable salts or isomers or deuterated compounds thereof in the treatment of heart failure diseases in mammals.

In an embodiment involving the pharmaceutical composition and the kit, provided is the general formula (I):
wherein, $X_1$, $X_2$, $X_3$, and $X_4$ are each independently selected from $CR_3$ or N, and $X_1$, $X_2$, $X_3$, and $X_4$ are not $CR_3$ at the same time;
$R_3$ at each occurrence is independently selected from hydrogen, deuterium, halogen, $C_{1-4}$ alkyl, $C_{1-4}$ alkoxy, $C_{2-6}$ alkenyl, $C_{1-4}$ alkylcarbonyl, cyclopropyl, $C_{1-4}$ alkylaminocarbonyl and aminocarbonyl, wherein the $C_{1-4}$ alkyl, $C_{1-4}$ alkoxy, $C_{2-6}$ alkenyl, $C_{1-4}$ alkylcarbonyl, $C_{1-4}$ alkylaminocarbonyl and aminocarbonyl are not substituted or optionally substituted with one or more groups independently selected from hydroxyl, amino, $C_{1-4}$ alkyl, $C_{1-4}$ alkoxy, cyclopropyl, $C_{1-4}$ alkylamino, $(C_{1-4}$ alkyl$)_2$ amino and 4-6 membered heterocyclyl unsubstituted or substituted with $C_{1-4}$ alkyl;
L is a bond;
ring A is

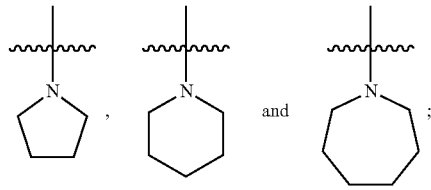 [SMILES: *N1CCCC1 ; *N1CCCCC1 ; *N1CCCCCC1]

each $R_1$ is independently selected from hydrogen, deuterium, $C_{1-4}$ alkyl and $C_{1-4}$ alkoxy;
and m is 0, 1 or 2.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In another embodiment, the present invention relates to a pharmaceutical composition, comprising (a) a phosphodiesterase 9 (PDE9) inhibitor compound represented by general formula (I) and pharmaceutically acceptable salts, isomers, and deuterated compounds thereof, for use in treating heart failure diseases in mammals.

In another embodiment, provided is a kit, comprising (a) a phosphodiesterase 9 (PDE9) inhibitor compound represented by general formula (I) and pharmaceutically acceptable salts, isomers, and deuterated compounds thereof and (b) a medicament instruction for use of the compound and the pharmaceutically acceptable salts or isomers or deuterated compounds thereof in the treatment of heart failure diseases in mammals.

In an embodiment involving the pharmaceutical composition and the kit, provided is the general formula (I):
wherein, $X_1$, $X_2$, $X_3$, and $X_4$ are each independently selected from $CR_3$ or N, and $X_1$, $X_2$, $X_3$, and $X_4$ are not $CR_3$ at the same time;
$R_3$ at each occurrence is independently selected from hydrogen, deuterium, cyano, amino, halogen, carboxyl, $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, and piperazinyl, wherein the $C_{1-4}$ alkyl, $C_{1-4}$ alkoxy, $C_{2-6}$ alkenyl, $C_{1-4}$ alkylcarbonyl, $C_{2-6}$ alkynyl, $C_{1-4}$ alkylamino, $(C_{1-4}$ alkyl$)_2$ amino, $C_{1-4}$ alkylaminocarbonyl, $C_{1-4}$ alkylthio, $C_{1-4}$ alkylsulfonyl, cyclopropyl, azetidinyl, morpholinyl, piperazinyl are not substituted or optionally substituted with one or more groups independently selected from hydroxyl, amino, halogen, $C_{1-4}$ alkyl, $C_{1-4}$ alkylamino, $(C_{1-4}$ alkyl$)_2$ amino, cyclopropyl, and $C_{1-4}$ alkylcarbonyloxy;

L is a bond;

ring A is selected from

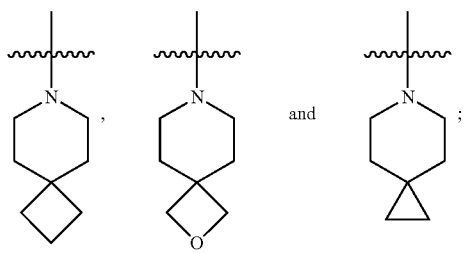 [SMILES: *N1CCC2(CCC2)CC1 ; *N1CCC2(CC1)COC2 ; *N1CCC2(CC1)CC2]

and m is 0.

In one embodiment, $X_1$ and $X_4$ are each independently CH, $X_2$ is N, and $X_3$ is $CR_3$.

In one embodiment, $X_1$ and $X_2$ are each independently CH, $X_3$ is $CR_3$, and $X_4$ is N.

In another embodiment, the isomers refer to stereoisomers and tautomers.

In one embodiment of the present invention, when $R_2$ in the general formula (I) is hydrogen, the isomers are tautomers shown in formula (I').

The tautomer of

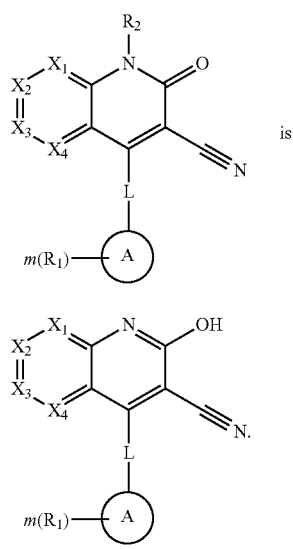

In one embodiment of the present invention, the hydrogen atom in the structure of the deuterated compound of the compound represented by the general formula (I) can be deuterated by one or more deuterium atoms arbitrarily.

In another embodiment, the mammals are humans and animals.

In an embodiment of the present invention, the compound represented by the general formula (I) of the present invention and pharmaceutically acceptable salts, isomers and deuterated compounds thereof are selected from structures shown in Table 1.

TABLE 1

| Serial number | Structure |
|---|---|
| 1 | |
| 2 | |
| 3 | |
| 4 | |
| 5 | |

TABLE 1-continued
| Serial number | Structure |
|---|---|
| 6 | 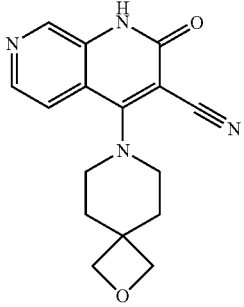 [SMILES: N#Cc1c(N2CCC3(CC2)COC3)c2ccncc2[nH]c1=O] |
| 7 | 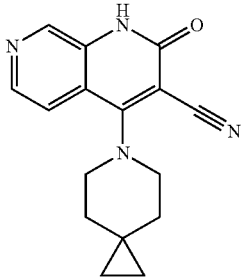 [SMILES: N#Cc1c(N2CCC3(CC2)CC3)c2ccncc2[nH]c1=O] |
| 8 | 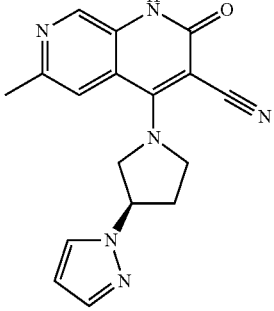 |
| 9 | 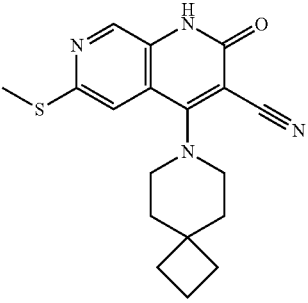 |
| 10 | 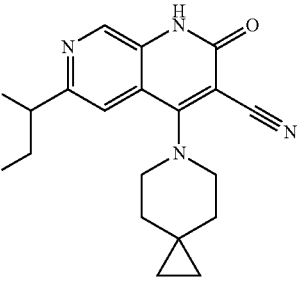 |
| 11 | 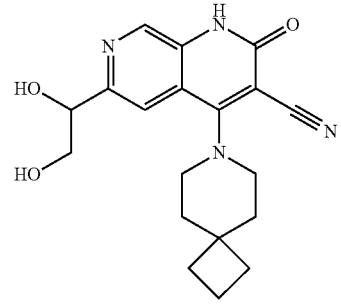 [SMILES: N#Cc1c(N2CCC3(CCC3)CC2)c2cc(C(O)CO)ncc2[nH]c1=O] |
| 12 | 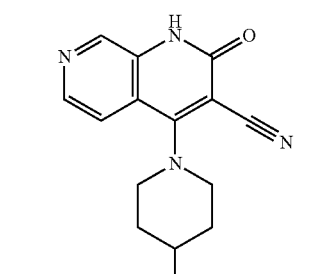 |
| 13 | 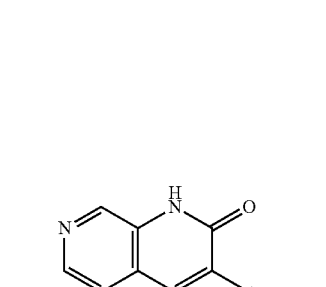 |
| 14 | 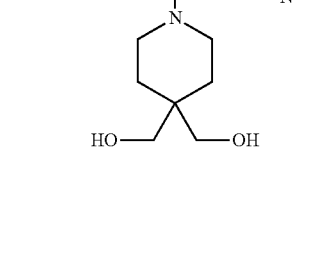 |

TABLE 1-continued

| Serial number | Structure |
|---|---|
| 15 | |
| 16 | |
| 17 | |
| 18 | |
| 19 | |
| 20 | |
| 21 | |
| 22 | |
| 23 | |

TABLE 1-continued

| Serial number | Structure |
|---|---|
| 24 | (structure) |
| 25 | (structure) |
| 26 | (structure) |
| 27 | (structure) |
| 28 | (structure) |
| 29 | (structure) |
| 30 | (structure) |
| 31 | (structure) |
| 32 | (structure) |
| 33 | (structure) |

TABLE 1-continued

| Serial number | Structure |
|---|---|
| 34 | |
| 35 | |
| 36 | |
| 37 | |
| 38 | |
| 39 | |
| 40 | |
| 41 | |
| 42 | |
| 43 | |

TABLE 1-continued

| Serial number | Structure |
|---|---|
| 44 | |
| 45 | |
| 46 | |
| 47 | |
| 48 | |
| 49 | |
| 50 | |
| 51 | |
| 52 | |
| 53 | |

TABLE 1-continued

| Serial number | Structure |
|---|---|
| 54 | |
| 55 | |
| 56 | |
| 57 | |
| 58 | |
| 59 | |
| 60 | |
| 61 | |
| 62 | |
| 63 | |

TABLE 1-continued
| Serial number | Structure |
|---|---|
| 64 | 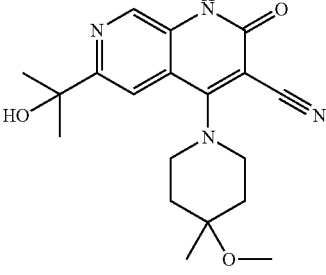 |
| 65 | 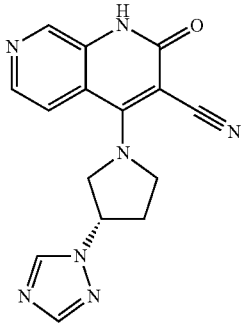 [SMILES: N#Cc1c(N2CC[C@H](n3cncn3)C2)c2ccncc2[nH]c1=O] |
| 66 | 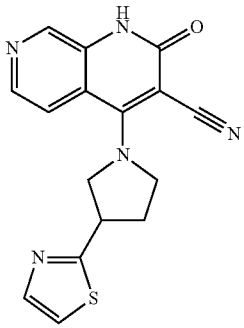 [SMILES: N#Cc1c(N2CCC(c3nccs3)C2)c2ccncc2[nH]c1=O] |
| 67 | 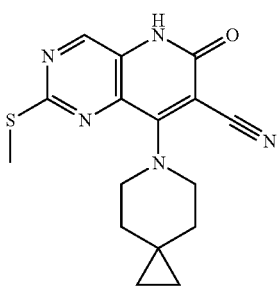 [SMILES: CSc1ncc2[nH]c(=O)c(C#N)c(N3CCC4(CC3)CC4)c2n1] |
| 68 | 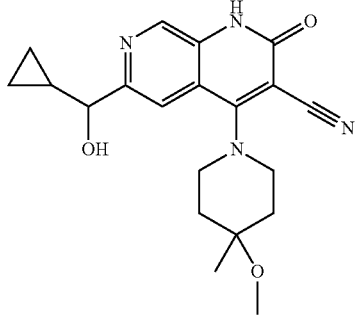 [SMILES: COC1(C)CCN(c2c(C#N)c(=O)[nH]c3cnc(C(O)C4CC4)cc23)CC1] |
| 69 | 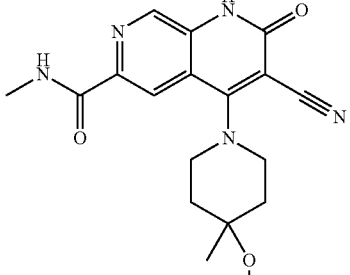 |
| 70 | 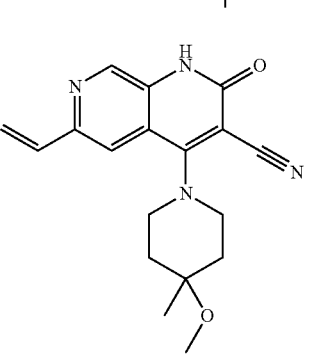 |
| 71 | 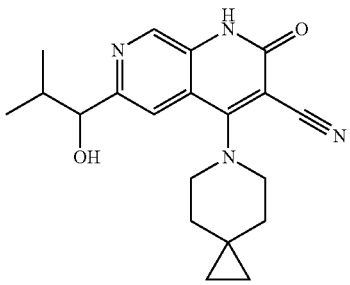 [SMILES: CC(C)C(O)c1cc2c(N3CCC4(CC3)CC4)c(C#N)c(=O)[nH]c2cn1] |
| 72 | 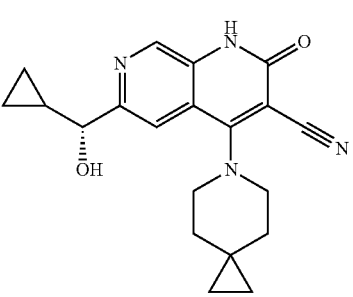 [SMILES: N#Cc1c(N2CCC3(CC2)CC3)c2cc([C@H](O)C3CC3)ncc2[nH]c1=O] |
| 73 | 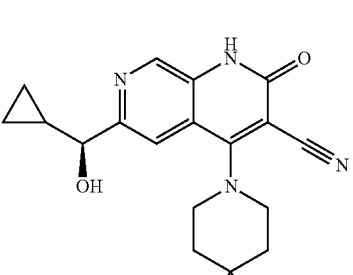 |

TABLE 1-continued
| Serial number | Structure |
|---|---|
| 74 | 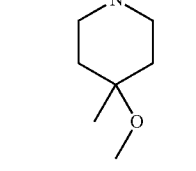 |
| 75 | |
| 76 | |
| 77 | |
| 78 | 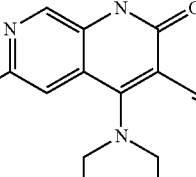 |
| 79 | |
| 80 | |
| 81 | |
| 82 | |

TABLE 1-continued
| Serial number | Structure |
|---|---|
| 83 | 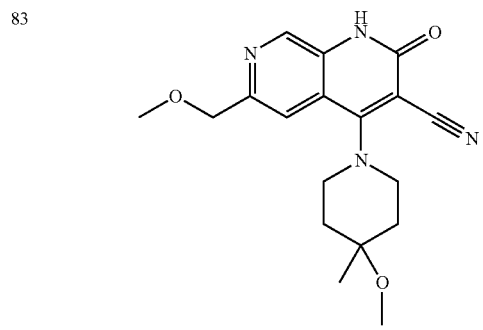 |
| 84 | 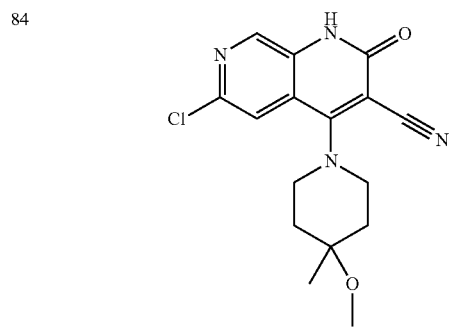 |
| 85 | 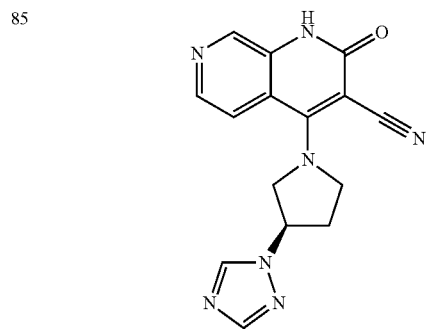 |
| 86 | 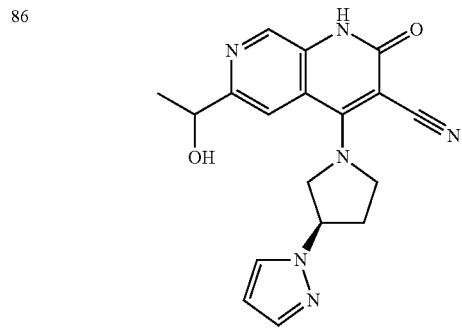 |
| 87 | 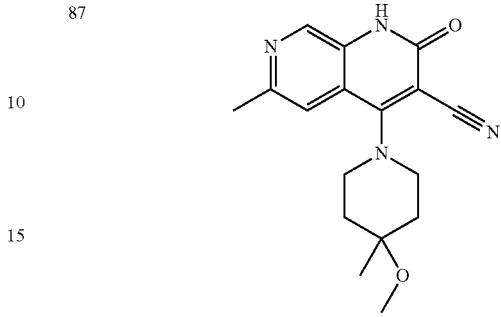 |
| 88 | 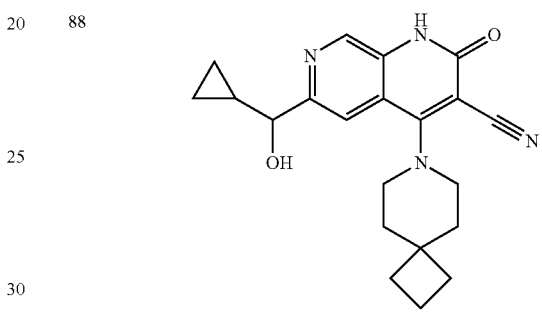 |
| 89 | 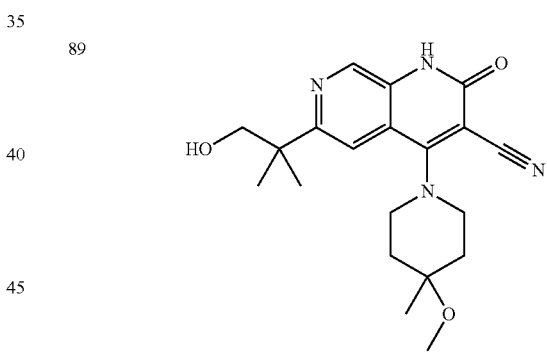 |
| 90 | 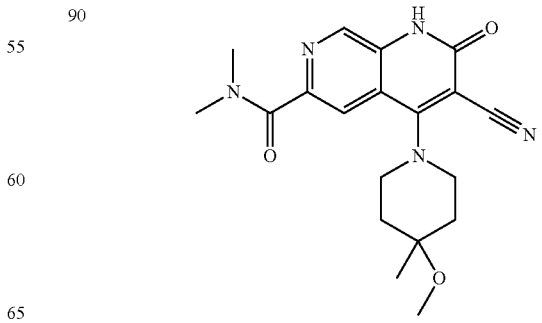 |

TABLE 1-continued
| Serial number | Structure |
|---|---|
| 91 | 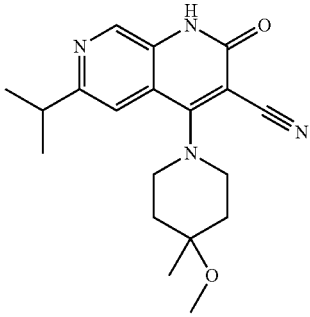 |
| 92 | 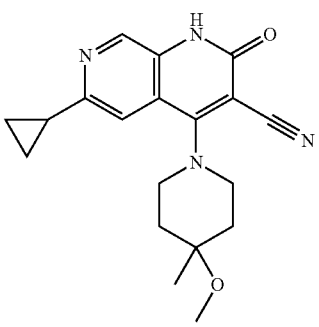 [SMILES: COC1(C)CCN(c2c(C#N)c(=O)[nH]c3cnc(C4CC4)cc23)CC1] |
| 93 | 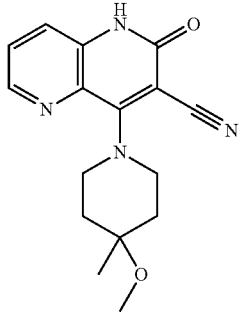 [SMILES: COC1(C)CCN(c2c(C#N)c(=O)[nH]c3cccnc23)CC1] |
| 94 | 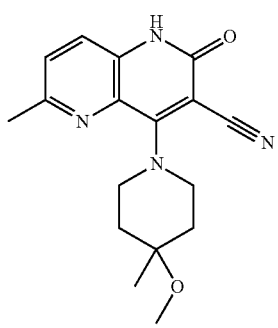 [SMILES: COC1(C)CCN(c2c(C#N)c(=O)[nH]c3ccc(C)nc23)CC1] |
| 95 | 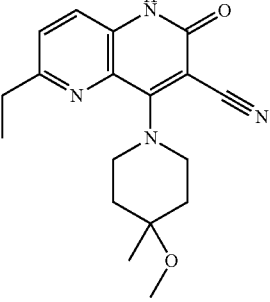 |
| 96 | 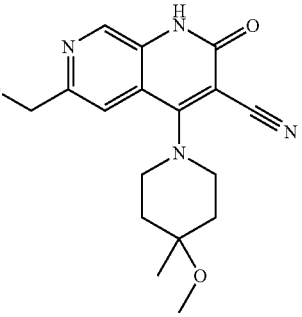 |
| 97 | 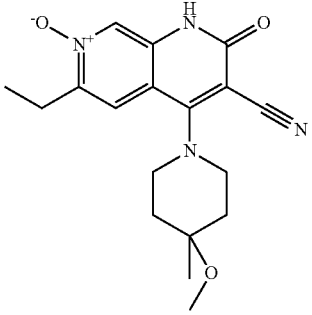 |
| 98 | 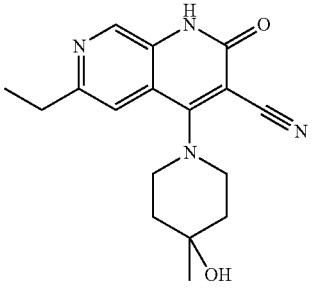 [SMILES: CCc1cc2c(N3CCC(C)(O)CC3)c(C#N)c(=O)[nH]c2cn1] |
| 99 | 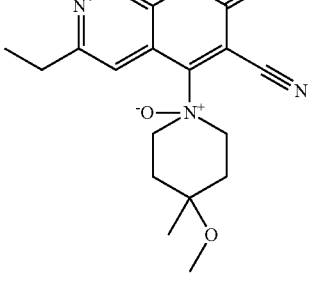 |

TABLE 1-continued
| Serial number | Structure |
|---|---|
| 100 | 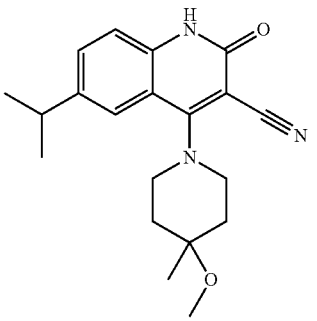 [SMILES: COC1(C)CCN(c2c(C#N)c(=O)[nH]c3ccc(C(C)C)cc23)CC1] |
| 101 | 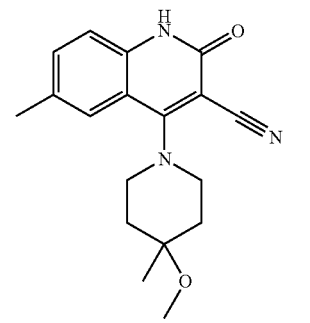 [SMILES: COC1(C)CCN(c2c(C#N)c(=O)[nH]c3ccc(C)cc23)CC1] |
| 102 | 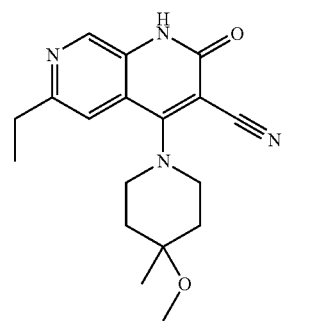 [SMILES: CCc1cc2c(N3CCC(C)(OC)CC3)c(C#N)c(=O)[nH]c2cn1] |
| 103 | 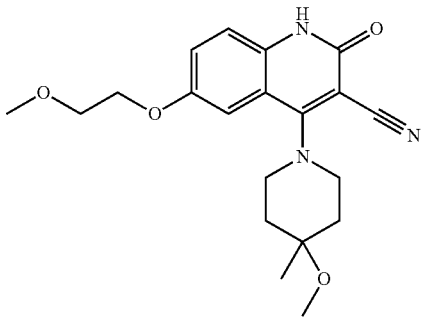 [SMILES: COCCOc1ccc2[nH]c(=O)c(C#N)c(N3CCC(C)(OC)CC3)c2c1] |
| 104 | 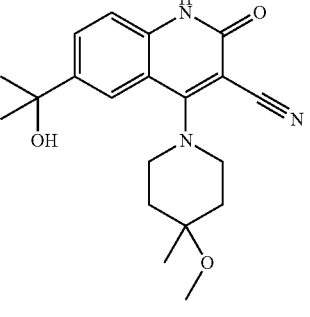 |
| 105 | 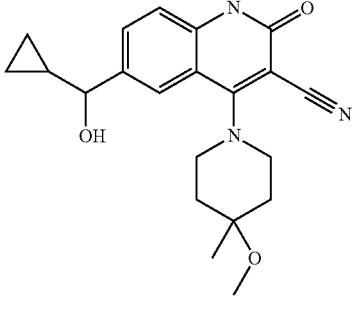 |
| 106 | 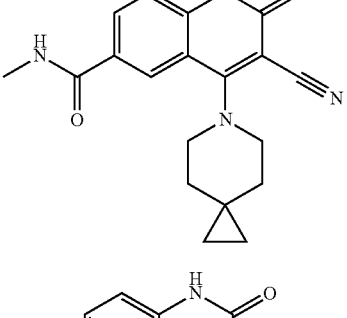 |
| 107 | 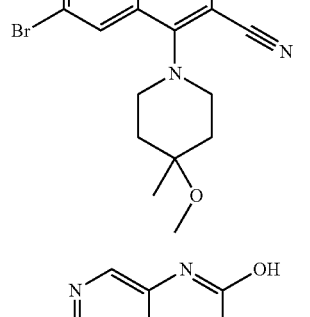 |
| 108 | 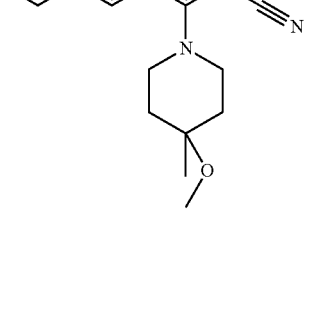 |

TABLE 1-continued
| Serial number | Structure |
|---|---|
| 109 | 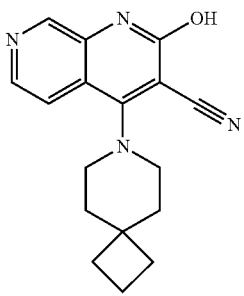 [SMILES: N#Cc1c(O)nc2cnccc2c1N1CCC2(CCC2)CC1] |
| 110 | 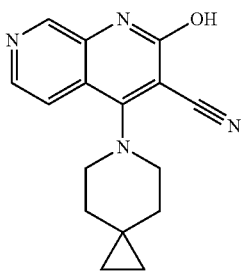 [SMILES: N#Cc1c(O)nc2cnccc2c1N1CCC2(CC1)CC2] |
| 111 | 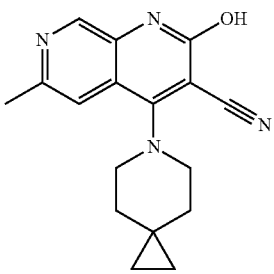 [SMILES: Cc1cc2c(N3CCC4(CC3)CC4)c(C#N)c(O)nc2cn1] |
| 112 | 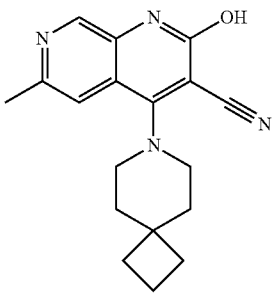 [SMILES: Cc1cc2c(N3CCC4(CCC4)CC3)c(C#N)c(O)nc2cn1] |
| 113 | 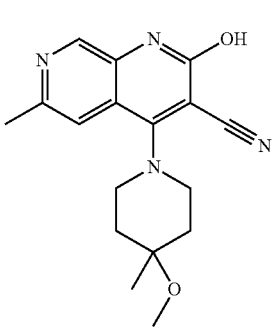 [SMILES: COC1(C)CCN(c2c(C#N)c(O)nc3cnc(C)cc23)CC1] |
| 114 | 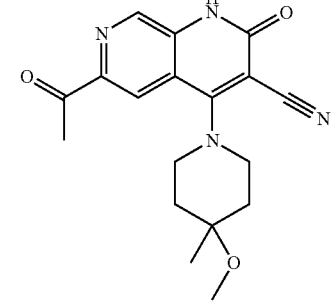 |
| 115 | 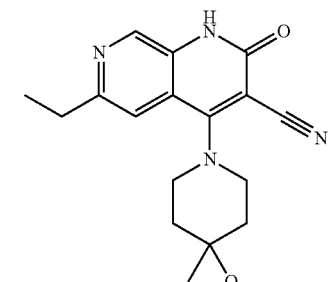 |
| 116 | 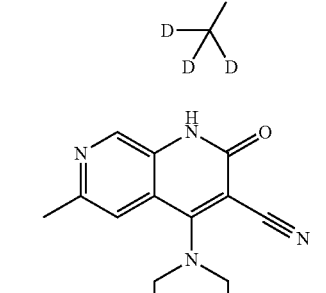 |
| 117 | 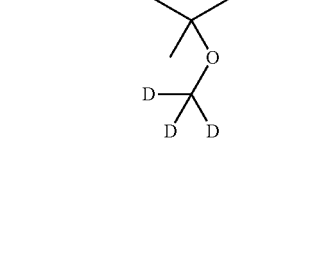 |

TABLE 1-continued
| Serial number | Structure |
|---|---|
| 118 | |
| 119 | |
| 120 | |
| 121 | |
| 122 | |
| 123 | |
| 124 | |
In an embodiment of the present invention, the compound represented by the general formula (I) of the present invention and pharmaceutically acceptable salts, isomers and deuterated compounds thereof are selected from the following structures:
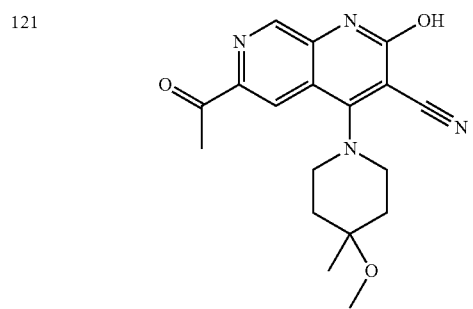
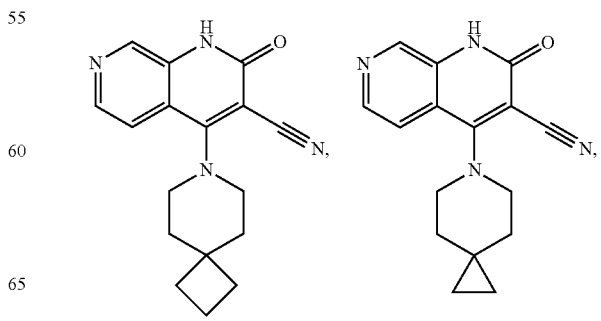

-continued
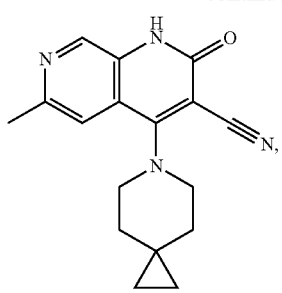
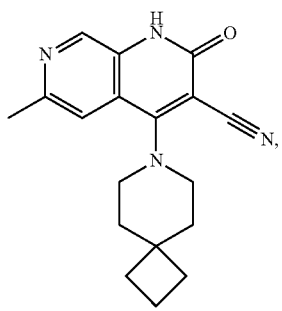
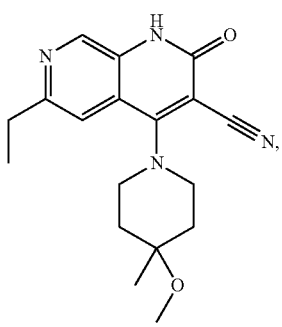
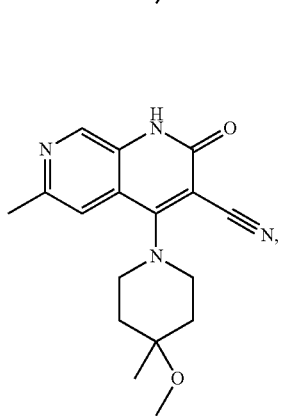
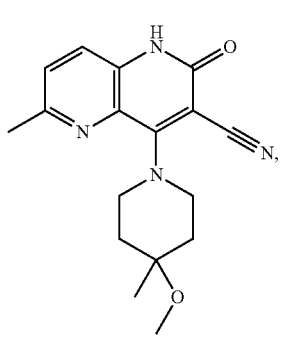
-continued
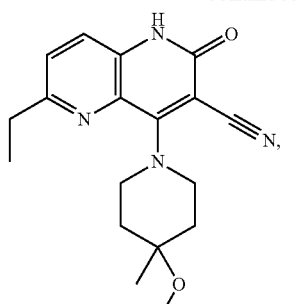
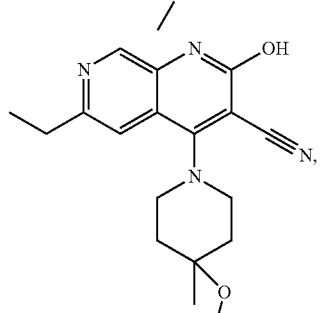
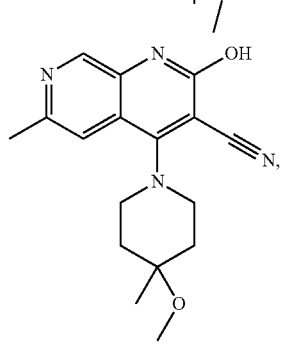
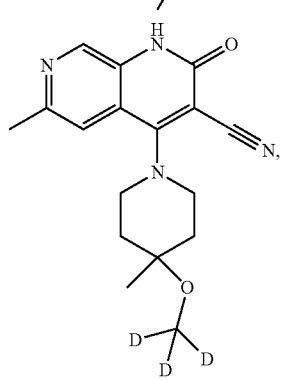
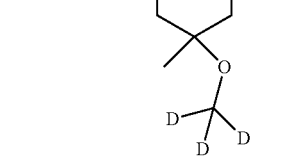

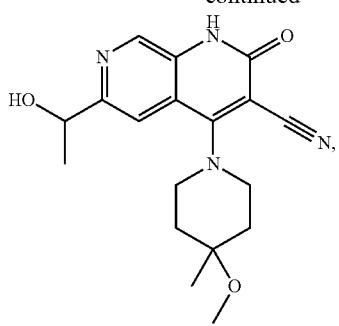
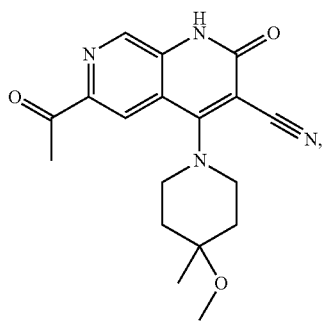
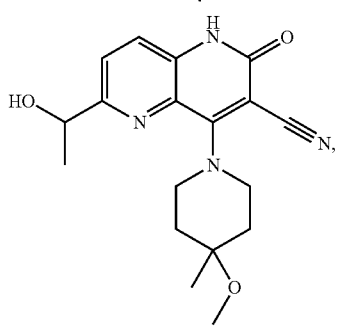
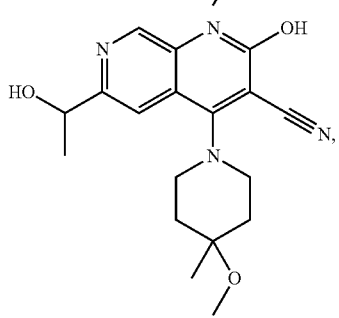
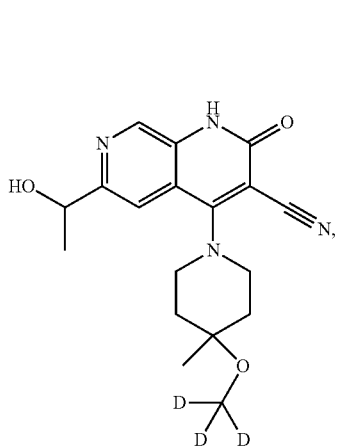
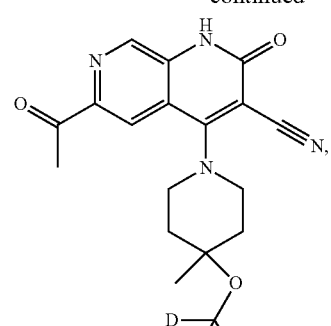
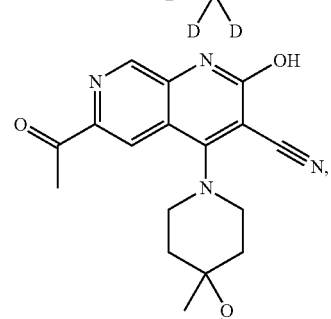
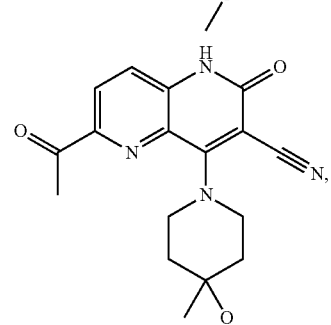
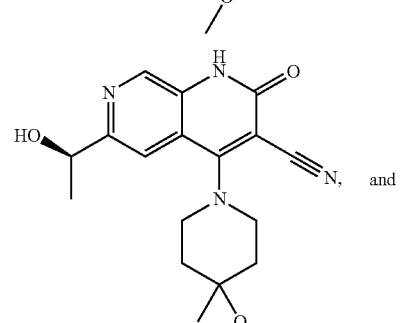
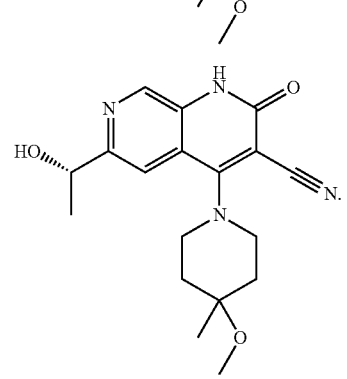
and
In an embodiment of the present invention, the compound represented by the general formula (I) of the present invention and pharmaceutically acceptable salts, isomers and deuterated compounds thereof are selected from the following structures:

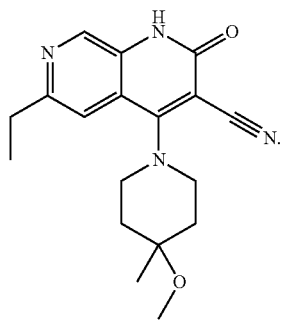

A mammal with heart failure means that the mammal is experiencing or has suffered from heart failure, or the mammal is a mammal susceptible to heart failure. The types and etiologies of the heart failure are any one or more mentioned in the present invention.

In another embodiment of the present invention, the heart failure diseases are various heart failures under different classification basis, including but not limited to left heart failure, right heart failure, and whole heart failure; acute heart failure, chronic heart failure, and decompensated heart failure; systolic and diastolic heart failure; pre-heart failure, pre-clinical heart failure, clinical heart failure and refractory end-stage heart failure; grade I, grade II, grade III, and grade IV heart failure by the New York Heart Association (NYHA) according to heart function; and heart failure with reduced left ventricular ejection fraction, heart failure with median left ventricular ejection fraction, and heart failure with preserved left ventricular ejection fraction.

In another embodiment of the present invention, the heart failure diseases are selected from, but are not limited to heart failure caused by ischemic heart disease, heart failure caused by toxic damage, immune-mediated heart failure and heart failure caused by inflammatory damage, heart failure caused by infiltrative lesion, heart failure caused by metabolic disorder, heart failure caused by genetic abnormality, heart failure caused by abnormal load, and heart failure caused by arrhythmia.

In another embodiment of the present invention, the heart failure disease is heart failure caused by ischemic heart disease.

In another embodiment of the present invention, the heart failure disease is selected from systolic heart failure and diastolic heart failure.

The systolic heart failure includes but is not limited to the one having at least one of the following characteristics: decreased myocardial systolic function; reduced left ventricular ejection fraction; increased systolic and/or end-diastolic volume of the ventricle or heart; myocardial fibrosis as shown by a test; thickening of the ventricular wall followed by thinning of same (such as dilated hypertrophic cardiomyopathy) and other characteristics.

The diastolic heart failure includes but is not limited to the one having at least one of the following characteristics: decreased myocardial diastolic function; reduced left ventricular ejection fraction; reserved left ventricular ejection fraction; left ventricular ejection fraction median; increased heart mass or cardiac hypertrophy; disordered or disorderly arranged cardiomyocytes and other characteristics.

In another embodiment of the present invention, the compound represented by the general formula (I) and pharmaceutically acceptable salts, isomers and deuterated compounds thereof exert effects in treating heart failure by means of inhibiting the activity of PDE9, and increasing the level of cyclic guanosine monophosphate.

In another embodiment of the present invention, the compound represented by the general formula (I) and pharmaceutically acceptable salts, isomers and deuterated compounds thereof exert effects in treating heart failure by means of improving the heart function of patients or subjects with heart failure and reversing the myocardial remodeling of patients or subjects with heart failure.

In another embodiment of the present invention, the medicament for treating heart failure diseases further includes a second or more therapeutic agent(s).

In another embodiment of the present invention, the medicament for treating heart failure diseases can be prepared into any pharmaceutically acceptable pharmaceutical preparation with a pharmaceutical carrier. The pharmaceutical carrier of the present invention can be one or more solid or liquid excipients suitable for humans. The pharmaceutical carrier preferably has sufficient purity and sufficiently low toxicity, and is compatible with the active ingredient of the present invention without significantly reducing the efficacy of the active ingredient. For example, the pharmaceutical carrier can be a filler, a binder, a disintegrating agent, a lubricant, an aqueous solvent or a non-aqueous solvent, etc.

The pharmaceutical preparation of the present invention can be prepared into any pharmaceutically acceptable dosage form, and is administered to patients or subjects in need of such treatment in any suitable mode of administration, such as through oral, parenteral, transdermal, rectal, nasal, pulmonary, implantation, and topical administration. When used for oral administration, the pharmaceutical preparation can be prepared into a tablet, a capsule, a pill, a granule, an emulsion, a suspension, etc. When used for parenteral administration, the pharmaceutical preparation can be prepared into an injection, a sterile powder for injection, a gel, a suppository, etc.

In another embodiment of the present invention, the pharmaceutical preparation is preferably in unit dosage form. In this form, the preparation is subdivided into unit doses containing appropriate amounts of active ingredients. The unit dosage form can be packaged into a packaged form containing a discrete quantity of a preparation, such as a packaged tablet, a packaged capsule, or a powder in a vial or an ampoule.

The administration dosage of a medicament depends on various factors, including the age, weight and condition of a patient, and the route of administration. The precise dose administered is determined based on the judgment of the attending physician. Usually, the dosage for administering an active compound can be, for example, about 1 mg to about 1000 mg, about 5 mg to about 1000 mg per day. The desired dosage also depends on the specific compound used, the severity of a disease, the route of administration, the weight and health status of a patient, and the judgment of the attending physician. Perhaps the dose exceeds a given dose range in certain cases, as long as there are data supportive of the choice of the dose.

In another embodiment of the present invention, the medicament is administered to patients or subjects in need of treatment through oral, parenteral, transdermal, rectal, nasal, pulmonary, implantation, and topical administration.

DETAILED DESCRIPTION OF THE INVENTION

Figure 1:
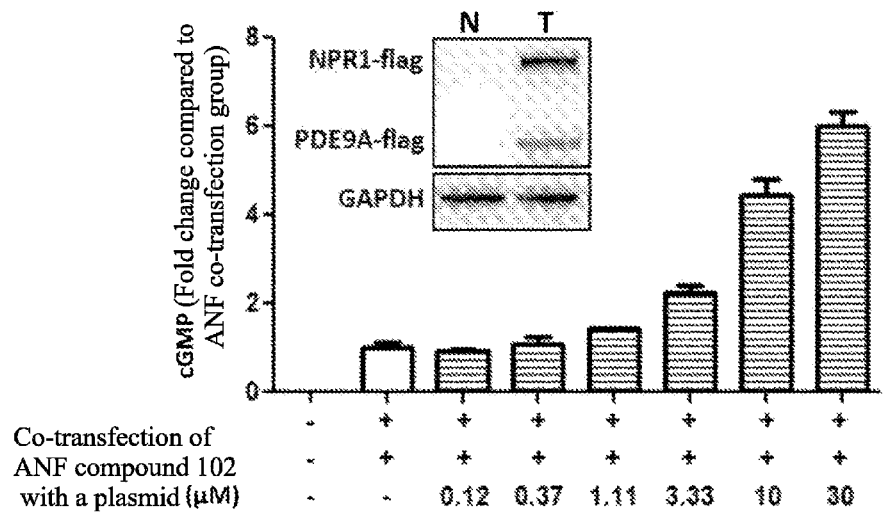
FIG. 1 Up-regulation effect of compound 102 on cGMP content in HEK293T cells double transfected with human PDE9A2 and natriuretic peptide protein receptor 1 (NPR1)

The "halogen" of the present invention refers to fluorine, chlorine, bromine, iodine, etc., preferably fluorine and chlorine.

The "halo" of the present invention means that any hydrogen atom in the substituent can be substituted with one or more identical or different halogen atoms. "Halogen" is as defined above.

The "$C_{1-6}$ alkyl" of the present invention refers to a straight or branched alkyl derived from a hydrocarbon moiety containing 1-6 carbon atoms by removing one hydrogen atom therefrom, such as methyl, ethyl, n-propyl, isopropyl, n-butyl, isobutyl, sec-butyl, tert-butyl, n-pentyl, i-pentyl, 2-methylbutyl, neo-pentyl, 1-ethylpropyl, n-hexyl, isohexyl, 4-methylpentyl, 3-methylpentyl, 2-methylpentyl, 1-methylpentyl, 3,3-dimethylbutyl, 2,2-dimethylbutyl, 1,1-dimethylbutyl, 1,2-dimethylbutyl, 1,3-dimethylbutyl, 2,3-dimethylbutyl, 2-ethylbutyl and 1-methyl-2-methylpropyl. The "$C_{1-4}$ alkyl" refers to the above-mentioned examples containing 1 to 4 carbon atoms.

The "$C_{2-8}$ alkenyl" of the present invention refers to a straight or branched or cyclic alkylene derived from an alkene moiety of 2 to 8 carbon atoms containing a carbon-carbon double bond by removing one hydrogen atom therefrom, such as vinyl, 1-propenyl, 2-propenyl, 1-butenyl, 2-butenyl, 1,3-butadienyl, 1-pentenyl, 2-pentenyl, 3-pentenyl, 1,3-pentadienyl, 1,4-pentadienyl, 1-hexenyl, and 1,4-hexadienyl.

The "$C_{2-8}$ alkynyl" of the present invention refers to a straight or branched alkynyl derived from an alkyne moiety of 2 to 8 carbon atoms containing a carbon-carbon triple bond by removing one hydrogen atom therefrom, such as ethynyl, propynyl, 2-butynyl, 2-pentynyl, 3-pentynyl, 4-methyl-2-pentynyl, 2-hexynyl, and 3-hexynyl.

The "$C_{1-6}$ alkoxy" of the present invention refers to a group formed by connecting "$C_{1-6}$ alkyl" defined above with a parent molecule via an oxygen atom, i.e., the "$C_{1-6}$ alkyl-O—" group, such as methoxy, ethoxy, n-propoxy, isopropoxy, n-butoxy, tert-butoxy, n-pentoxy, neopentyloxy and n-hexyloxy. The "$C_{1-4}$ alkoxy" refers to the above-mentioned examples containing 1-4 carbon atoms, i.e., "$C_{1-4}$ alkyl-O-" group.

The "$C_{1-6}$ alkylamino", "$(C_{1-6}$ alkyl$)_2$ amino", "$C_{1-6}$ alkylcarbonylamino", "$C_{1-6}$ alkylsulfonylamino", "$C_{1-6}$ alkylaminocarbonyl", "$(C_{1-6}$ alkyl$)_2$ amino-carbonyl", "$C_{1-6}$ alkoxycarbonyl", "$C_{1-6}$ alkylsulfonyl", "$C_{1-6}$ alkylthio", and "$C_{1-6}$ alkylcarbonyl" of the present invention refer to $C_{1-6}$ alkyl-NH—, $(C_{1-6}$ alkyl$)(C_{1-6}$ alkyl$)$N—, $C_{1-6}$ alkyl-C(O)—NH—, $C_{1-6}$ alkyl-S(O)$_2$—NH$_2$—, $C_{1-6}$ alkyl-NH—C(O)—, $(C_{1-6}$ alkyl$)(C_{1-6}$ alkyl$)$N—C(O)—, $C_{1-6}$ alkyl-O—C(O)—, $C_{1-6}$ alkyl-S(O)$_2$—, $C_{1-6}$ alkyl-S—, and $C_{1-6}$ alkyl-C(O)—, respectively. The "$C_{1-6}$ alkyl" is as defined above, and is preferably "$C_{1-4}$ alkyl".

The "fused ring" of the present invention refers to a polycyclic structure formed by connecting two or more ring structures in an ortho-fused manner, or by spiro or bridge linkage. The ortho-fused ring refers to a fused ring structure formed by two or more ring structures sharing two adjacent ring atoms (i.e., sharing a bond). The bridged ring refers to a fused ring structure formed by two or more ring structures sharing two non-adjacent ring atoms. The spiro ring refers to a fused ring structure formed by two or more ring structures sharing one ring atom with each other.

The "3-12 membered cycloalkenyl" of the present invention, unless otherwise specified, includes all possible instances of monocyclic and fused rings (including fused in an ortho-fused manner, or by spiro or bridge linkage), such as 3-8 membered monocyclic olefin, 7-11 membered spirocyclic olefin, 7-11 membered ortho-fused ring olefin, and 6-11 membered bridged cyclic olefin.

The cycloalkyl of the present invention includes all possible instances of monocyclic and fused rings (including fused in an ortho-fused manner, or by spiro or bridge linkage); for example, "3-12 membered cycloalkyl" can be a monocyclic, bicyclic or polycyclic cycloalkyl system (also called a fused ring system). Unless otherwise specified, a monocyclic ring system is a cycloalkyl group containing 3-8 carbon atoms. Examples of 3-8 membered cycloalkyl include but are not limited to: cyclopropanyl, cyclobutyl, cyclopentyl, cyclohexyl, cycloheptyl, cyclooctyl, etc. The fused-ring cycloalkyl includes an ortho-fused ring cycloalkyl, a bridged cycloalkyl, and a spirocycloalkyl. The ortho-fused ring cycloalkyl can be a 6-11 membered ortho-fused ring cycloalkyl, and a 7-10 membered ortho-fused ring cycloalkyl, and representative examples thereof include, but are not limited to, bicyclo[3.1.1]heptane, bicyclo[2.2.1]heptane, bicyclo[2.2.2]octane, bicyclo[3.2.2]nonane, bicyclo[3.3.1]nonane and bicyclo[14.2.1]nonane. The spirocyclyl can be a 7-12 membered spirocyclyl or a 7-11 membered spirocyclyl, and examples of the spirocyclyl include but are not limited to:

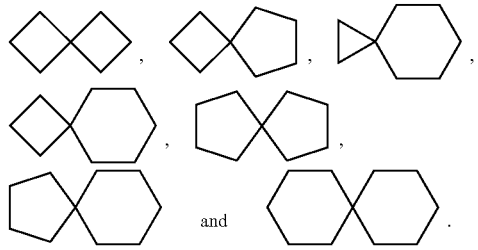

The bridged cyclyl can be a 6-11 membered bridged cyclyl, and a 7-10 membered bridged cyclyl, examples of the bridged cyclyl include but are not limited to:

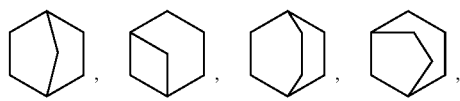

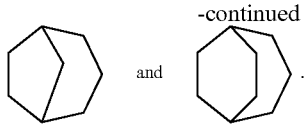

The "heterocyclyl" of the present invention refers to a 3-12 membered non-aromatic cyclic group in which at least one ring carbon atom is replaced by a heteroatom selected from O, S, and N, preferably 1-3 heteroatoms, further comprising carbon atoms, nitrogen atoms and sulfur atoms which can be oxidized.

"3-12 membered heterocyclyl" refers to a monocyclic heterocyclyl system, a bicyclic heterocyclyl system or a polycyclic heterocyclyl system (also called a fused ring system), including saturated and partially saturated heterocyclyl, but not including an aromatic ring. Unless otherwise specified, the "3-12 membered heterocyclyl" includes all possible instances of monocyclic ring, fused ring (including fused in an ortho-fused manner, or by spiro or bridge linkage), saturated, and partially saturated rings.

The mono-heterocyclyl can be 3-8 membered heterocyclyl, 3-8 membered saturated heterocyclyl, 3-6 membered heterocyclyl, 4-7 membered heterocyclyl, 5-7 membered heterocyclyl, 5-6 membered heterocyclyl, 5-6 membered oxygen-containing heterocyclyl, 3-8 membered nitrogen-containing heterocyclyl, 5-6 membered nitrogen-containing heterocyclyl, 5-6 membered saturated heterocyclyl, etc. Examples of "3-8" membered saturated heterocyclyl include, but are not limited to, aziridine group, oxacyclopropane group, thiacyclopropane group, azetidinyl, oxetanyl, thiacyclobutane group, tetrahydrofuranyl, pyrrolidinyl, tetrahydrothienyl, imidazolidiny, pyrazolidinyl, 1,2-oxazolidinyl, 1,3-oxazolidinyl, 1,2-thiazolidinyl, 1,3-thiazolidinyl, tetrahydro-2H-pyranyl, tetrahydro-2H-thiopyranyl, piperidinyl, piperazinyl, morpholinyl, 1,4-dioxanyl, and 1,4-oxathiane group. Examples of the "3-8" membered partially saturated heterocyclyl include, but are not limited to 4,5-dihydroisoxazolyl, 4,5-dihydrooxazolyl, 2,5-dihydrooxazolyl, 2,3-dihydrooxazolyl, 3,4-dihydro-2H-pyrrolyl, 2,3-dihydro-1H-pyrrolyl, 2,5-dihydro-1H-imidazolyl, 4,5-dihydro-1H-imidazolyl, 4,5-dihydro-1H-pyrazolyl, 4,5-dihydro-3H-pyrazolyl, 4,5-dihydrothiazolyl, 2,5-dihydrothiazolyl, 2H-pyranyl, 4H-pyranyl, 2H-thiopyranyl, 4H-thiopyranyl, 2,3,4,5-tetrahydropyridyl, 1,2-isooxazinyl, 1,4-isooxazinyl or 6H-1,3-oxazinyl, etc. The fused heterocyclic ring includes an ortho-fused heterocyclyl, a spiroheterocyclyl, and a bridged heterocyclyl, which may be saturated, partially saturated or unsaturated, but are not aromatic. The fused heterocyclyl is a 5-6 membered monocyclic heterocyclyl ring fused to a benzene ring, 5-6 membered monocyclic cycloalkyl, 5-6 membered monocyclic cycloalkenyl, 5-6 membered monocyclic heterocyclyl or 5-6 membered monocyclic heteroaryl. The ortho-fused heterocyclyl may be a 6-12 membered ortho-fused cyclyl, a 7-10 membered ortho-fused cyclyl, a 6-10 membered ortho-fused cyclyl, a 6-12 membered saturated ortho-fused cyclyl, and representative examples include but are not limited to: 3-azabicyclo[13.1.0]hexyl, 3,6-diazabicyclo[3.2.0]heptanyl, 3,8-diazabicyclo[4.2.0]octyl, 3,7-diazabicyclo[4.2.0]octyl, octahydropyrrolo[3,4-c]pyrrolyl, octahydropyrrolo[3,4-b]pyrrolyl, octahydropyrrolo[3,4-b][1,4]oxazinyl, octahydro-1H-pyrrolo[3,4-c]pyridyl, 2,3-dihydrobenzofuran-2-yl, 2,3-dihydrobenzofuran-3-yl, dihydroindolin-1-yl, dihydroindolin-2-yl, dihydroindoline 3-yl, 2,3-dihydrobenzothiophen-2 yl, octahydro-1H-indolyl, and octahydrobenzofuranyl. The spiroheterocyclyl can be 6-12 membered spiroheterocyclyl, 7-11 membered spiroheterocyclyl, and a 6-12 membered saturated spirocyclyl, and examples of the spiroheterocyclyl include, but are not limited to:

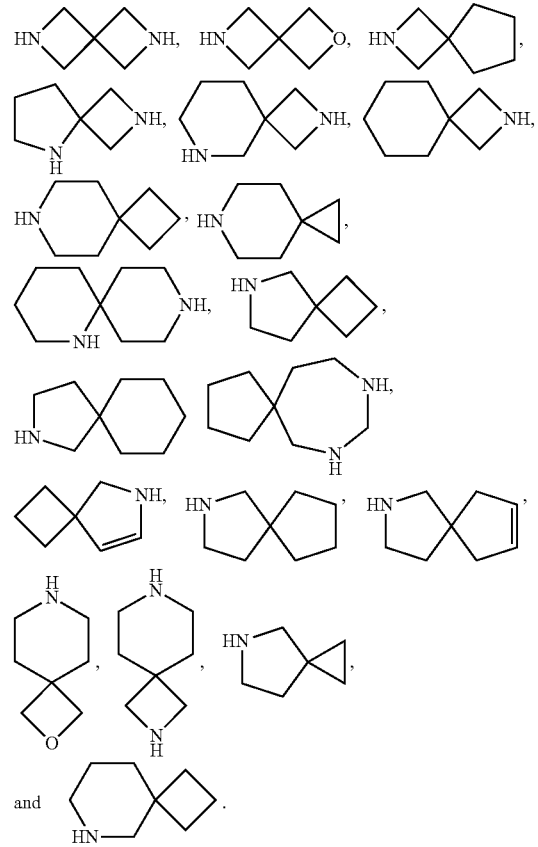

The bridged heterocyclyl may be 6-12 membered bridged heterocyclyl, 7-11 membered bridged heterocyclyl, and a 6-12 membered saturated bridged cyclyl, and examples of the bridged heterocyclyl include, but are not limited to:

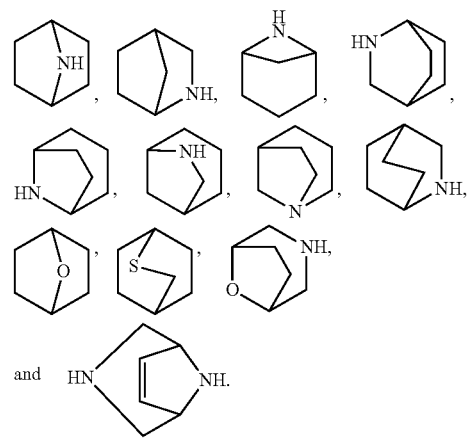

The "aryl" of the present invention refers to a cyclic aromatic group containing 6-14 carbon atoms, including phenyl, naphthalene, phenanthrene, etc.

The heteroaryl of the present invention includes all possible monocyclic-ring, fused-ring, all aromatic, and partially aromatic instances that may be formed. For example, "5-10 membered heteroaryl" refers to an aromatic cyclic group in which at least one ring carbon atom is replaced by a heteroatom selected from O, S, and N, preferably 1-3 heteroatoms, including instances that carbon atom and sulfur atom are oxidized at the same time, for example, carbon atom is replaced by C(O), sulfur atom is replaced by S(O) and S(O)$_2$, and nitrogen atom

can be replaced by

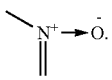

Heteroaryl include monoheteroaryl and fused heteroaryl; unless otherwise specified, monoheteroaryl can be 5-7 membered heteroaryl and 5-6 membered heteroaryl; examples of the monoheteroaryl include, but are not limited to, furyl, imidazolyl, isoxazolyl, thiazolyl, isothiazolyl, oxadiazolyl, oxazolyl, pyridyl, pyridazinyl, pyrimidinyl, pyrazinyl, pyrazolyl, pyrrolyl, tetrazolyl, thiadiazolyl, thienyl, triazolyl and triazinyl. In certain embodiments, the fused heteroaryl refers to a group formed by fusing a monocyclic heteroaryl ring to phenyl, cycloalkenyl, heteroaryl, cycloalkyl, and heterocyclyl, and the fused heteroaryl can be 8-12 membered ortho-fused heteroaryl and 9-10 membered ortho-fused heteroaryl, examples include but are not limited to benzimidazolyl, benzofuranyl, benzothienyl, benzoxadiazolyl, benzothiadiazolyl, benzothiazolyl, cinnolinyl, 5,6-dihydroquinolin-2-yl, 5,6-dihydroisoquinolin-1-yl, furopyridyl, indazolyl, indolyl, isoindolyl, isoquinolinyl, naphthyridinyl, purinyl, quinolinyl, 5,6,7,8-tetrahydroquinolin-2-yl, 5,6,7,8-tetrahydroquinolyl, 5,6,7,8-tetrahydroquinolin-4-yl, 5,6,7,8-tetrahydroisoquinolin-1-yl, thienopyridyl, 4,5,6,7-tetrahydro[c][1,2,5]oxadiazolyl and 6,7-dihydro[c][1,2,5]oxadiazol-4(5H) keto.

The "pharmaceutically acceptable salt" of the present invention refers to addition salts of pharmaceutically acceptable acids and bases or solvates thereof. Such pharmaceutically acceptable salts include salts of acids such as: hydrochloric acid, phosphoric acid, hydrobromic acid, sulfuric acid, sulfurous acid, formic acid, toluenesulfonic acid, methanesulfonic acid, nitric acid, benzoic acid, citric acid, tartaric acid, maleic acid, hydroiodic acid, and alkanoic acid (such as acetic acid and HOOC—(CH$_2$)n-COOH (where n is 0 to 4)). Such pharmaceutically acceptable salts include salts of bases such as: sodium salt, potassium salt, calcium salt, and ammonium salt. Those skilled in the art know a variety of non-toxic pharmaceutically acceptable addition salts.

The "isomer" of the present invention refers to a stereoisomer and a tautomer.

The stereoisomer means that an enantiomer may be generated when a compound has an asymmetric atom; a cis-trans isomer may be generated when a compound has a double bond or a cyclic structure; all enantiomers, diastereomers, racemic isomers, cis-trans isomers, geometric isomers, epimers and mixtures thereof of the compound of formula (I) are included in the scope of the present invention.

A "tautomer" refers to a functional group isomer generated by rapid movement of an atom in two positions in a molecule, and the tautomer is a special functional group isomer. For example, a tautomer of a carbonyl compound containing α-H is specifically as follows:

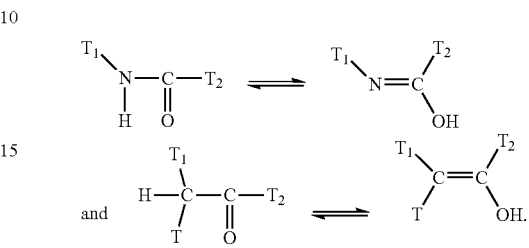

There are other proton migration tautomers, such as enol-keto tautomer, nitroso-oxime tautomer, and imine-enamine tautomer.

T, T1, and T2 are each independently any group that conforms to bonding principles of a compound.

The compound of the present invention contains a lactam structure and has a

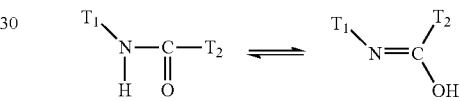

tautomer. When referring to the compound of the present invention, it means that the tautomer of the compound is also mentioned at the same time. The synthesis embodiment of the present invention synthesizes any type of a tautomer, which means that another tautomer configuration is obtained at the same time, both of which can be converted to each other quickly and is in dynamic equilibrium.

The "C atom" of the present invention can be replaced by C(O); and the "S atom" can be replaced by S(O) and S(O)$_2$.

The term "deuterated" of the present invention refers to the replacement of one or more hydrogens in a compound or group with deuterium.

The "mammal" of the present invention refers to a kind of warm-blooded vertebrates in class Mammalia of subphylum Vertebrata that breathe air via a lung, and lactate via mammary glands to suckle their larvae, and can be divided into humans and animals. Examples of animal mammals include, but are not limited to, tigers, leopards, wolves, deer, giraffes, minks, monkeys, orangutans, tapirs, foxes, sloths, bears, koala bears, polar bears, elephants, musk ox, rhinos, manatees, lions, red pandas, pandas, warthogs, antelopes, koalas, lynxes, pangolins, anteaters, otters, dolphins, walruses, seals, whales, platypuses, hedgehogs, kangaroos, hippos, weasels, badger, leopard cats, horses, cows, sheeps, mules, donkeys, dogs, rats, cats, and rabbits.

Excellent Effect of the Present Invention

By means of inhibiting the activity of a PDE9 enzyme, the PDE9 inhibitor compound of the present invention effectively inhibits the degradation of cGMP, increases the level of cGMP, and then activates the protein kinase G (PKG), thereby exerting effects in treating heart failure. Studies have shown that the compound of the present invention can effectively act on the PDE9 enzyme, increase the cGMP content in cardiomyocytes, effectively improve heart function in animal models, reverse myocardial remodeling, thereby exerting effects in treating heart failure.

Clinically, for patients with non-acute suspected heart failure, it is mainly based on the patient's clinical history, symptoms, physical examination, electrocardiogram detection, the level of a natriuretic peptide, and an echocardiogram to exclude or diagnose heart failure. In particular, echocardiogram can provide instant information of ventricular volume, diastolic function, ventricular wall thickness, valve function and pulmonary hypertension, and therefore is widely used in the detection of patients with suspected heart failure. Clinically, for the initial diagnosis of patients with acute heart failure, echocardiogram will also be used to further confirm the condition.

In animal models, heart failure in animals is often characterized by reduced activity, low spirits, reduced diet, accelerated breathing, loose fur, cyanosis, ascites, edema of lower extremity, liver stasis and hematoma, etc. The evaluation indexes are the determination of left ventricular end-stage volume (EDV/ESV), left ventricular systolic pressure (LVSP), left ventricular end diastolic pressure (LVEDP), left ventricular stroke work (SW), stroke volume (SV), rate of pressure change from left ventricular (±dp/dtmax), cardiac output (CO), left ventricular ejection fraction (LVEF), left ventricular mass/volume ratio, etc. through examinations of electrocardiogram, echocardiogram and cardiac catheter, and by means of pathological analysis of myocardial biopsy, etc. Commonly used models are pressure overload HF model, volume overload HF model, weakened myocardial contractility HF model, in vitro HF model, and genetic engineering HF model. The heart failure model caused by myocardial infarction belongs to the heart failure model with weakened myocardial contractility. At the same time, this animal model has a relatively high similarity with patients with heart failure caused by clinical myocardial infarction, and this type of patients are representative among the heart failure population.

The present invention will be described below in conjunction with embodiments. However, these embodiments are not meant to limit the scope of the present invention in any way.

Detailed Description of Embodiments

The abbreviation used herein, "DMF" refers to dimethylformamide; "DIPEA" refers to N,N-diisopropylethylamine; "EA" refers to ethyl acetate; "PE" refers to petroleum ether;

"THF" refers to tetrahydrofuran; "DCM" refers to dichloromethane; "HATU" refers to 2-(7-azabenzotriazol-1-yl)-N,N,N',N'-tetramethyluronium hexafluorophosphate; "AD-mix-β" refers to a mixture containing 0.0016 mol of (DHQD)2PHAL (hydroquinidine 1,4-phthalazinediyl diether), 0.4988 mol of potassium carbonate powder and 0.4988 mol of potassium ferricyanide and 0.0007 mol of potassium osmate dihydrate; "EDCI" refers to 1-(3-dimethylaminopropyl)-3-ethyl carbodiimide hydrochloride; "NBS" refers to N-bromosuccinimide; "AIBN" refers to azodiisobutyronitrile; "TEA" refers to triethylamine.

Preparative Example 1: Synthesis of Intermediate 4,6-dichloro-2-oxo-1,2-dihydro-1,7-diazanaphthalene-3-carbonitrile Step 1: Synthesis of 6-chloro-2H-pyrido[3,4-d][1,3]oxazin-2,4(1H)-dione

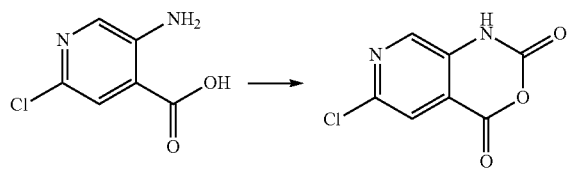 [SMILES: Nc1cnc(Cl)cc1C(=O)O ; O=c1[nH]c2cnc(Cl)cc2c(=O)o1]

5-amino-2-chloroisonicotinic acid (30 g, 0.1738 mol, 1.0 eq) was dissolved in N,N-dimethylformamide (300 mL), N,N'-carbonyldiimidazole (48 g, 0.2955 mol, 1.7 eq) was added batchwise at 0° C., and the reaction solution was slowly warmed to room temperature overnight. LC-MS showed that the reaction was completed, cooled to room temperature and is directly used for the next step without treatment.

Step 2: Synthesis of 6-chloro-4-hydroxyl-2-oxo-1,2-dihydro-1,7-diazanaphthalene-3-carbonitrile

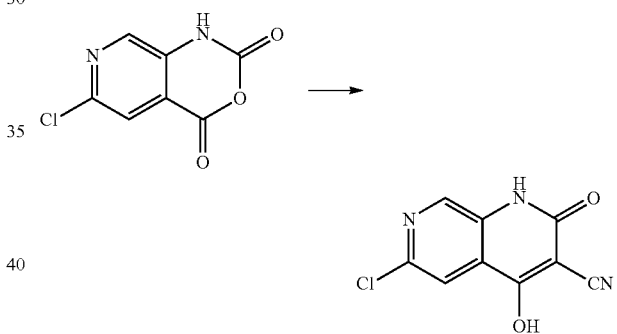

To the above-mentioned reaction solution was added triethylamine (35.182 g, 0.3478 mol, 2 eq) and ethyl cyanoacetate (19.665 g, 0.1738 mol) for a reaction at 150° C. for 3 h. LC-MS detection showed that the reaction was completed. The reaction solution was cooled to room temperature, and concentrated under reduced pressure. Water (200 mL) was added. The pH value was adjusted to 1 with hydrochloric acid (1 mol/L). The reaction solution was stirred for 15 minutes and filtered by suction. The filter cake was washed twice with EA, and dried at 40° C. to obtain a product as a light brick red solid (25.655 g, yield: 66%).

Step 3: Synthesis of 4,6-dichloro-2-oxo-1,2-dihydro-1,7-diazanaphthalene-3-carbonitrile

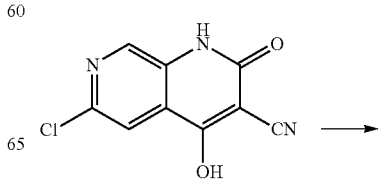

-continued

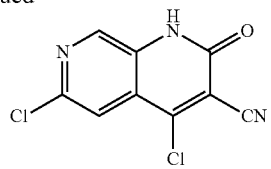

6-chloro-4-hydroxyl-2-oxo-1,2-dihydro-1,7-diazanaphthalene-3-carbonitrile (5.0 g, 0.0226 mol, 1 eq) and phosphorus oxychloride (15 mL) were added to a reaction flask. The reaction flask was put into an oil bath already heated to 100° C. for reaction for about 6 min. The solid started to dissolve slowly, and the color gradually deepened from light yellow. TLC detection showed that the reaction was completed, and cooled to room temperature. An appropriate amount of DCM was added to the flask. The reaction solution was poured into ice water (100 mL), stirred for 10 min, and filtered by suction. The filter cake was washed with methyl tert-butyl ether, drained off, and dried in vacuum at 40° C. to obtain a product as a light yellow solid. The materials were fed in five batches, and a total of 25.655 g (0.1157 mol) of 6-chloro-4-hydroxyl-2-oxo-1,2-dihydro-1,7-diazanaphthalene-3-carbonitrile was fed to obtain 19.486 g of products (yield: 70.1%).

Preparative Example 2: Synthesis of Intermediate 6-ethyl-4 chloro-2-oxo-1,2-dihydro-1,7-diazanaphthalene-3-carbonitrile and 2,4-dichloro-6-ethyl-1,7-diazanaphthalene-3-carbonitrile Step 1: Synthesis of methyl 6-ethyl-3-(cyanoacetamido)-1-pyridin-4-carboxylate

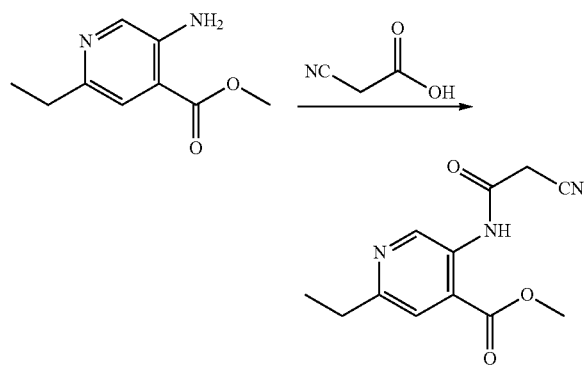

Intermediate methyl 6-ethyl-3-amino-1-pyridin-4-carboxylate (131 g, 727.13 mmol, 1.0 eq) was dissolved in dichloromethane (1.31 L). Cyanoacetic acid (74.22 g, 872.56 mmol, 1.2 eq) was added under ice bath conditions. EDCI (209.07 g, 1090.70 mmol, 1.5 eq) was added batchwise for reaction at 25° C. for 2 hours. LC-MS detection showed that the reaction was completed. H$_2$O (1.5 L) was added to the reaction solution. The liquid was separated. The organic phase was washed with H$_2$O (2×800 mL), dried over anhydrous sodium sulfate, and filtered by suction. The filtrate was concentrated. The crude product was slurried over methyl tert-butyl ether (500 mL) to obtain a product (165 g, yield: 91.78%).

Step 2: Synthesis of 6-ethyl-4-hydroxyl-2-oxo-1,2-dihydro-1,7-diazanaphthalene-3-carbonitrile

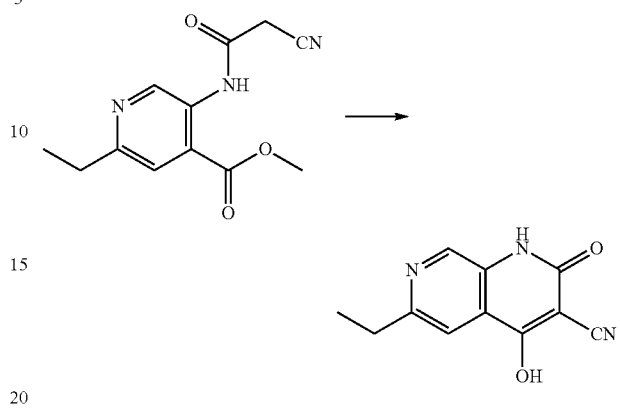

Intermediate methyl 6-ethyl-3-(cyano acetamido)-1-pyridin-4-carboxylate (165 g, 667.34 mmol, 1.0 eq) was dissolved in ethanol (1.65 L). Sodium ethoxide (136.24 g, 2002.62 mmol, 3.0 eq) was added batchwise under ice bath conditions and reacted at 25° C. for 2 hours after the addition. LC-MS detection showed that the reaction was completed. The reaction solution was concentrated, and H$_2$O (1.5 L) was added. The pH value was adjusted to 4 or less under ice bath conditions with concentrated hydrochloric acid. A large quantity of light yellow solid was precipitated. The reaction solution was filtered by suction. The filter cake was dried to obtain a product (138 g, yield: 96.09%).

Step 3: Synthesis of 6-ethyl-4 chloro-2-oxo-1,2-dihydro-1,7-diazanaphthalene-3-carbonitrile and 2,4-dichloro-6-ethyl-1,7-diazanaphthalene-3-carbonitrile

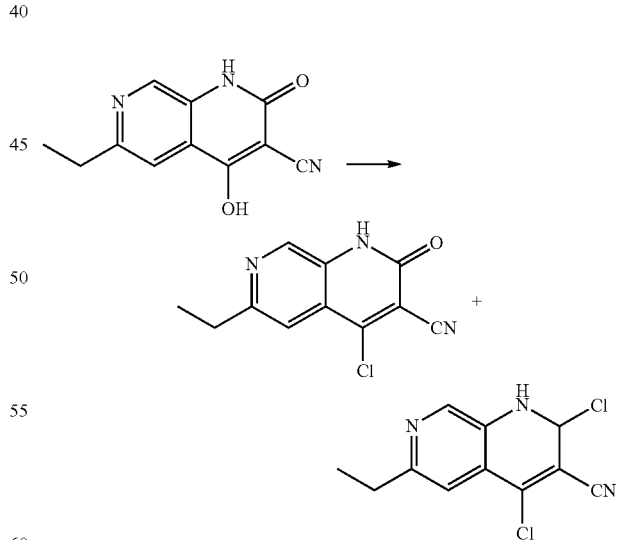

Intermediate 6-ethyl-4-hydroxyl-2-oxo-1,2-dihydro-1,7-diazanaphthalene-3-carbonitrile (605 g, 2.81 mol, 1.0 eq) was dissolved in acetonitrile (3 L), phosphorus oxychloride (1723 g, 11.24 mol, 4.0 eq) was added under an ice bath, and reacted at 100° C. for 2 hours. The reaction solution was cooled down, and concentrated. Acetonitrile (1 L) was added as a dispersing agent. The resulting liquid was poured into ice water. The pH value was adjusted to about 5-6 with a saturated sodium hydroxide solution. A large quantity of yellow solid was precipitated. The remaining liquid was filtered by suction, and dried to obtain a crude product. The crude product was slurried with n-heptane/ethyl acetate (3 L/0.6 L). The mixture was filtered by suction to obtain 6-ethyl-4 chloro-2-oxo-1,2-dihydro-1,7-diazanaphthalene-3-carbonitrile (510 g, yield: 78%).

The filtrate was concentrated. The crude product was purified over silica gel column chromatography (PE:EA=10:1) to obtain 2,4-dichloro-6-ethyl-1,7-diazanaphthalene-3-carbonitrile (50 g, yield: 7%).

Example 1: Synthesis of 6-isopropyl-4-(4-methoxy-4-methylpiperidin-1-yl)-2-oxo-1,2-dihydro-1,7-diazanaphthalene-3-carbonitrile (compound 91)

Step 1: Synthesis of 6-chloro-2H-pyrido[3,4-d][1,3]oxazin-2,4(1H)-dione

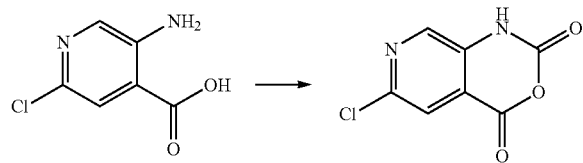 [SMILES: Nc1cnc(Cl)cc1C(=O)O ; O=c1[nH]c2cnc(Cl)cc2c(=O)o1]

5-amino-2-chloroisonicotinic acid (30 g, 0.1738 mol, 1.0 eq) was dissolved in N,N-dimethylformamide (300 mL), N,N'-carbonyldiimidazole (48 g, 0.2955 mol, 1.7 eq) was added batchwise at 0° C., and the reaction solution was slowly warmed to room temperature overnight. LC-MS showed that the reaction was completed, cooled to room temperature and is directly used for the next step without treatment.

Step 2: Synthesis of 6-chloro-4-hydroxyl-2-oxo-1,2-dihydro-1,7-diazanaphthalene-3-carbonitrile

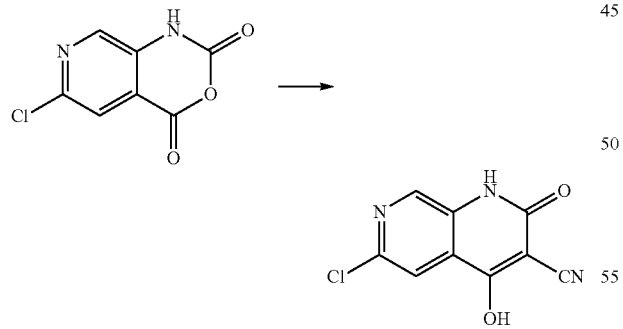

To the above-mentioned reaction solution was added triethylamine (35.182 g, 0.3478 mol, 2 eq) and ethyl cyanoacetate (19.665 g, 0.1738 mol) for a reaction at 150° C. for 3 h. LC-MS detection showed that the reaction was completed. The reaction solution was cooled to room temperature, and concentrated under reduced pressure. Water (200 mL) was added. The pH value was adjusted to 1 with hydrochloric acid (1 mol/L). The reaction solution was stirred for 15 minutes and filtered by suction. The filter cake was washed twice with EA, and dried at 40° C. to obtain a product as a light brick red solid (25.655 g, yield: 66%).

Step 3: Synthesis of 4,6-dichloro-2-oxo-1,2-dihydro-1,7-diazanaphthalene-3-carbonitrile

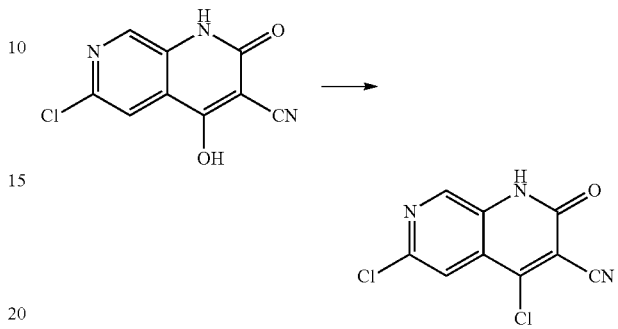

6-chloro-4-hydroxyl-2-oxo-1,2-dihydro-1,7-diazanaphthalene-3-carbonitrile (5.0 g, 0.0226 mol, 1 eq) and phosphorus oxychloride (15 mL) were added to a reaction flask. The reaction flask was put into an oil bath already heated to 100° C. for reaction for about 6 min. The solid started to dissolve slowly, and the color gradually deepened from light yellow. TLC detection showed that the reaction was completed, and cooled to room temperature. An appropriate amount of DCM was added to the flask. The reaction solution was poured into ice water (100 mL), stirred for 10 min, and filtered by suction. The filter cake was washed with methyl tert-butyl ether, drained off, and dried in vacuum at 40° C. to obtain a product as a light yellow solid. The materials were fed in five batches, and a total of 25.655 g (0.1157 mol) of 6-chloro-4-hydroxyl-2-oxo-1,2-dihydro-1,7-diazanaphthalene-3-carbonitrile was fed to obtain 19.486 g of products (yield: 70.1%).

Step 4: Synthesis of 6-chloro-4-(4-methoxy-4-methylpiperidin-1-yl)-2-oxo-1,2-dihydro-1,7-diazanaphthalene-3-carbonitrile

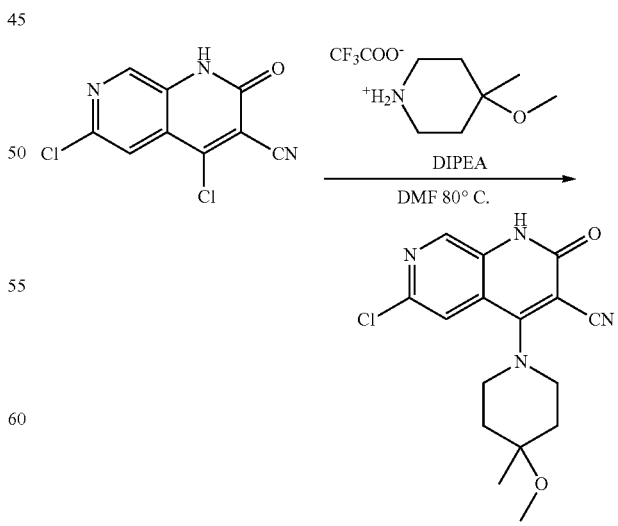

Intermediate 4,6-dichloro-2-oxo-1,2-dihydro-1,7-diazanaphthalene-3-carbonitrile (2.0 g, 8.33 mmol, 1.0 eq) was dissolved in DMF (10 mL), and DIPEA(6.45 g, 50 mmol, 6.0 eq) and 4-methoxy-4-methylpiperidine trifluoroacetate (2.2 g, 9.16 mmol, 1.1 eq) were added and reacted at 80° C. for 2 hours. LC-MS detection showed that the reaction was completed. Water (10 mL) was added, and dichloromethane (10 mL×3) was used for extraction. The organic phase was washed with water (10 mL×3), dried over anhydrous sodium sulfate, filtered, and concentrated under reduced pressure to obtain a product as a yellow solid (2.7 g crude).

Step 5: Synthesis of 4-(4-methoxy-4-methylpiperidin-1-yl)-2-oxo-6-(prop-1-en-2-yl)-1,2-dihydro-1,7-diazanaphthalene-3-carbonitrile

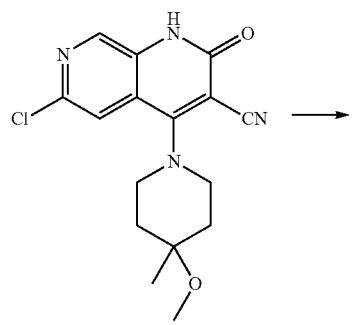

Step 6: Synthesis of 6-isopropyl-4-(4-methoxy-4-methylpiperidin-1-yl)-2-oxo-1,2-dihydro-1,7-diazanaphthalene-3-carbonitrile

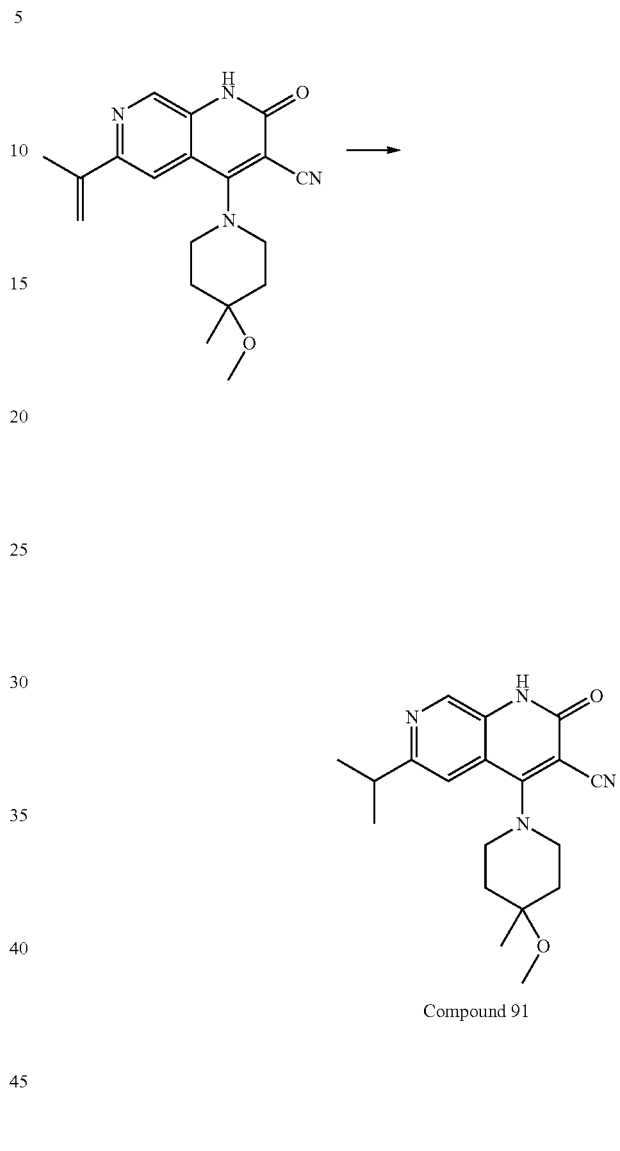

Compound 91

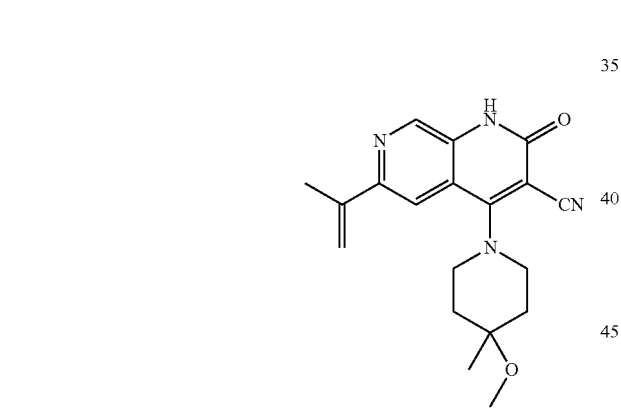

Intermediate 6-chloro-4-(4-methoxy-4-methylpiperidin-1-yl)-2-oxo-1,2-dihydro-1,7-diazanaphthalene-3-carbonitrile (500 mg, 1.5 mmol, 1.0 eq) was dissolved in 1,4-dioxane (5 mL) and H$_2$O (1 mL). Trifluoro (prop-1-en-2-yl) potassium borate (668 mg, 4.5 mmol, 3.0 eq) and cesium carbonate (1.466 g, 4.5 mmol, 3.0 eq) were added. [1,1'-bis(diphenylphosphino) ferrocene]palladium dichloride (110 mg, 0.15 mmol, 0.1 eq) was added under nitrogen protection and reacted at 100° C. for 12 hours. LC-MS detection showed that the reaction was completed. Water (20 mL) was added. Ethyl acetate (20 mL×3) was used for extraction. The organic phase was dried with anhydrous sodium sulfate, and filtered. The filtrate was concentrated under reduced pressure, and the crude product was purified over silica gel column chromatography (DCM:MeOH=50:1) to obtain a product (390 mg, yield: 76.9%).

Intermediate 4-(4-methoxy-4-methylpiperidin-1-yl)-2-oxo-6-(prop-1-en-2-yl)-1,2-dihydro-1,7-diazanaphthalene-3-carbonitrile (390 mg, 1.15 mmol, 1.0 eq) was dissolved in methanol (10 mL). Pd/C (100 mg) was added, and reacted for 12 hours under hydrogen. LC-MS detection showed that the reaction was completed. The reaction solution was filtered by suction. The filtrate was concentrated under reduced pressure. The crude product was slurried with methyl tert-butyl ether. The resulting solution is filtered by suction. The crude product was then separated over preparative thin layer chromatography (DCM:MeOH=15:1) to obtain a product (100 mg, yield: 25.6%).

$^1$H NMR (400 MHz, DMSO-d$_6$) δ (ppm): 11.82 (s, 1H), 8.61 (s, 1H), 7.38 (s, 1H), 3.60-3.61 (m, 4H), 3.19 (s, 3H), 3.06-3.13 (m, 1H), 1.90-1.93 (m, 2H), 1.75-1.82 (d, 2H), 1.26 (s, 9H).

Molecular formula: C$_{19}$H$_{24}$N$_4$O$_2$ Molecular weight: 340.43 LC-MS (Pos, m/z)=341.19[M+H]$^+$.

Example 2: Synthesis of 4-(4-methoxy-4-methylpiperidin-1-yl)-2-oxo-6-vinyl-1,2-dihydro-1,7-diazanaphthalene-3-carbonitrile (Compound 70)

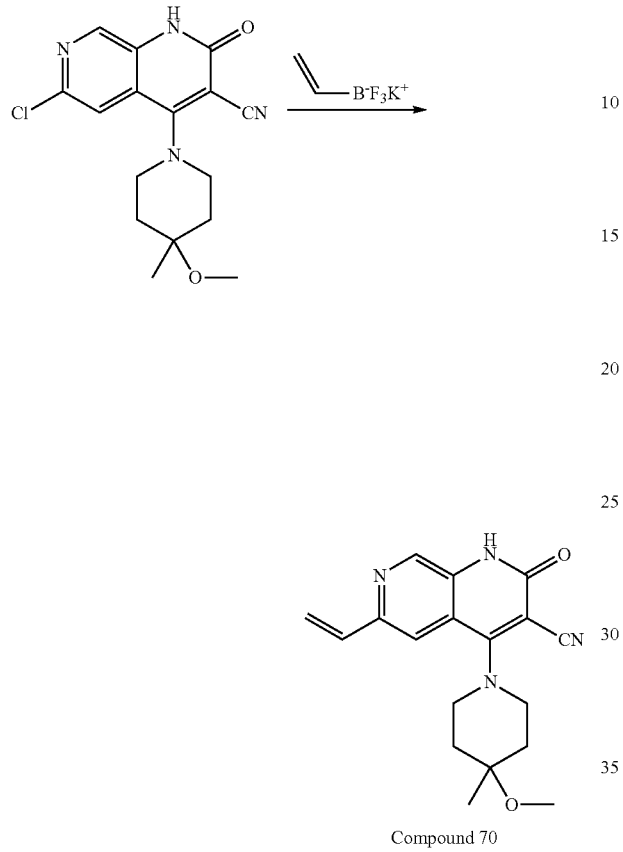

Compound 70

Intermediate 6-chloro-4-(4-methoxy-4-methylpiperidin-1-yl)-2-oxo-1,2-dihydro-1,7-diazanaphthalene-3-carbonitrile (20.1 g, 60.40 mmol, 1.0 eq) was dissolved in 1,4-dioxane (600 mL) and H$_2$O (150 mL). Trifluoro(vinyl)potassium borate (12.14 g, 90.6 mmol, 1.5 eq), cesium carbonate (58 g, 181.2 mmol, 3.0 eq) and [1,1'-bis(diphenylphosphino)ferrocene]palladium dichloride (4.4 g, 6.04 mmol, 1.0 eq) were added, and reacted at 100° C. for 8 hours under nitrogen protection. LC-MS detection showed that the reaction was completed. Water (20 mL) was added. Dichloromethane (30 mL×3) was used for extraction. The organic phase was washed with water (10 mL×3), dried over anhydrous sodium sulfate, filtered, and concentrated under reduced pressure. The crude product was purified over silica gel column chromatography (DCM:MeOH=50:1) to obtain a product (14.63 g, yield: 74%).

$^1$H NMR (400 MHz, DMSO-d$_6$) δ (ppm): 12.03 (s, 1H), 8.64 (s, 1H), 7.56 (s, 1H), 6.89-6.96 (m, 1H), 6.15-6.19 (m, 1H), 5.39-5.42 (m, 1H), 3.61-3.64 (m, 4H), 3.19 (s, 3H), 1.77-1.93 (m, 4H), 1.21 (s, 3H).

Molecular formula: C$_{18}$H$_{20}$N$_4$O$_2$ Molecular weight: 324.38 LC-MS (Pos, m/z)=325.16 [M+H]+.

Example 3: Synthesis of 6-(1-hydroxyethyl)-4-(4-methoxy-4-methylpiperidin-1-yl)-2-oxo-1,2-dihydro-1,7-diaza naphthalene-3-carbonitrile (compound 63)

Step 1: Synthesis of 6-(1,2-dihydroxyethyl)-4-(4-methoxy-4-methylpiperidin-1-yl)-2-oxo-1,2-dihydro-1,7-diaza naphthalene-3-carbonitrile

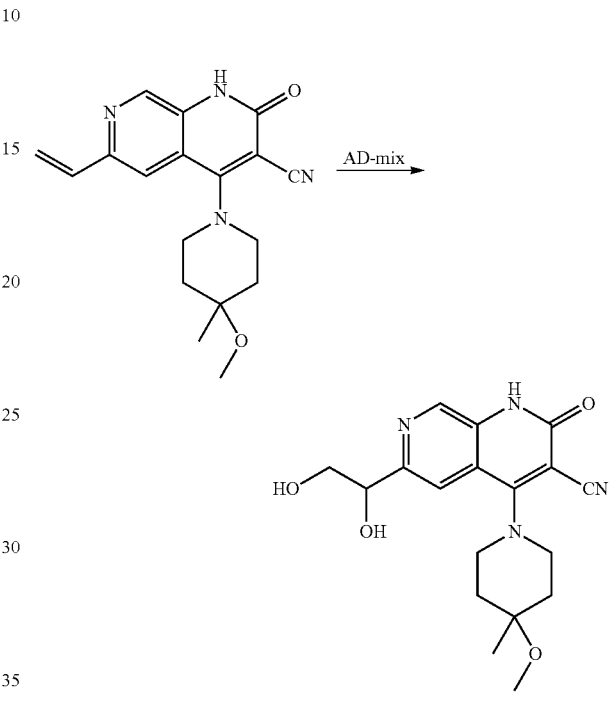

Intermediate 4-(4-methoxy-4-methylpiperidin-1-yl)-2-oxo-6-vinyl-1,2-dihydro-1,7-diazanaphthalene-3-carbonitrile (500 mg, 1.542 mmol, 1.0 eq) was dissolved in tertiary butanol (10 mL) and water (10 mL). Methanesulfonamide (147 mg, 1.542 mmol, 1.0 eq) and AD-mix-β (6.0 g) were added, and reacted at normal temperature for 12 hours. LC-MS detection showed that the reaction was completed. Water (10 mL) was added. Dichloromethane (30 mL×3) was used for extraction. The organic phase was dried with anhydrous sodium sulfate, filtered and concentrated under reduced pressure to obtain a product (552 mg, yield: 100%).

Step 2: Synthesis of 6-formyl-4-(4-methoxy-4-methylpiperidin-1-yl)-2-oxo-1,2-dihydro-1,7-diazanaphthalene-3-carbonitrile

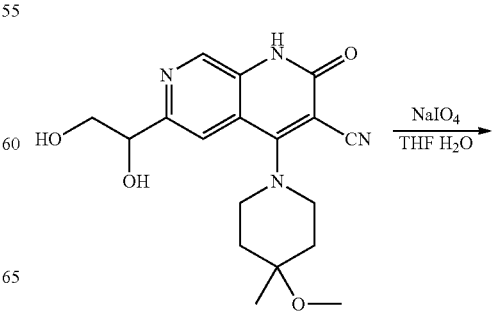

-continued

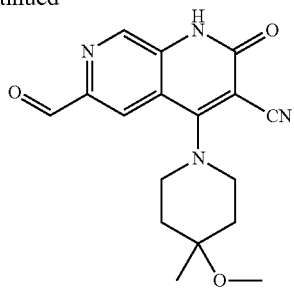

Intermediate 6-(1,2-dihydroxyethyl)-4-(4-methoxy-4-methylpiperidin-1-yl)-2-oxo-1,2-dihydro-1,7-diaza naphthalene-3-carbonitrile (552 mg, 1.542 mmol, 1.0 eq) was dissolved in tetrahydrofuran (10 mL) and water (2 mL). Sodium periodate (650 mg, 3.084 mmol, 2.0 eq) was added and reacted for 4 hours. LC-MS detection showed that the reaction was completed. Water (10 mL) was added. Ethyl acetate (20 mL×3) was used for extraction. The organic phase was dried with anhydrous sodium sulfate, filtered, and concentrated under reduced pressure, and the crude product was purified over silica gel column chromatography (DCM:MeOH=60:1) to obtain a product as a yellow solid (160 g, two-step yield: 32%).

Step 3: Synthesis of 6-(1-hydroxyethyl)-4-(4-methoxy-4-methylpiperidin-1-yl)-2-oxo-1,2-dihydro-1,7-diazanaphthalene-3-carbonitrile

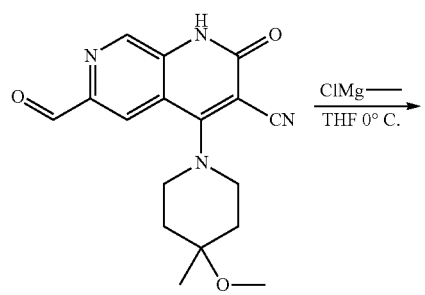

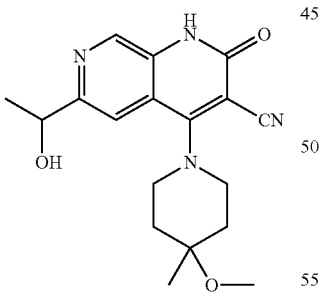

Compound 63

Intermediate 6-formyl-4-(4-methoxy-4-methylpiperidin-1-yl)-2-oxo-1,2-dihydro-1,7-diazanaphthalene-3-carbonitrile (160 mg, 0.49 mmol, 1.0 eq) was dissolved in tetrahydrofuran (5 mL). Methylmagnesium chloride (1 mL) was added dropwise at 0° C., and reacted for 1 hour. LC-MS detection showed that the reaction was completed. Water (10 mL) was added. Ethyl acetate (20 mL×3) was used for extraction. The organic phase was dried with anhydrous sodium sulfate, filtered, and concentrated under reduced pressure, and the crude product was purified over silica gel column chromatography (DCM:MeOH=40:1) to obtain a product (108 mg, yield: 64%).

$^1$H NMR (400 MHz, DMSO-d$_6$) δ (ppm): 11.93 (s, 1H), 8.58 (s, 1H), 7.72 (s, 1H), 5.48-5.49 (d, 1H), 4.75-4.81 (m, 1H), 3.56-3.65 (m, 4H), 3.20 (s, 3H), 1.91-1.95 (m, 2H), 1.73-1.79 (m, 2H), 1.38-1.40 (d, 3H), 1.23 (s, 3H).

Molecular formula: $C_{18}H_{22}N_4O_3$ Molecular weight: 342.40 LC-MS (Pos, m/z)=343.17 [M+H]$^+$ 0.3925 g of compound 63 was dissolved in methanol to form a solution with a concentration of 2 mg/ml, and Shimadzu LC-20AD was used to prepare a liquid phase for separation of enantiomers. The separation conditions were as follows: the compounds obtained from the corresponding components in 6 minutes and 12 minutes were collected, respectively. The compound obtained from the corresponding component in 6 minutes was compound A, and the compound obtained from the corresponding component in 12 minutes was compound B. The solvent was removed by rotary evaporation to obtain 0.1814 g of compound A and 0.1984 g of compound B, respectively. Compounds A and B are enantiomers, and the structures thereof are as follows, when compound A is one of the structures, compound B is the other:

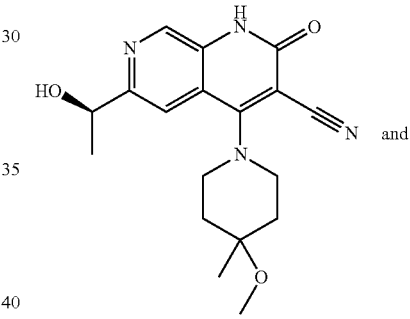 and

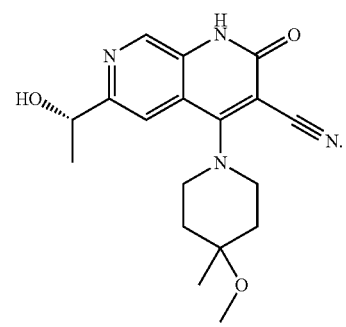

Example 4: Synthesis of 6-(2-hydroxypropan-2-yl)-4-(4-methoxy-4-methylpiperidin-1-yl)-2-oxo-1,2-dihydro-1,7-diazanaphthalene-3-carbonitrile (Compound 64)

Step 1: Synthesis of 6-acetyl-4-(4-methoxy-4-methylpiperidin-1-yl)-2-oxo-1,2-dihydro-1,7-diazanaphthalene-3-carbonitrile

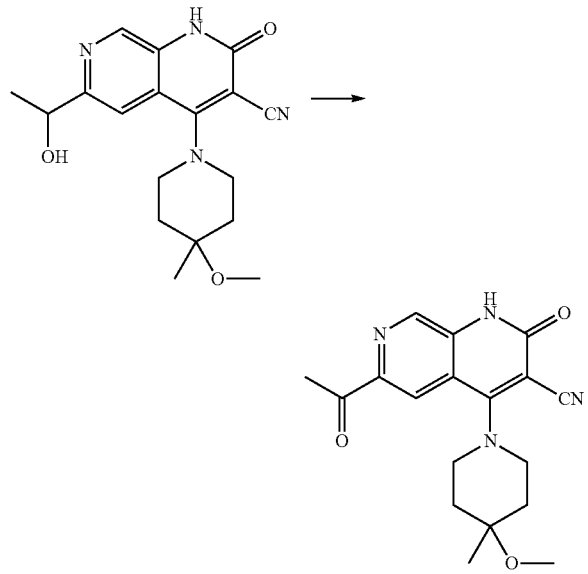

Intermediate 6-(1-hydroxyethyl)-4-(4-methoxy-4-methylpiperidin-1-yl)-2-oxo-1,2-dihydro-1,7-diazanaphthalene-3-carbonitrile (187 mg, 0.55 mmol, 1.0 eq) was dissolved in dry dichloromethane (5 mL), and cooled down to 0 to 5° C. Dess-martin periodinane (463.5 mg, 1.10 mmol, 2.0 eq) was added, and naturally warmed to room temperature and reacted for 2 h after the addition. TLC was used to monitor the completion of the reaction. The reaction solution was concentrated under reduced pressure. The crude product was purified over silica gel column chromatography (MeOH:DCM=1:100 to 1:50) to obtain a product (185.8 mg, yield: 100%).

Step 2: Synthesis of 6-(2-hydroxypropan-2-yl)-4-(4-methoxy-4-methylpiperidin-1-yl)-2-oxo-1,2-dihydro-1,7-diazanaphthalene-3-carbonitrile

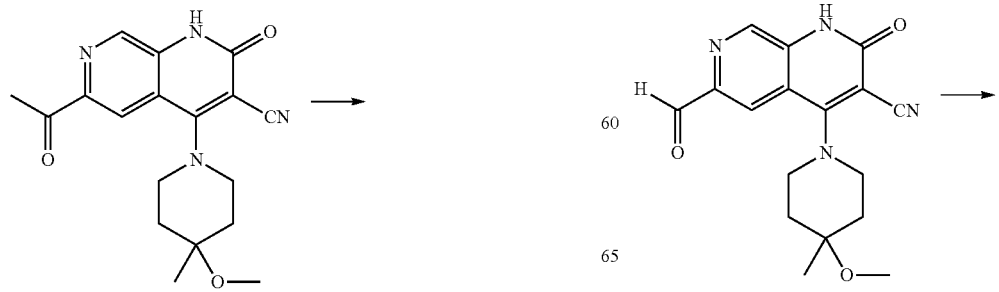

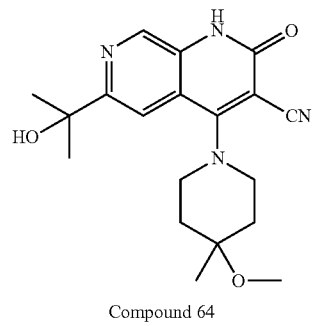

Compound 64

Intermediate 6-acetyl-4-(4-methoxy-4-methylpiperidin-1-yl)-2-oxo-1,2-dihydro-1,7-diazanaphthalene-3-carbonitrile (185.8 mg, 0.55 mmol, 1.0 eq) was dissolved in N,N-dimethylacetamide (3 mL), and cooled down to −10 to 0° C. 3 mol/L of methylmagnesium chloride tetrahydrofuran solution (0.6 mL, 3.0 eq) was added dropwise under nitrogen protection, and naturally warmed to room temperature and stirred overnight after the addition. TCL detection showed that a large quantity of raw materials remained. 3 mol/L of methylmagnesium chloride tetrahydrofuran solution (0.6 mL, 3.0 eq) was further added and reacted for 3 h, and then 3 mol/L of methylmagnesium chloride tetrahydrofuran solution (0.6 mL, 3.0 eq) was added again and reacted for 2 h. The reaction was cooled down to 0 to 10° C. The pH value was adjusted to 5-6 with acetic acid. The reaction was concentrated. The crude product was purified over silica gel column chromatography (MeOH:DCM=1:100 to 1:70) to obtain a product (63.9 mg, yield: 32.8%).

$^1$H NMR (400 MHz, DMSO-d$_6$) δ (ppm): 11.91 (s, 1H), 8.59 (s, 1H), 7.89 (s, 1H), 5.35 (s, 1H), 3.62-3.60 (m, 4H), 3.20 (s, 3H), 1.95-1.92 (m, 2H), 1.80-1.73 (m, 2H), 1.45 (s, 6H), 1.23 (s, 3H).

Molecular formula: $C_{19}H_{24}N_4O_3$ Molecular weight: 356.43 LC-MS (Pos, m/z)=357.25 [M+H]$^+$.

Example 5: Synthesis of 6-(cyclopropyl(hydroxyl)methyl)-4-(4-methoxy-4-methylpiperidin-1-yl)-2-oxo-1,2-dihydro-1,7-diazanaphthalene-3-carbonitrile (Compound 68)

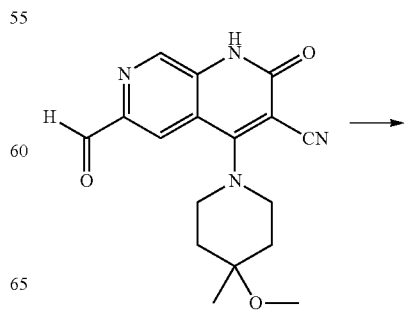

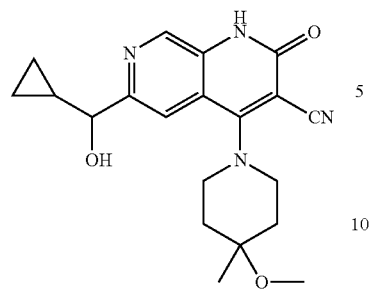

Compound 68

Intermediate 6-formyl-4-(4-methoxy-4-methylpiperidin-1-yl)-2-oxo-1,2-dihydro-1,7-diazanaphthalene-3-carbonitrile (500 mg, 1.53 mmol, 1.0 eq) was dissolved in dry tetrahydrofuran (20 mL), and cooled down to −10° C. under nitrogen protection. 1 mol/L solution of cyclopropyl magnesium bromide in tetrahydrofuran (4.6 mL, 4.60 mmol, 3 eq) was added dropwise, and reacted at 0° C. for 3 h after the addition. LC-MS detection showed that 20% raw materials remained. Then 1 mol/L solution of cyclopropyl magnesium bromide in tetrahydrofuran (3 mL, 3 mmol, 2 eq) was added and reacted for 2-3 h. LC-MS detection showed that 10% raw materials remained. Acetic acid was added dropwise until pH of about 5 to 6. Concentration was performed under reduced pressure. The crude product was purified over silica gel column chromatography (MeOH:DCM=1:100-1:40) to obtain a product (225.7 mg, yield: 40.0%).

$^1$H NMR (400 MHz, DMSO-$d_6$) δ (ppm): 11.93 (s, 1H), 8.59 (s, 1H), 7.68 (s, 1H), 5.42-5.40 (d, 1H), 4.24-4.22 (m, 1H), 3.63-3.60 (m, 4H), 3.19 (s, 3H), 1.95-1.91 (m, 2H), 1.79-1.72 (m, 2H), 1.23 (s, 3H), 1.23 (s, 1H), 0.42 (m, 4H).

Molecular formula: $C_{20}H_{24}N_4O_3$ Molecular weight: 368.44 LC-MS (Pos, m/z)=369.40 [M+H]$^+$.

Example 6: Synthesis of 3-cyano-4-(4-methoxy-4-methylpiperidin-1-yl)-N-methyl-2-oxo-1,2-dihydro-1,7-naphthyridin-6-carboxamide (Compound 69)

Step 1: Synthesis of 3-cyano-4-(4-methoxy-4-methylpiperidin-1-yl)-2-oxo-1,2-dihydro-1,7-diazanaphthalene-6-carboxylic Acid

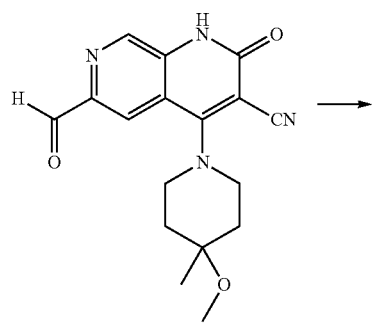

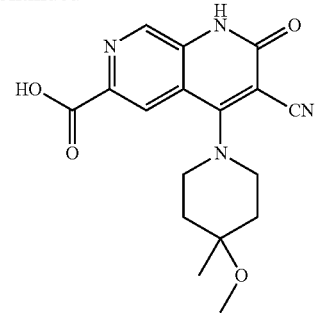

Intermediate 6-formyl-4-(4-methoxy-4-methylpiperidin-1-yl)-2-oxo-1,2-dihydro-1,7-diazanaphthalene-3-carbonitrile (681 mg, 2.09 mmol, 1.0 eq) was dissolved in formic acid (5 mL) and cooled down to −5 to 0° C. 30% Hydrogen peroxide (1.32 mL, 10.44 mmol, 5 eq) was added, and reacted at 0° C. for 12 h after the addition, and then 30% hydrogen peroxide (1.32 mL, 10.44 mmol, 5 eq) was further added, and reacted at room temperature for 2-3 h. TLC was used to monitor the completion of reaction. The reaction solution was poured into methyl tert-butyl ether (50 mL) solution. A light yellow solid was precipitated, and the resulting reaction solution was filtered. The filter cake was dried to obtain a product (300 mg, yield: 42.0%).

Step 2: Synthesis of 3-cyano-4-(4-methoxy-4-methylpiperidin-1-yl)-N-methyl-2-oxo-1,2-dihydro-1,7-naphthyridin-6-carboxamide

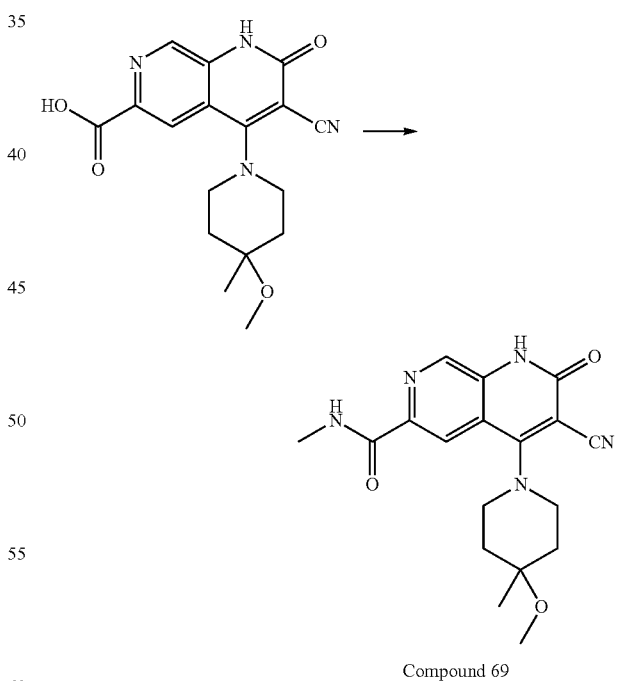

Compound 69

Intermediate 3-cyano-4-(4-methoxy-4-methylpiperidin-1-yl)-2-oxo-1,2-dihydro-1,7-diazanaphthalene-6-carboxylic acid (300 mg, 0.88 mmol, 1.0 eq) was dissolved in anhydrous N,N-dimethylacetamide (3 mL). DIPEA (565.8 mg, 4.38 mmol, 5.0 eq) was added, and cooled down to 0° C. after the completion of addition. HATU (499.7 mg, 1.31 mmol, 1.5 eq) was added, and stirred at room temperature for 0.5-1 h. Then methylamine hydrochloride (118.2 mg, 1.75 mmol, 2.0 eq) was added, and reacted at room temperature for 1 h. Solids were precipitated. TLC was used to monitor the completion of reaction. Water (50 mL) was added and stirred for 5 min. The resulting solution was filtered. The filter cake was drip-washed with water, added to ethyl acetate (10 mL) and heated to reflux for 1 h. Filtration was performed while the solution was still warm, and the filter cake was dried to obtain a product (199 mg, yield: 63.8%).

$^1$H NMR (400 MHz, DMSO-d$_6$) δ (ppm): 12.21 (s, 1H), 8.74-8.73 (s, 1H), 8.64 (s, 1H), 8.27 (s, 1H), 3.64-3.62 (m, 4H), 3.20 (s, 3H), 2.84-2.83 (d, 3H), 1.96 (m, 1H), 1.93 (m, 1H), 1.79-1.77 (m, 2H), 1.24 (s, 3H).

Molecular formula: $C_{18}H_{21}N_5O_3$ Molecular weight: 355.40 LC-MS (Pos, m/k)=356.26 [M+H]$^+$.

Example 7: Synthesis of N-(2-aminoethyl)-3-cyano-4-(4-methoxy-4-methylpiperidin-1-yl)-2-oxo-1,2-dihydro-1,7-diazanaphthalene-6-carboxamide (Compound 74) Hydrochloride Step 1: Synthesis of (2-(3-cyano-4-(4-methoxy-4-methylpiperidin-1-yl)-2-oxo-1,2-dihydro-1,7-diazanaphthalene-6-carboxamido) ethyl) tert-butyl carbamate

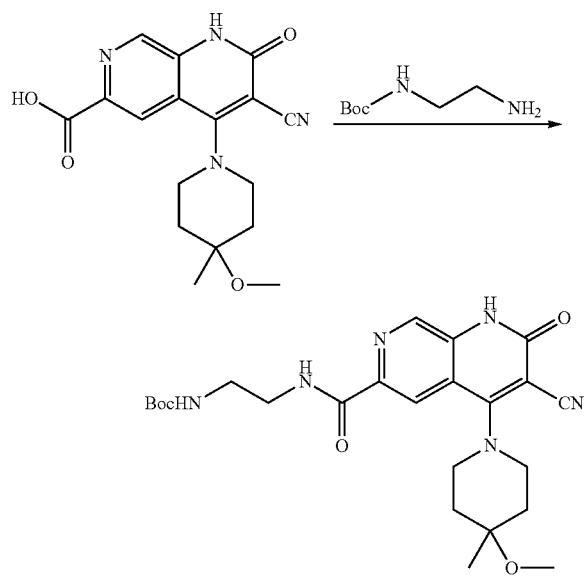

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq), HATU (333 mg, 0.88 mmol, 1.5 eq) and DIPEA (376 mg, 1.76 mmol, 3.0 eq) were dissolved in DMAC (2 mL), and stirred for 30 min at normal temperature. Then (2-aminoethyl) tert-butyl carbamate (281 mg, 1.76 mmol, 2.0 eq) was added, and reacted for 1 h at normal temperature. LC-MS detection showed that the reaction was completed. Water (10 mL) was added. Dichloromethane (10 mL×3) was used for extraction. The organic phase was washed with water (10 mL×3), dried over anhydrous sodium sulfate, filtered, and concentrated under reduced pressure. The crude product was purified over silica gel column chromatography (DCM:MeOH=30:1) to obtain a product (220 mg, yield: 78.3%).

Step 2: Synthesis of N-(2-aminoethyl)-3-cyano-4-(4-methoxy-4-methylpiperidin-1-yl)-2-oxo-1,2-dihydro-1,7-diazanaphthalene-6-carboxamide Hydrochloride

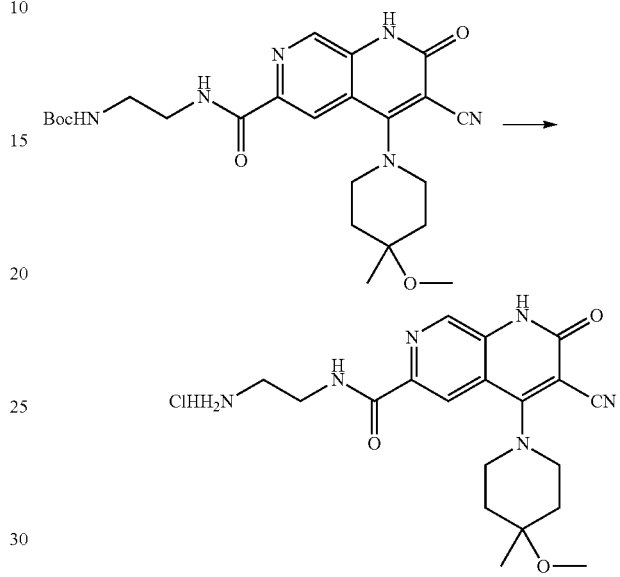

Hydrochloride of Compound 74

Intermediate (2-(3-cyano-4-(4-methoxy-4-methylpiperidin-1-yl)-2-oxo-1,2-dihydro-1,7-diazanaphthalene-6-carboxamido) ethyl) tert-butyl carbamate (220 mg, 0.45 mmol, 1.0 eq) was dissolved in methanol (3 mL). Hydrogenchloride ethanol solution (25%, 2 mL) was added, and reacted for 2 h at normal temperature. TLC detection showed that the reaction was completed. A solid was precipitated. The resulting solution was filtered. The filter cake was dried to obtain a product (150 mg, yield: 79%).

$^1$HNMR (400 MHz, DMSO-d$_6$) δ (ppm): 12.28 (s, 1H), 9.01-9.03 (m, 1H), 8.68 (s, 1H), 8.29 (s, 1H), 7.91 (s, 3H), 3.55-3.64 (m, 6H), 3.21 (s, 3H), 3.00-3.02 (m, 2H), 1.94-1.97 (d, 2H), 1.73-1.80 (d, 2H), 1.24 (s, 3H).

Molecular formula: $C_{19}H_{24}N_6O_3$ Molecular weight: 384.44 LC-MS (Pos, m/z)=385.19 [M+H]+.

Example 8: Synthesis of 3-cyano-N-(2-(dimethylamino) ethyl)-4-(4-methoxy-4-methylpiperidin-1-yl)-2-oxo-1,2-dihydro-1,7-naphthyridin-6-carboxamide (Compound 75)

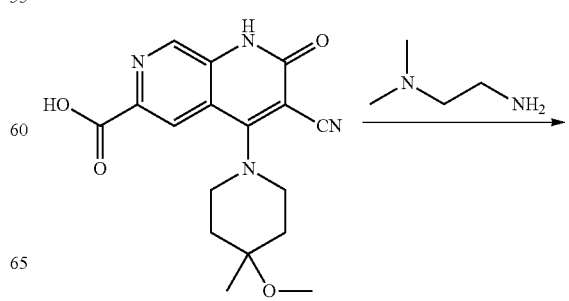

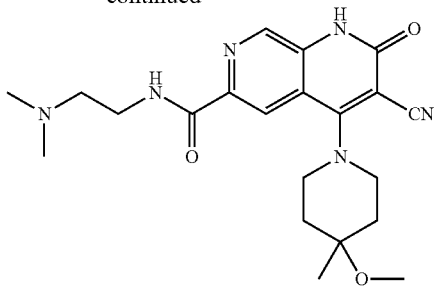

Compound 75

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq), HATU (333 mg, 0.88 mmol, 1.5 eq) and DIPEA (226 mg, 1.76 mmol, 3.0 eq) were dissolved in DMAC (2 mL), and stirred for 30 min at normal temperature. Then N,N-dimethyl ethylene diamine (103 mg, 1.16 mmol, 2.0 eq) was added, and reacted for 1 h at normal temperature. LC-MS detection showed that the reaction was completed. Water (10 mL) was added. Dichloromethane (10 mL×3) was used for extraction. The organic phase was washed with water (10 mL×3), dried over anhydrous sodium sulfate, filtered, and concentrated under reduced pressure. The crude product was purified over silica gel column chromatography (DCM:MeOH=20:1) to obtain a product (86 mg, yield: 36%).

$^1$HNMR (400 MHz, DMSO-$d_6$) δ (ppm): 12.20 (s, 1H), 8.79 (s, 1H), 8.66 (s, 1H), 8.28 (s, 1H), 3.62-3.64 (d, 4H), 3.50-3.51 (d, 2H), 3.21 (s, 3H), 2.76 (s, 2H), 2.44 (s, 6H), 1.94-1.97 (d, 2H), 1.74-1.81 (m, 2H), 1.25 (s, 3H).

Molecular formula: $C_{21}H_{28}N_6O_3$ Molecular weight: 412.49 LC-MS (Pos, m/z)=413.22 [M+H]$^+$.

Example 9: Synthesis of 3-cyano-4-(4-methoxy-4-methylpiperidin-1-yl)-2-oxo-N-(2-(pyrrolidin-1-yl)ethyl)-1,2-dihydro-1,7-diazanaphthalene-6-carboxamide (Compound 76)

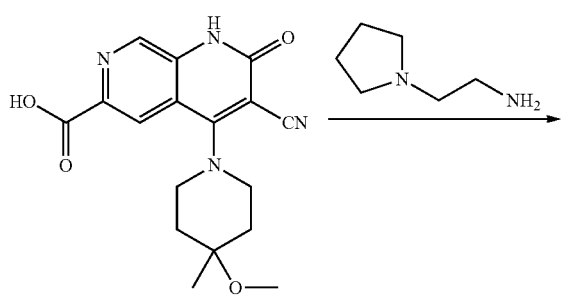

Compound 76

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq), HATU (333 mg, 0.88 mmol, 1.5 eq) and DIPEA (226 mg, 1.76 mmol, 3.0 eq) were dissolved in DMAC (2 mL), and stirred for 30 min at normal temperature. Then 2-(pyrrolidin-1-yl)ethan-1-amine (134 mg, 1.16 mmol, 2.0 eq) was added, and reacted for 1 h at normal temperature. LC-MS detection showed that the reaction was completed. Water (10 mL) was added. Dichloromethane (10 mL×3) was used for extraction. The organic phase was washed with water (10 mL×3), dried over anhydrous sodium sulfate, filtered, and concentrated under reduced pressure. The crude product was purified over silica gel column chromatography (DCM:MeOH=20:1) to obtain a product (106 mg, yield: 41%).

$^1$HNMR (400 MHz, DMSO-$d_6$) δ (ppm): 12.26 (s, 1H), 9.08-9.11 (m, 1H), 8.67 (s, 1H), 8.30 (s, 1H), 3.63-3.64 (d, 8H), 3.06-3.20 (m, 6H), 1.73-1.98 (m, 9H), 1.25 (s, 3H).

Molecular formula: $C_{23}H_{30}N_6O_3$ Molecular weight: 438.53 LC-MS (Pos, m/z)=439.24[M+H]$^+$.

Example 10: Synthesis of 3-cyano-4-(4-methoxy-4-methylpiperidin-1-yl)-N-((1-methylpiperidin-4-yl)methyl)-2-oxo-1,2-dihydro-1,7-diazanaphthalene-6-carboxamide (Compound 77) Trifluoroacetate

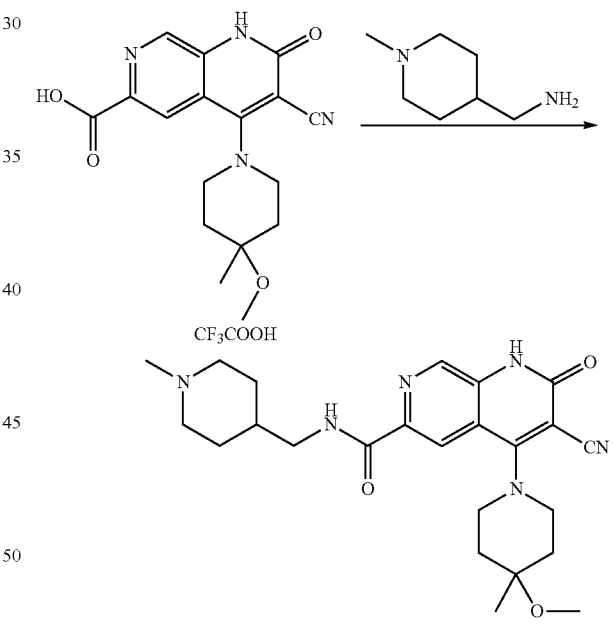

Trifluoroacetate of compound 77

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq) was dissolved in anhydrous N,N-dimethylacetamide (2 mL). DIPEA (226.3 mg, 1.75 mmol, 3.0 eq) and HATU (333.1 mg, 0.88 mmol, 1.5 eq) were added, and stirred for 0.5 to 1 h at room temperature. (1-methylpiperidin-4-yl)methylamine (150 mg, 1.17 mmol, 2.0 eq) was added, and reacted for 1 h at room temperature. LC-MS detection showed that raw materials remained. (1-methylpiperidin-4-yl)methylamine (150 mg, 1.17 mmol, 2.0 eq) was further added, and reaction was continued for 2 h. The crude product was purified over preparative HPLC (0.1% aqueous trifluoroacetic acid solution:acetonitrile=70:30) to obtain a product (68.8 mg, yield: 20.7%).

$^1$H NMR (400 MHz, DMSO-d$_6$) δ (ppm): 12.22 (s, 1H), 9.00-8.99 (s, 1H), 8.95-8.94 (s, 1H), 8.65 (s, 1H), 8.28 (s, 1H), 3.63-3.62 (m, 4H), 3.43-3.40 (m, 2H), 3.23 (s, 3H), 2.95-2.83 (m, 2H), 2.75-2.74 (m, 2H), 1.97-1.94 (m, 2H), 1.85-1.80 (m, 2H), 1.78-1.75 (m, 3H), 1.24 (s, 3H).

Molecular formula: C$_{24}$H$_{32}$N$_6$O$_3$ Molecular weight: 452.56 LC-MS (Pos, m/z)=453.45 [M+H]$^+$.

Example 11: Synthesis of 3-cyano-4-(4-methoxy-4-methylpiperidin-1-yl)-N-(1-methyl azetidin-3-yl)-2-oxo-1,2-dihydro-1,7-diazanaphthalene-6-carboxamide (Compound 78) Trifluoroacetate

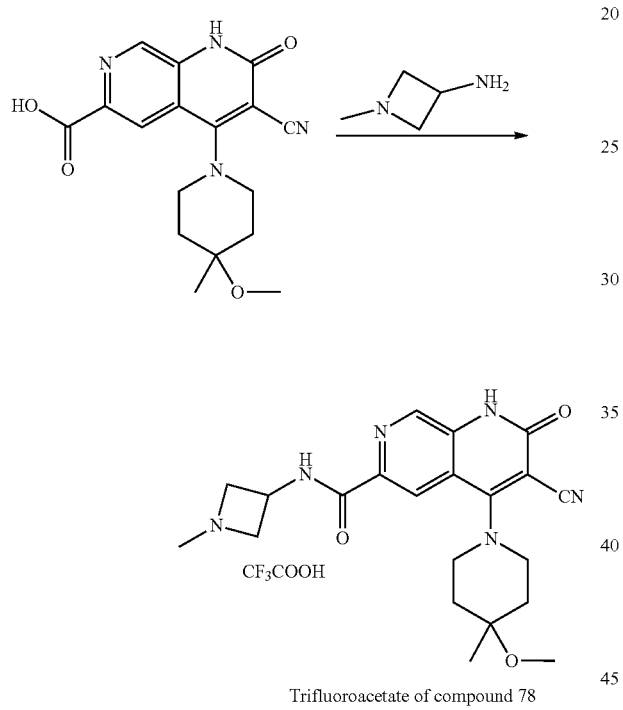

Trifluoroacetate of compound 78

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq) was dissolved in anhydrous N,N-dimethylacetamide (2 mL). DIPEA (226.3 mg, 1.75 mmol, 3.0 eq) and HATU (333.1 mg, 0.88 mmol, 1.5 eq) were added, and stirred for 0.5 to 1 h at room temperature. 1-methyl azetidin-3-amine (100.6 mg, 1.17 mmol, 2.0 eq) was added, and reacted at room temperature for 12 h. The crude product was purified over preparative HPLC (0.1% aqueous trifluoroacetic acid solution:acetonitrile=70:30) to obtain a product (113.13 mg, yield: 37.1%).

$^1$H NMR (400 MHz, DMSO-d$_6$) δ (ppm): 12.27 (s, 1H), 9.59-9.53 (s, 2H), 8.68 (s, 1H), 8.27 (s, 1H), 4.90-4.86 (m, 1H), 4.45 (m, 2H), 4.16 (m, 2H), 3.63-3.62 (m, 4H), 3.20 (s, 3H), 2.91 (s, 3H), 1.96-1.93 (m, 2H), 1.79-1.72 (m, 2H), 1.24 (s, 3H).

Molecular formula: C$_{21}$H$_{26}$N$_6$O$_3$ Molecular weight: 410.48 LC-MS (Pos, m/z)=411.40 [M+H]$^+$.

Example 12: Synthesis of 3-cyano-N-(2,3-dihydroxypropyl)-4-(4-methoxy-4-methylpiperidin-1-yl)-2-oxo-1,2-dihydro-1,7-naphthyridin-6-carboxamide (Compound 80)

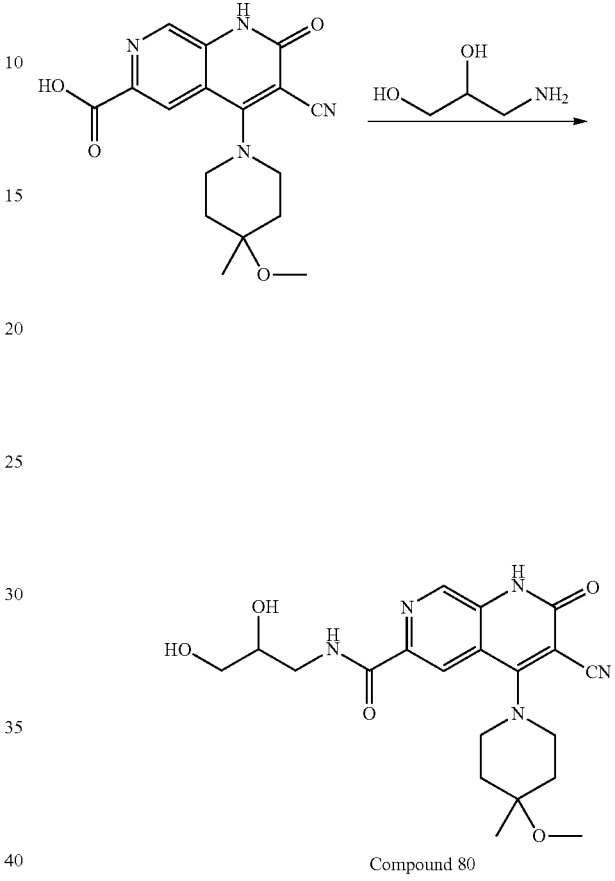

Compound 80

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq) was dissolved in anhydrous N,N-dimethylacetamide (2 mL). DIPEA (226.3 mg, 1.75 mmol, 3.0 eq) and HATU (333.1 mg, 0.88 mmol, 1.5 eq) were added, and stirred for 0.5 to 1 h at room temperature. 3-aminopropan-1,2-diol (106.4 mg, 1.17 mmol, 2.0 eq) was added, and reacted for 12 h at room temperature. The crude product was purified over preparative HPLC (0.1% aqueous trifluoroacetic acid solution:acetonitrile=70:30), and freeze-dried to obtain a product (93.79 mg). The sample was dissolved in water. The pH was adjusted to 8 with an aqueous sodium bicarbonate solution. N-butyl alcohol (20 mL×5) was used for extraction, and organic phase was concentrated to obtain a product (47.2 mg, yield: 19.4%).

$^1$H NMR (400 MHz, DMSO-d$_6$) δ (ppm): 8.42-8.39 (s, 1H), 8.36 (s, 1H), 8.08 (s, 1H), 4.96 (s, 1H), 4.66 (s, 1H), 3.49 (m, 1H), 3.47-3.45 (m, 6H), 3.25-3.23 (m, 2H), 3.19 (s, 3H), 1.91-1.88 (m, 2H), 1.75-1.70 (m, 2H), 1.23 (s, 3H).

Molecular formula: C$_{20}$H$_{25}$N$_5$O$_5$ Molecular weight: 415.45 LC-MS (Neg, m/z)=414.34 [M−H]$^−$.

Example 13: Synthesis of 3-cyano-4-(4-methoxy-4-methylpiperidin-1-yl)-N,N-dimethyl-2-oxo-1,2-dihydro-1,7-naphthyridin-6-carboxamide (Compound 90)

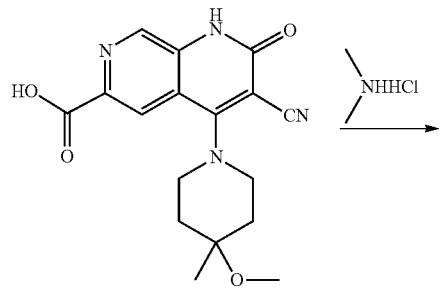

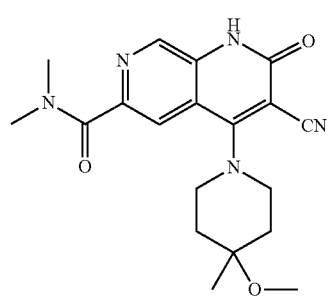

Compound 90

Intermediate 3-cyano-4-(4-methoxy-4-methylpiperidin-1-yl)-2-oxo-1,2-dihydro-1,7-diazanaphthalene-6-carboxylic acid (200 mg, 0.58 mmol, 1.0 eq), HATU (333 mg, 0.88 mmol, 1.5 eq) and DIPEA (376 mg, 1.76 mmol, 3.0 eq) were dissolved in DMAC (2 mL), and stirred for 30 min at normal temperature. Dimethylamine hydrochloride (95 mg, 1.16 mmol, 2.0 eq) was added, and reacted for 1 h at normal temperature. LC-MS detection showed that the reaction was completed. Water (10 mL) was added. Dichloromethane (10 mL×3) was used for extraction. The organic phase was washed with water (10 mL×3), dried over anhydrous sodium sulfate, filtered, and concentrated under reduced pressure. The crude product was purified over silica gel column chromatography (DCM:MeOH=50:1) to obtain a product (120 mg, yield: 55%).

$^1$HNMR (400 MHz, DMSO-$d_6$) δ (ppm): 12.16 (s, 1H), 8.61 (s, 1H), 7.83 (s, 1H), 3.61-3.63 (m, 4H), 3.19 (s, 3H), 3.03-3.05 (d, 6H), 1.90-1.93 (d, 2H), 1.71-1.78 (m, 2H), 1.22 (s, 3H).

Molecular formula: $C_{19}H_{23}N_5O_3$ Molecular weight: 369.18 LC-MS (Pos, m/z)=370.43 [M+H]$^+$.

Example 14: Synthesis of 4-(4-methoxy-4-methylpiperidin-1-yl)-6-(2-methoxyethoxy)-2-oxo-1,2-dihydro-1,7-diazanaphthalene-3-carbonitrile (Compound 81)

Step 1: Synthesis of methyl 2-(2-methoxyethoxy)-5-nitroisonicotinate

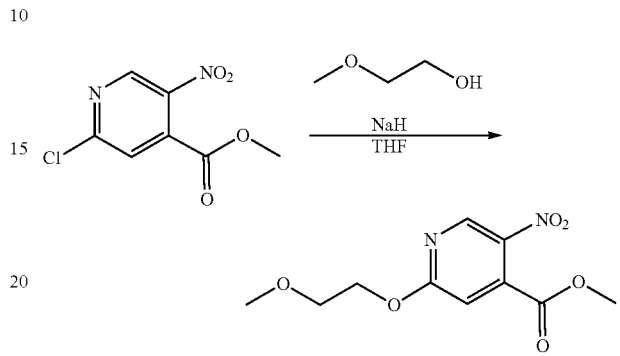

Raw material ethylene glycol monomethyl ether (3.5 g, 46.17 mmol, 1.0 eq) was dissolved in tetrahydrofuran (50 mL), and cooled down to 0° C. Sodium hydride (3.7 g, 92.34 mmol, 2.0 eq) was added, and reacted for 1 hours, and then methyl 2-chloro-5-nitroisonicotinate (10.0 g, 46.17 mmol, 1.0 eq) was added. TLC (PE:EA=5:1) detection showed that the reaction was completed. The reaction solution was poured into ice water (100 mL) and quenched. The aqueous phase was extract with ethyl acetate (100 mL×2). The organic phase was combined, dried over anhydrous sodium sulfate, filtered, and concentrated. The crude product was purified over silica gel column chromatography (PE:EA=5:1) to obtain a product as a light yellow oil (1.8 g, yield: 15%).

Step 2: Synthesis of methyl 5-amino-2-(2-methoxyethoxy)isonicotinate

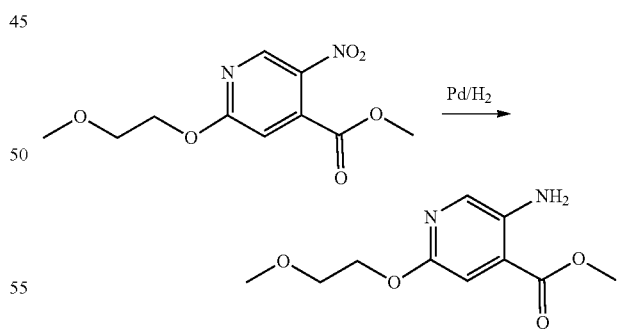

Intermediate methyl 2-(2-methoxyethoxy)-5-nitroisonicotinate (1.8 g, 7.02 mmol, 1.0 eq) was dissolved in methanol (10 mL), 10% Palladium on carbon (500 mg) was added, and hydrogen was introduced and reacted at room temperature overnight. TLC (PE:EA=3:1) detection showed that the reaction was completed. The reaction solution was filtered and concentrated. The crude product was purified over silica gel column chromatography (PE:EA=5:1) to obtain a product as a light yellow solid (1.2 g, yield: 75%).

Step 3: Synthesis of methyl 5-(2-cyanoacetamino)-2-(2-methoxyethoxy)isonicotinate

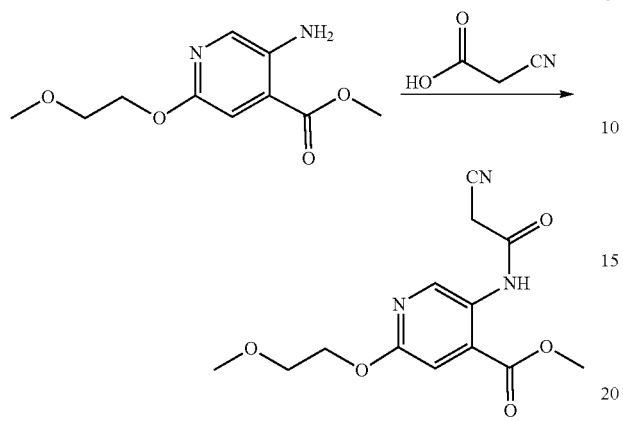

Intermediate methyl 5-amino-2-(2-methoxyethoxy)isonicotinate (1.2 g, 5.3 mmol, 1.0 eq) and cyanoacetic acid (901 mg, 10.6 mmol, 2.0 eq) were dissolved in dichloromethane (20 mL). EDCI (3.04 g, 15.9 mmol, 3.0 eq) was added, and reacted at room temperature for 2 hours. LC-MS detection showed that the reaction was completed. The reaction solution was poured into ice water (30 mL) and quenched. The aqueous phase was extract with dichloromethane (30 mL×2). The organic phase was combined, dried over anhydrous sodium sulfate, filtered, and concentrated. The crude product was slurried over methyl tert-butyl ether to obtain a product as a light yellow solid (1.2 g, yield: 77%).

Step 4: Synthesis of 4-hydroxyl-6-(2-methoxyethoxy)-2-oxo-1,2-dihydro-1,7-diazanaphthalene-3-carbonitrile

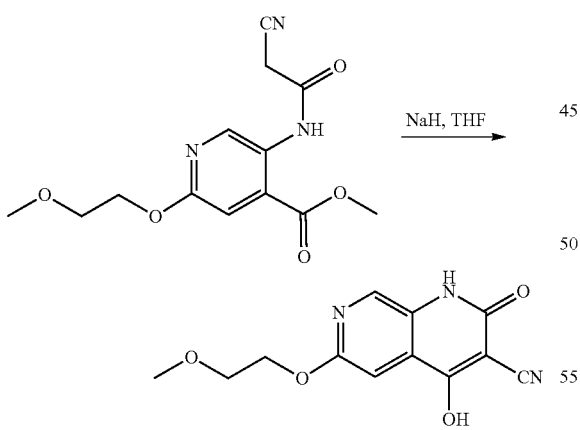

Intermediate methyl 5-(2-cyanoacetamino)-2-(2-methoxyethoxy)isonicotinate (1.2 g, 4.09 mmol, 1.0 eq) was dissolved in tetrahydrofuran (20 mL). Sodium hydride (327 mg, 8.18 mmol, 2.0 eq) was added, warmed to 80° C. and reacted for 4 hours. LC-MS detection showed that the reaction was completed. The reaction solution was cooled down to about 0° C. The pH was adjusted to 2 with 2 mol/L of an aqueous hydrochloric acid solution. A solid was precipitated. The resulting solution was filtered. The filter cake was dried under ambient pressure at 50° C. to obtain a product as a yellow solid (800 mg, yield: 75%).

Step 5: Synthesis of 4-chloro-6-(2-methoxyethoxy)-2-oxo-1,2-dihydro-1,7-diazanaphthalene-3-carbonitrile

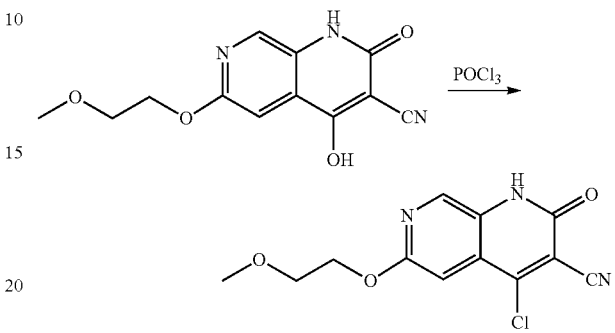

Intermediate 4-hydroxyl-6-(2-methoxyethoxy)-2-oxo-1,2-dihydro-1,7-diazanaphthalene-3-carbonitrile (800 mg, 3.06 mmol, 1.0 eq) was dissolved in phosphorus oxychloride (8 mL), warmed to 100° C. and reacted for one hour. LC-MS detection showed that the reaction was completed. The reaction solution was poured into ice water (20 mL) and quenched. The aqueous phase was extract with dichloromethane (30 mL×3). The organic phase was combined, dried over anhydrous sodium sulfate, filtered, and concentrated. The crude product was slurried over methyl tert-butyl ether to obtain a product as a light yellow solid (180 mg, yield: 21%).

Step 6: Synthesis of 4-(4-methoxy-4-methylpiperidin-1-yl)-6-(2-methoxyethoxy)-2-oxo-1,2-dihydro-1,7-diazanaphthalene-3-carbonitrile

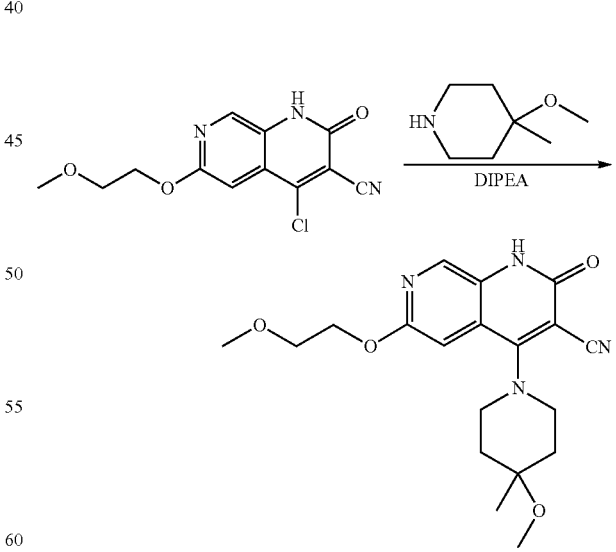

Compound 81

Intermediate 4-chloro-6-(2-methoxyethoxy)-2-oxo-1,2-dihydro-1,7-diazanaphthalene-3-carbonitrile (180 mg, 0.64 mmol, 1.0 eq) was dissolved in N,N-dimethylformamide (2 mL). N,N-diisopropylethylamine (332 mg, 2.58 mmol, 4.0 eq) and 4-methoxy-4-methylpiperidine (110 mg, 0.97 mmol, 1.0 eq) were added, warmed to 80° C. and reacted for two hours. LC-MS detection showed that the reaction was completed. The reaction solution was poured into ice water (20 mL) and quenched. The aqueous phase was extract with dichloromethane (30 mL×3). The organic phase was combined, dried over anhydrous sodium sulfate, filtered, and concentrated. The crude product was purified over silica gel column chromatography (DCM:MeOH=15:1) to obtain a product as a light yellow oil (60 mg, yield: 25%).

$^1$HNMR (400 MHz, DMSO-$d_6$) δ (ppm): 11.78 (s, 1H), 8.28 (s, 1H), 6.94 (s, 1H), 4.37 (m, 2H), 3.67 (m, 2H), 3.56-3.58 (m, 4H), 3.30 (s, 3H), 3.18 (s, 3H), 1.88-1.91 (m, 2H), 1.75-1.80 (m, 2H), 1.21 (s, 3H).

Molecular formula: $C_{19}H_{24}N_4O_4$ Molecular weight: 372.43 LC-MS (Pos, m/z)=373.3[M+H]$^+$ Example 15: Synthesis of 4-(4-methoxy-4-methylpiperidin-1-yl)-6-methyl-2-oxo-1,2-dihydro-1,7-diazanaphthalene-3-carbonitrile (Compound 87)

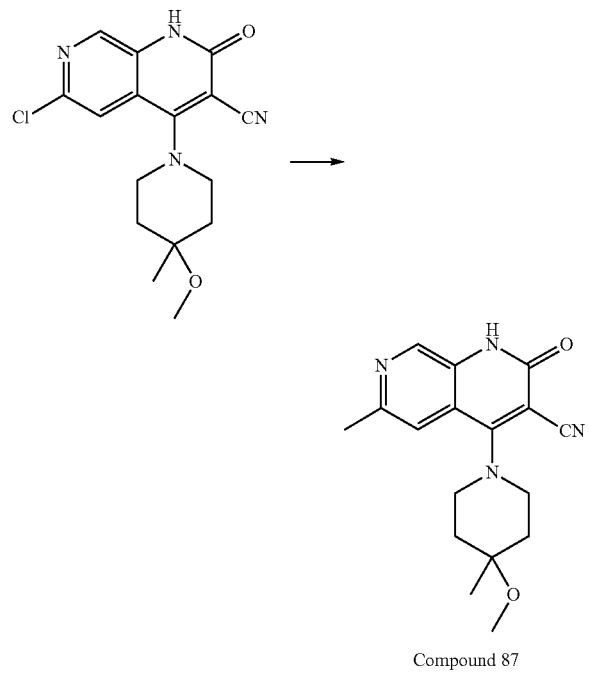

Compound 87

Intermediate 6-chloro-4-(4-methoxy-4-methylpiperidin-1-yl)-2-oxo-1,2-dihydro-1,7-diazanaphthalene-3-carbonitrile (1.3 g, 3.91 mmol, 1.0 eq), cesium carbonate (3.8 g, 11.73 mmol, 3.0 eq) and trimethylboroxine (50% in THF solution, 3.9 g, 15.62 mmol, 4.0 eq) were dissolved in 1,4-dioxane (20 mL). After the addition, the mixture was subjected to replacement with nitrogen three times. Then [1,1'-bis(diphenylphosphino) ferrocene]palladium dichloride (286 mg, 0.39 mmol, 0.1 eq) was added. After the addition, the mixture was subjected to replacement with nitrogen three times, and heated to reflux 12 h. TLC detection showed that raw materials remained. Then trimethylboroxine (50% in THF solution, 3.9 g, 15.62 mmol, 4.0 eq) and [1,1'-bis(diphenylphosphino)ferrocene]palladium dichloride (286 mg, 0.39 mmol, 0.1 eq) were added, and continued to reflux for 4 h. TLC detection showed that there was no raw material. The reaction was cooled down to room temperature. Water (50 mL) and dichloromethane (100 mL) were added, and stirred for 5 min. A solid was precipitated, and filtered. The filter cake was drip-washed with dichloromethane. The liquid was separated. The aqueous phase was extracted with dichloromethane (100 mL×3). The organic phase was combined, dried with anhydrous sodium sulfate, and filtered. The solution was concentrated under reduced pressure. The crude product was purified over silica gel column chromatography (MeOH:DCM=1:100 to 1:50) firstly to obtain a product (309.9 mg, yield: 25.4%).

$^1$HNMR (400 MHz, DMSO-$d_6$) δ (ppm): 11.88 (s, 1H), 8.55 (s, 1H), 7.42 (s, 1H), 3.61-3.59 (m, 4H), 3.19 (s, 3H), 2.53 (s, 3H), 1.92-1.89 (m, 2H), 1.82-1.75 (m, 2H), 1.22 (s, 3H).

Molecular formula: $C_{17}H_{20}N_4O_2$ Molecular weight: 312.37 LC-MS (Pos, m/z)=313.25 [M+H]$^+$.

Example 16: Synthesis of 6-cyclopropyl-4-(4-methoxy-4-methylpiperidin-1-yl)-2-oxo-1,2-dihydro-1,7-diazanaphthalene-3-carbonitrile (Compound 92)

Step 1: Synthesis of ethyl 2-chloro-5-nitro isonicotinate

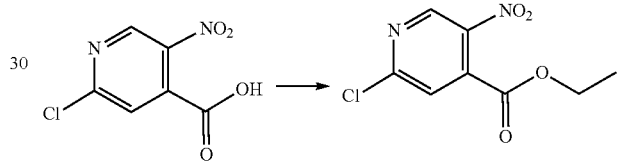

2-chloro-5-nitro isonicotinic acid (20.0 g, 98.74 mmol, 1.0 eq) was dissolved in triethyl orthoformate (43.9 g, 296.20 mmol, 3.0 eq), and reacted at 120° C. for 3 h. TLC detection showed that there were raw materials. The resulting solution was concentrated under reduced pressure to obtain a yellow oily liquid. Petroleum ether (150 mL) was added, stirred for 12 h, and filtered. The filter cake was dried at room temperature to obtain a product (11.0 g, yield: 51.6%).

Step 2: Synthesis of ethyl 2-cyclopropyl-5-nitro isonicotinate

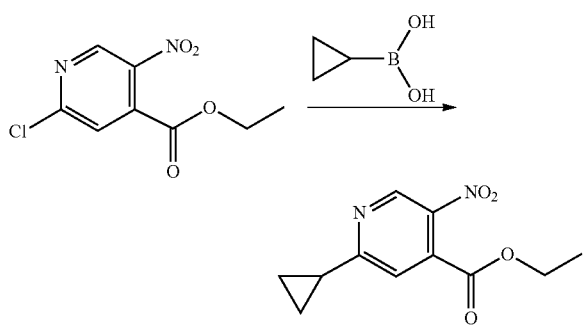

Ethyl 2-chloro-5-nitro isonicotinate (11.0 g, 47.70 mmol, 1.0 eq), cyclopropyl boronic acid (10.2 g, 119.25 mmol, 2.5 eq) and potassium phosphate (35.4 g, 166.95 mmol, 3.5 eq) were dissolved in a mixed solvent of water (27.5 mL) and toluene (275 mL). Triphenylphosphine (2.5 g, 9.54 mmol, 0.2 eq) and palladium acetate (1.1 g, 4.77 mmol, 0.1 eq) were added under nitrogen protection. The mixture was subjected to replacement with nitrogen three times, and reacted under refluxing for 24 h. TLC detection showed that the reaction was completed. The reaction solution was concentrated under reduced pressure. The crude product was purified over silica gel column chromatography (EA:PE=1:30) to obtain a product (6.18 g, yield: 55%).

Step 3: Synthesis of ethyl 5-amino-2-cyclopropyl isonicotinate

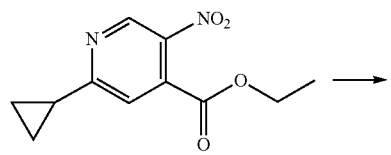

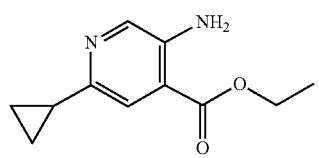

Intermediate ethyl 2-cyclopropyl-5-nitro isonicotinate (6.18 g, 26.16 mmol, 1.0 eq) was dissolved in anhydrous ethanol (60 mL). An iron powder (5.86 g, 104.64 mmol, 4.0 eq) was added. The mixture was warmed to reflux. Acetic acid (9.4 g, 156.96 mmol, 6.0 eq) was added dropwise, and reacted under refluxing for 3 h. TLC detection showed that the reaction was completed. Ethyl acetate (100 mL) was added to the reaction solution. Filtration was performed while the solution was still warm. The filter cake was drip-washed with ethyl acetate. The filtrate was concentrated under reduced pressure. Water (50 mL) and ethyl acetate (100 mL) were added, and cooled in an ice-water bath. A sodium bicarbonate solid was added to adjust the pH value to about 8. The liquid was separated. The aqueous phase was extracted with ethyl acetate (50 mL×3). The organic phase was combined, dried with anhydrous magnesium sulphate, and filtered. The filtrate was concentrated under reduced pressure to obtain a product (4.77 g, yield: 90%).

Step 4: Synthesis of ethyl 5-(2-cyano acetamido)-2-cyclopropyl isonicotinate

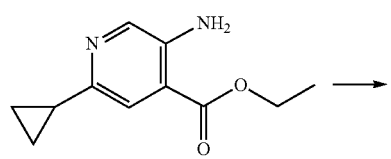

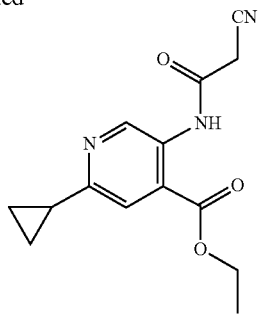

Intermediate ethyl 5-amino-2-cyclopropyl isonicotinate (4.77 g, 23.13 mmol, 1.0 eq) was dissolved in dichloromethane (60 mL). 1-(3-dimethylaminopropyl)-3-ethyl carbodiimide hydrochloride (8.7 g, 46.25 mmol, 2.0 eq) and cyanoacetic acid (3 g, 34.69 mmol, 1.5 eq) were added, and stirred for 16 h at room temperature. TLC monitoring showed that there were no raw materials. Dichloromethane (40 mL) was added, washed with water (50 mL×2). The organic phase was washed with a saturated aqueous sodium carbonate solution (50 mL), dried over anhydrous magnesium sulphate, and filtered. The filtrate was concentrated under reduced pressure to obtain a product (5.6 g, yield: 100%), which was put into the next step according to the theoretical amount.

Step 4: Synthesis of 6-cyclopropyl-4-hydroxyl-2-oxo-1,2-dihydro-1,7-diazanaphthalene-3-carbonitrile

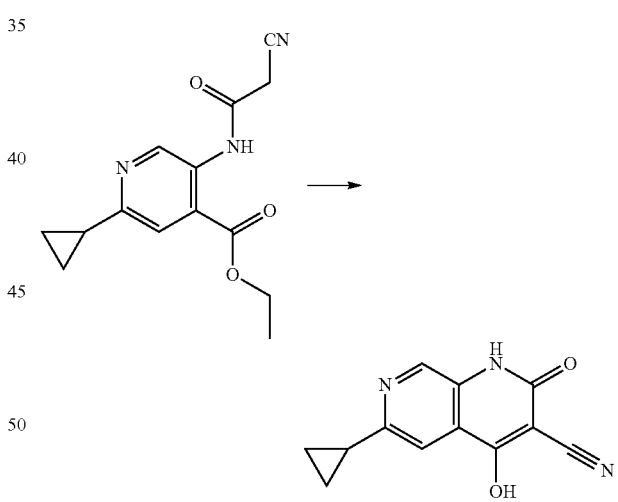

Intermediate ethyl 5-(2-cyano acetamido)-2-cyclopropyl isonicotinate (5.6 g, 20.51 mmol, 1.0 eq) was dissolved in anhydrous ethanol (100 mL), and stirred for 10 min.

Sodium ethoxide (4.7 g, 69.39 mmol, 3.0 eq) was added, and stirred for 1 h at room temperature. TLC detection showed that raw materials remained. Sodium ethoxide (4.7 g, 69.39 mmol, 3.0 eq) was added and stirred at room temperature for 2 h. TLC detection showed that there were no raw materials. The reaction was concentrated under reduced pressure. Water (200 mL) was added, and extracted with methyl tert-butyl ether (100 mL×2). The aqueous phase was cooled down with ice water. The pH value was adjusted to 1 to 2 with concentrated hydrochloric acid. A solid was precipitated. The resulting solution was filtered. The filter cake was drip-washed with water, and dried to obtain a product (3.95 g, yield: 84.84%).

Step 5: Synthesis of 2,4-dichloro-6-cyclopropyl-1,7-diazanaphthalene-3-carbonitrile

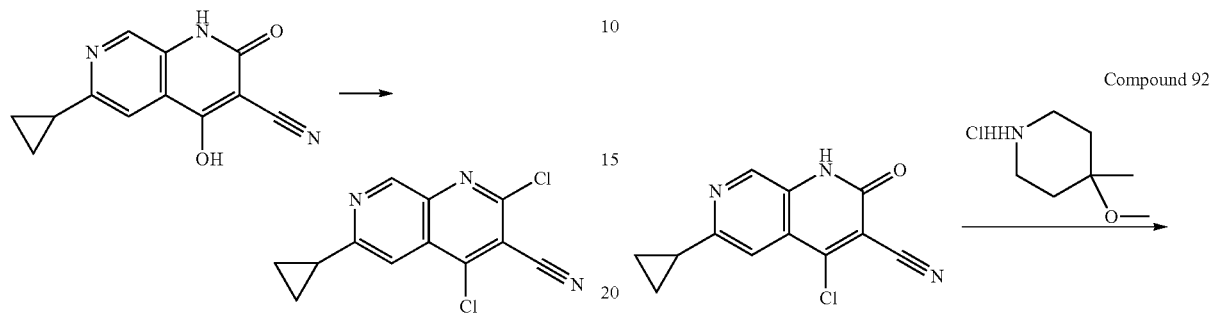

Intermediate 6-cyclopropyl-4-hydroxyl-2-oxo-1,2-dihydro-1,7-diazanaphthalene-3-carbonitrile (1 g, 4.4 mmol, 1.0 eq) was dissolved in anhydrous acetonitrile (15 mL). Phosphorus oxychloride (1.35 g, 8.8 mmol, 2.0 eq) was added, warmed to 80° C. and reacted for 1 h. TLC detection showed that a majority of raw materials remained. Phosphorus oxychloride (1.35 g, 8.8 mmol, 2.0 eq) was added, and heated to 90° C. LC-MS detection showed that the reaction was completed. The reaction was cooled down to room temperature, and concentrated under reduced pressure. Acetonitrile (10 mL) was added, and cooled down with ice water. The pH value was adjusted to 8 to 9 with sodium hydroxide solution. A yellow solid was precipitated. The resulting solution was filtered. The filter cake was drip-washed with water to obtain a product (1.5 g crude), which was put into the next step according to the theoretical amount.

Step 6: Synthesis of 4-chloro-6-cyclopropyl-2-oxo-1,2-dihydro-1,7-diazanaphthalene-3-carbonitrile

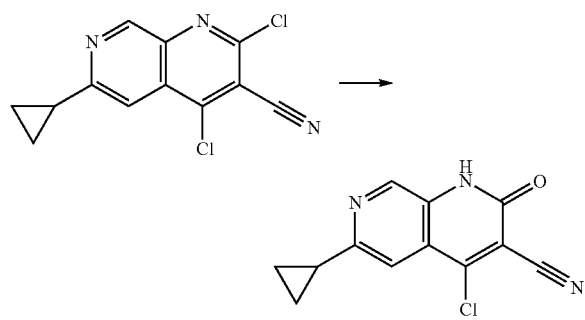

Intermediate 2,4-dichloro-6-cyclopropyl-1,7-diazanaphthalene-3-carbonitrile (1.16 g crude, 4.40 mmol, 1.0 eq) was dissolved in a mixed solvent of trifluoroacetic acid (10 mL) and water (2.5 mL), heated to 60° C. and reacted for 18 h, and cooled down to 0° C. Water (20 mL) was added. The pH value was adjusted to 8 to 9 with sodium hydroxide solid. A yellow solid was precipitated. The resulting solution was filtered. The filter cake was drip-washed with water, and dried. Ethyl acetate (10 mL) was added, heated to 60° C. and stirred for 1 h. Filtration was performed while the solution was still warm. The filter cake was dried to obtain a product (660 mg, two-step yield: 61%).

Step 7: Synthesis of 2-chloro-6-cyclopropyl-4-(4-methoxy-4-methylpiperidin-1-yl)-1,7-diazanaphthalene-3-carbonitrile

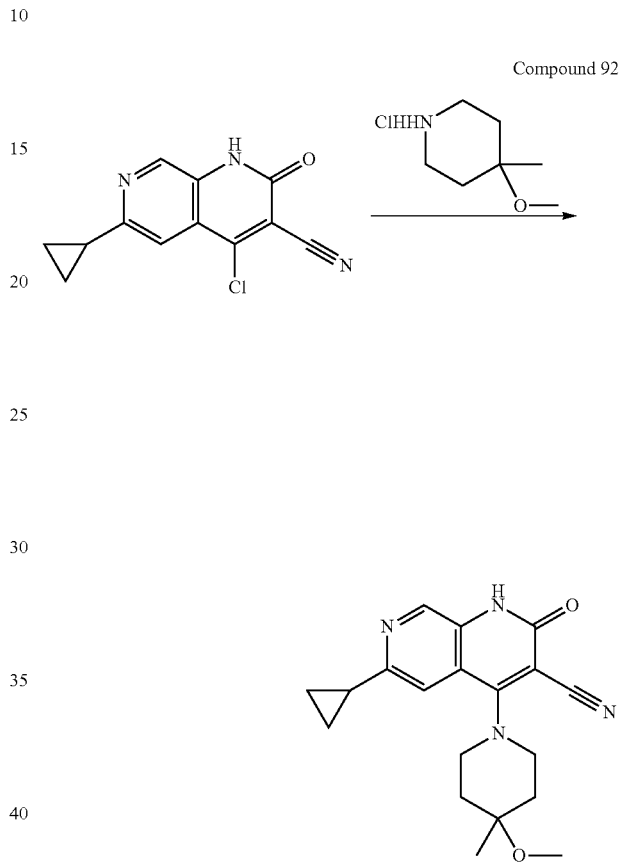

Compound 92

Intermediate 4-chloro-6-cyclopropyl-2-oxo-1,2-dihydro-1,7-diazanaphthalene-3-carbonitrile (200 mg, 0.81 mmol, 1.0 eq) was dissolved in N,N-dimethylacetamide (2 mL). DIPEA (420.5 mg, 3.26 mmol, 4.0 eq) and 4-methoxy-4-methylpiperidine hydrochloride (188.8 mg, 1.14 mmol, 1.4 eq) were added, warmed to 80° C. and reacted for 1 h. TLC detection showed that there were raw materials. The reaction solution was cooled down to room temperature, poured into ice water (20 mL), and extracted with ethyl acetate (50 mL×3). The organic phase was combined, washed with water (50 mL×2), dried over anhydrous magnesium sulphate, and filtered. The filtrate was concentrated under reduced pressure. The crude product was slurried with methyl tert-butyl ether (5 mL) for 1 h, and the resulting solution was filtered by suction. The filter cake was dried to obtain a product (182 mg, yield: 66%).

$^1$H NMR (400 MHz, DMSO-$d_6$) δ (ppm): 11.85 (s, 1H), 8.51 (d, 1H), 7.45 (s, 1H), 3.61-3.60 (d, 4H), 3.19 (s, 3H), 2.27-2.21 (m, 1H), 1.93-1.90 (m, 2H), 1.84-1.80 (m, 2H), 1.22 (s, 3H), 0.95 (m, 2H), 0.85 (m, 2H).

Molecular formula: $C_{19}H_{22}N_4O_2$ Molecular weight: 338.17 LC-MS (Pos, m/z)=339.13 [M+H]$^+$.

Example 17: Synthesis of 6-ethyl-4-(4-methoxy-4-methylpiperidin-1-yl)-2-oxo-1,2-dihydro-1,7-diazanaphthalene-3-carbonitrile (Compound 102)

Step 1: Synthesis of 6-chloro-4-(4-methoxy-4-methylpiperidin-1-yl)-2-oxo-1,2-dihydro-1,7-diazanaphthalene-3-carbonitrile

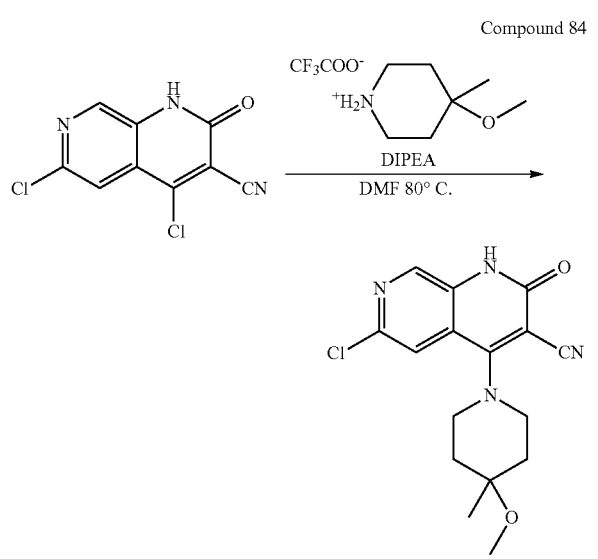

Intermediate 4,6-dichloro-2-oxo-1,2-dihydro-1,7-diazanaphthalene-3-carbonitrile (2.0 g, 8.33 mmol, 1.0 eq) was dissolved in DMF (10 mL), and DIPEA (6.45 g, 50 mmol, 6.0 eq) and 4-methoxy-4-methylpiperidine trifluoroacetate (2.2 g, 9.16 mmol, 1.1 eq) were added and reacted at 80° C. for 2 hours. LC-MS detection showed that the reaction was completed. Water (10 mL) was added, and dichloromethane (10 mL×3) was used for extraction. The organic phase was washed with water (10 mL×3), dried over anhydrous sodium sulfate, filtered, and concentrated under reduced pressure to obtain a product as a yellow solid (2.7 g crude).

$^1$H NMR (400 MHz, DMSO-d$_6$) δ (ppm): 12.11 (s, 1H), 8.45 (s, 1H), 7.61 (s, 1H), 3.61-3.59 (m, 4H), 3.18 (s, 3H), 1.91-1.88 (m, 2H), 1.81-1.76 (m, 2H), 1.21 (s, 3H).

Molecular formula: C$_{16}$H$_{17}$N$_4$O$_2$Cl Molecular weight: 332.79 LC-MS (Pos, m/z)=333.7 [M+H]$^+$

Step 2: Synthesis of 4-(4-methoxy-4-methylpiperidin-1-yl)-2-oxo-6-vinyl-1,2-dihydro-1,7-diazanaphthalene-3-carbonitrile

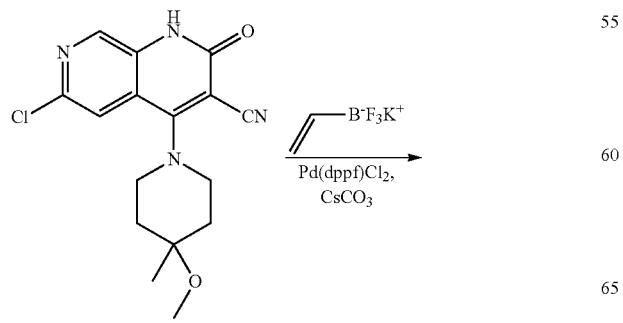

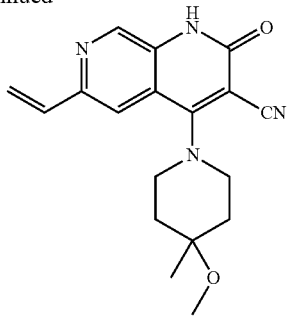

Intermediate 6-chloro-4-(4-methoxy-4-methylpiperidin-1-yl)-2-oxo-1,2-dihydro-1,7-diazanaphthalene-3-carbonitrile (2.7 g crude product, 8.11 mmol, 1.0 eq) was dissolved in 1,4-dioxane (20 mL) and H$_2$O (5 mL). Potassium vinyltrifluoroborate (1.63 g, 12.17 mmol, 1.5 eq), cesium carbonate (3.965 g, 12.17 mmol, 1.5 eq) and [1,1'-bis(diphenylphosphino)ferrocene]palladium dichloride (297 mg, 0.41 mmol, 0.05 eq) were added, and reacted for 8 hours under nitrogen protection at 100° C. LC-MS detection showed that the reaction was completed. Water (20 mL) was added. Dichloromethane (30 mL×3) was used for extraction. The organic phase was dried over anhydrous sodium sulfate, filtered, and concentrated under reduced pressure. The crude product was purified over silica gel column chromatography (DCM:MeOH=70:1) to obtain a product as a yellow solid (1.15 g, yield: 43%).

Step 3: Synthesis of 6-ethyl-4-(4-methoxy-4-methylpiperidin-1-yl)-2-oxo-1,2-dihydro-1,7-diazanaphthalene-3-carbonitrile

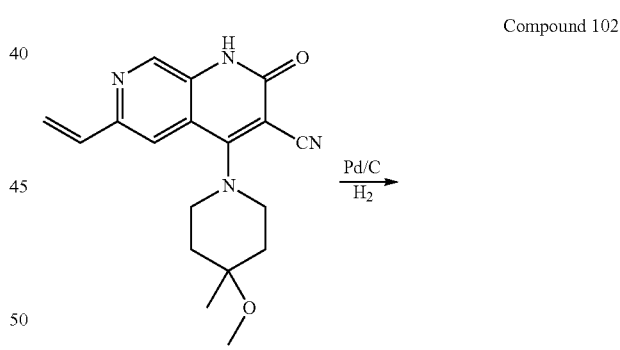

Intermediate 4-(4-methoxy-4-methylpiperidin-1-yl)-2-oxo-6-vinyl-1,2-dihydro-1,7-diazanaphthalene-3-carbonitrile (150 mg, 0.46 mmol, 1.0 eq) was dissolved in methanol (5 mL). Pd/C (100 mg) was added. The mixture was subjected to replacement with hydrogen three times, and reacted for 1 hour under a hydrogen atmosphere. LC-MS detection showed that the reaction was completed. The resulting solution was filtered by suction. The filtrate was concentrated under reduced pressure to obtain a product (120 mg, yield: 80%).

¹HNMR (400 MHz, DMSO-d₆) δ (ppm): 11.89 (s, 1H), 8.59 (s, 1H), 7.41 (s, 1H), 3.60-3.62 (m, 4H), 3.19 (s, 3H), 2.79-2.84 (m, 2H), 1.89-1.93 (m, 2H), 1.75-1.82 (m, 2H), 1.22-1.27 (m, 6H).

Molecular formula: $C_{18}H_{22}N_4O_2$ Molecular weight: 326.40 LC-MS (Pos, m/z)=327.26 [M+H]⁺.

Example 18: Synthesis of 6-acetyl-2-hydroxyl-4-(4-methoxy-4-methylpiperidin-1-yl)-1,7-diazanaphthalene-3-carbonitrile (a Tautomer of Compound 114)

Step 1: Synthesis of 6-(1-bromoethyl)-2,4-dichloro-1,7-diazanaphthalene-3-carbonitrile

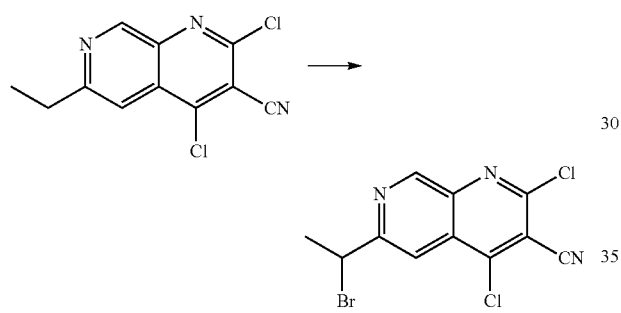

Carbon tetrachloride (600.00 mL), 2,4-dichloro-6-ethyl-1,7-diazanaphthalene-3-carbonitrile (30.00 g, 119.00 mmol, 1 eq), NBS (42.36 g, 238.00 mmol, 2 eq) and AIBN (15.00 g) were added into a 1 L single-necked flask. The mixture was reacted at 90° C. for 2 hours. LC-MS showed that the reaction was completed. The reaction solution was cooled to 10-15° C., filtered by suction. The filtrate was concentrated to dryness, recrystallized with PE and EA to obtain a product 6-(1-bromoethyl)-2,4-dichloro-1,7-diazanaphthalene-3-carbonitrile (35 g).

Step 2: Synthesis of 6-(1-bromoethyl)-2-chloro-4-(4-methoxy-4-methylpiperidin-1-yl)-1,7-diazanaphthalene-3-carbonitrile

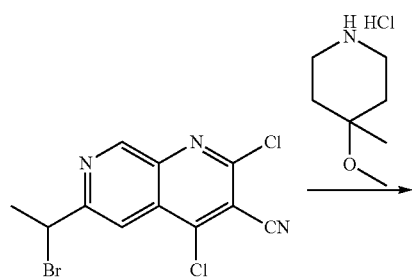

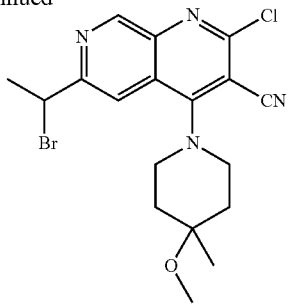

Into a 1 L single-necked flask, ethanol (400.00 mL), 6-(1-bromoethyl)-2,4-dichloro-1,7-diazanaphthalene-3-carbonitrile (20.00 g, 60.40 mmol, 1 eq), 4-methoxy-4-methylpiperidine hydrochloride (11.00 g, 66.44 mmol, 1.1 eq) and triethylamine (13.45 g, 132.88 mmol, 2.2 eq) were added. The mixture was reacted at 90° C. for 2 hours. LC-MS showed that the reaction was completed. The reaction solution was cooled down to room temperature, and was concentrated to dryness under reduced pressure. 400 mL water was added, stirred for 1 hours, and filtered by suction. The filter cake was recrystallized with ethanol to obtain a product 6-(1-bromoethyl)-2-chloro-4-(4-methoxy-4-methylpiperidin-1-yl)-1,7-diazanaphthalene-3-carbonitrile (20 g).

Step 3: Synthesis of 2-hydroxyl-6-(1-hydroxyethyl)-4-(4-methoxy-4-methylpiperidin-1-yl)-1,7-diazanaphthalene-3-carbonitrile

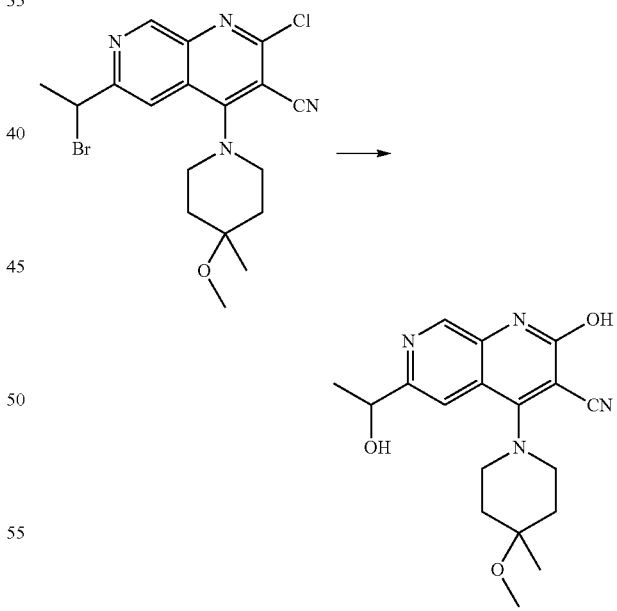

Into a 250 mL single-necked flask, acetic acid (60.00 mL), water (30.00 mL) and 6-(1-bromoethyl)-2-chloro-4-(4-methoxy-4-methylpiperidin-1-yl)-1,7-diazanaphthalene-3-carbonitrile (15.00 g) were added, and reacted for 6 hours at 100° C. LC-MS showed that the reaction was completed. The reaction was cooled down to room temperature. The reaction solution was concentrated to dryness under reduced pressure. 100 mL water was added. The pH was adjusted to 7-8. Ethyl acetate was used for extraction. The organic phase was combined, dried over anhydrous sodium sulfate, and filtered by suction. The filtrate was concentrated to dry under reduced pressure to obtain a crude product. The crude product was firstly slurried with EA while heating, and then recrystallized with ethanol to obtain a product 2-hydroxyl-6-(1-hydroxyethyl)-4-(4-methoxy-4-methylpiperidin-1-yl)-1,7-diazanaphthalene-3-carbonitrile (6 g).

Step 4: Synthesis of 6-acetyl-2-hydroxyl-4-(4-methoxy-4-methylpiperidin-1-yl)-1,7-diazanaphthalene-3-carbonitrile

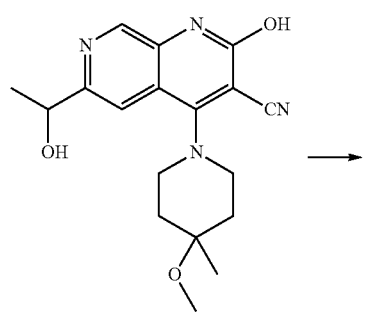

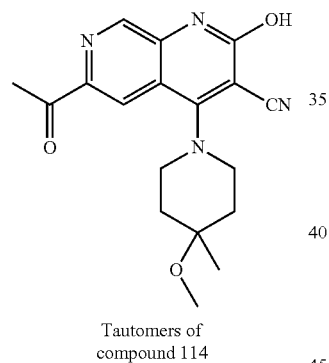

Tautomers of compound 114

Into a 250 mL single-necked flask, DCM (90.00 mL), 2-hydroxyl-6-(1-hydroxyethyl)-4-(4-methoxy-4-methylpiperidin-1-yl)-1,7-diazanaphthalene-3-carbonitrile (4.50 g, 13.15 mmol, 1 eq), and dess-martin periodinane (6.14 g, 1.1 eq, 14.47 mmol) were added, and stirred for 2 hours at room temperature. LC-MS showed that the reaction was completed. 60 mL water and 30 mL saturated sodium thiosulfate solution were added, and stirred for 1 hours. The liquid was separated. The organic phase was dried with anhydrous sodium sulfate, and filtered by suction. The filtrate was concentrated to dryness under reduced pressure to obtain a crude product, which was purified by column chromatography to obtain a product 6-acetyl-2-hydroxyl-4-(4-methoxy-4-methylpiperidin-1-yl)-1,7-diazanaphthalene-3-carbonitrile (0.7 g).

$^1$HNMR (400 MHz, DMSO) δ (ppm): 12.33 (s, 1H), 8.70 (s, 1H), 8.19 (s, 1H), 3.62-3.64 (d, 4H), 3.20 (s, 3H), 2.63 (s, 3H), 1.92-1.96 (m, 2H), 1.76-1.78 (m, 2H), 1.24 (s, 3H).

Molecular formula: $C_{18}H_{20}N_4O_3$, Molecular weight: 340.38, LC-MS (Pos, m/z)=341.21 [M+H$^+$].

Example 19: Synthesis of 6-ethyl-2-hydroxyl-4-(4-(methoxy-d$_3$)-4-methylpiperidin-1-yl)-1,7-diazanaphthalene-3-carbonitrile (Tautomers of Compound 115)

Step 1: Synthesis of tert-butyl 4-hydroxyl-4-methylpiperidin-1-carboxylate

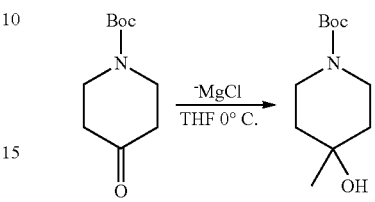

Raw material tert-butyl 4-oxopiperidin-1-carboxylate (5.0 g, 25 mmol, 1.0 eq) was dissolved in tetrahydrofuran (25 mL). Methylmagnesium chloride reagent (9 mL, 27 mmol, 1.1 eq) was added under nitrogen protection at 0° C. After 2 hours of reaction, TLC detection showed that the reaction was completed. Dilute hydrochloric acid was added to adjust the pH to 4. Then water (30 mL) was added. Ethyl acetate (30 mL×3) was used for extraction. The organic phase was dried, filtered and concentrated under reduced pressure. The crude product was purified over silica gel column chromatography (PE:EA=5:1) to obtain a product (5.2 g, yield: 96%).

Step 2: Synthesis of tert-butyl 4-(methoxy-d$_3$)-4-methylpiperidin-1-carboxylate

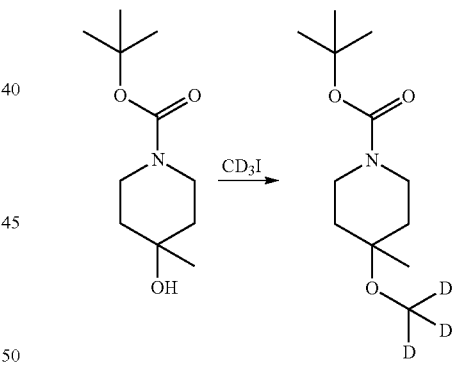

Into a 100 mL single-necked flask, nitrogen was replaced. Tert-butyl 4-hydroxyl-4-methylpiperidin-1-carboxylate (2.70 g, 12.55 mmol, 1 eq), and THF (27.00 mL) were added. Sodium hydride (60%, 0.76 g, 1.5 eq) was added batchwise, and reacted for 0.5 hours at room temperature. CD$_3$I (4.00 g, 27.62 mmol, 2.2 eq) was added dropwise, and reacted overnight at 30° C. after the addition. TLC showed that the reaction was completed. The reaction solution was concentrated to dry under reduced pressure. 100 mL of EA was added. The liquid was separated. The organic phase was washed with water, then dried over anhydrous sodium sulfate, and filtered by suction. The filtrate was concentrated to dryness under reduced pressure to obtain a product tert-butyl 4-(methoxy-d$_3$)-4-methylpiperidin-1-carboxylate (4.3 g).

Step 3: Synthesis of 4-(methoxy-d₃)-4-methylpiperidine Hydrochloride

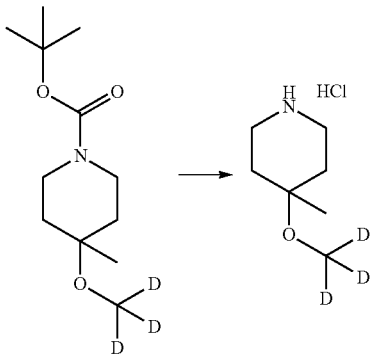 [SMILES: [2H]C([2H])([2H])OC1(C)CCN(C(=O)OC(C)(C)C)CC1 ; [2H]C([2H])([2H])OC1(C)CCNCC1 ; Cl]

Into a 500 mL single-necked flask, nitrogen was replaced. Tert-butyl 4-(methoxy-d₃)-4-methylpiperidin-1-carboxylate (4.30 g) was added, and hydrogenchloride ethanol (8.60 mL) and ethanol (8.60 mL) were added. The reaction was reacted for 2 hours at 30° C. TLC showed that the reaction was completed. The reaction solution was concentrated to dryness under reduced pressure. 30 mL of EA was added, stirred for 0.5 hours, and filtered by suction to obtain a product 4-(methoxy-d₃)-4-methylpiperidine hydrochloride (1.20 g).

Step 4: Synthesis of 6-ethyl-2-hydroxyl-4-(4-(methoxy-d₃)-4-methylpiperidin-1-yl)-1,7-diazanaphthalene-3-carbonitrile

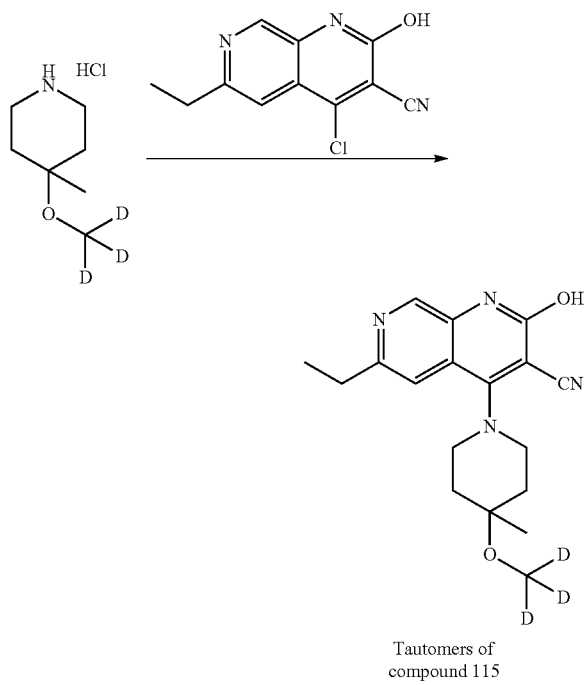 [SMILES: [2H]C([2H])([2H])OC1(C)CCNCC1 ; Cl ; CCc1cc2c(Cl)c(C#N)c(O)nc2cn1 ; [2H]C([2H])([2H])OC1(C)CCN(c2c(C#N)c(O)nc3cnc(CC)cc23)CC1]

Tautomers of compound 115

Into a 100 mL single-necked flask, 4-chloro-6-ethyl-2-hydroxyl-1,7-diazanaphthalene-3-carbonitrile (1.50 g, 6.47 mmol, 1 eq), 4-(methoxy-d₃)-4-methylpiperidine hydrochloride (1.20 g, 7.12 mmol, 1.1 eq), ethanol (15.00 mL) and TEA (1.44 g, 14.23 mmol, 2.2 eq) were added, and reacted at 90° C. for 1 hour. LC-MS showed that the reaction was completed. The reaction was cooled down. The reaction solution was concentrated to dryness under reduced pressure. 50 mL water was added, stirred for 0.5 h, and filtered by suction to obtain a crude product. The crude product was recrystallized with ethanol to obtain a product 6-ethyl-2-hydroxyl-4-(4-(methoxy-d₃)-4-methylpiperidin-1-yl)-1,7-diazanaphthalene-3-carbonitrile (2.03).

$^1$HNMR (400 MHz, DMSO) δ (ppm): 11.91 (s, 1H), 8.58 (s, 1H), 7.40 (s, 1H), 3.60-3.61 (d, 4H), 2.78-2.84 (q, 2H), 1.89-1.92 (m, 2H), 1.77-1.82 (m, 2H), 1.26 (s, 6H).

Molecular formula: $C_{18}H_{19}D_3N_4O_2$, Molecular weight: 329.42, LC-MS (Pos, m/z)=330.21 [M+H⁺].

According to the following experimental examples, the present invention can be better understood. However, those skilled in the art can easily understand that the content described in the experimental examples are only used to illustrate the present invention, and should not and will not limit the present invention described in detail in the claims.

Experimental Example 1: Evaluation of PDE9 by an Enzymatic Method

Test substances: The compound of the present invention are prepared from the corresponding embodiments of the present invention.

1. Experimental Materials and Instruments
   PDE9A2 enzyme (BPS, Cat. No. 60090)
   384-well plates (Perkin Elmer, Cat. No. 6007279)
2. Test Steps Preparation of compounds: DMSO was used to formulate the compound into a 10 mM stock solution of the compound for long-term storage. DMSO was diluted by 100 times to obtain a 100 μM working solution of the compound, then the working solution of the compound was diluted 3 times with DMSO to obtain a total of 8-10 concentration gradients of a diluted solution of the compound (100×).

Incubation with treatment: the diluted solution of the compound was pipetted into a 384-well plate using Echo, a system for pipetting very small amount of liquid; 200 nL of the diluted solution of the compound and 10 μL of PDE9A2 enzyme solution were added to each compound well, and incubated at room temperature for 15 min after centrifuging at 1000 rpm for 1 min. Then 10 μL of a substrate mixture was added, and incubated with shaking at room temperature for 30 min after centrifuging at 1000 rpm for 1 min Finally, a stop solution was added to terminate the reaction system, and same was incubated with shaking at room temperature for 60 min. In the maximum reading hole (Max), the compound was replaced with a solvent; in the minimum reading hole (Min), the compound and enzyme solution were replaced with a solvent.

Detection: A microplate reader was used to detect the fluorescence reading (F) at 480 nm/535 nm.

Calculation: The inhibition rate was calculated according to the following formula, and GraphPad Prism5.0 was used to fit $IC_{50}$:

$$\text{Inhibition rate } (\%) = \frac{F\text{Max} - F_{Compound}}{F\text{Max} - F\text{Min}} \times 100\%$$

3. Test Results are as Shown in the Following Table 2:

TABLE 2

| Test substances | PDE9A2 IC$_{50}$ (nM) |
|---|---|
| Compound 63 | 4 |
| Compound 64 | 38 |
| Compound 68 | 3 |
| Compound 69 | 11 |
| Compound 70 | 24 |
| Compound 74 | 14 |
| Compound 75 | 69 |
| Compound 76 | 61 |
| Compound 77 | 52 |
| Compound 78 | 85 |
| Compound 80 | 25 |
| Compound 81 | 31 |
| Compound 84 | 38 |
| Compound 87 | 9 |
| Compound 90 | 20 |
| Compound 91 | 50 |
| Compound 92 | 25 |
| Compound 102 | 15 |
| Compound 114 | 48 |
| Compound 115 | 19 |
| Compound A | 61 |
| Compound B | 3 |

It can be seen from Table 2 that the compound of the present invention has very good PDE9 enzymatic inhibitory activities and has potential clinical application values.

Experimental Example 2 Test of the Effect of the Compound of the Present Invention on cGMP Content in Transiently Transfected HEK293T Cells Test substances: For the structure of compound 102 in the present invention, refer to the structure of compound No. 102 in Table 1 herein.

Abbreviations:

FBS Fetal bovine serum

ANF Atrial natriuretic factor

B$_0$ Maximum binding cGMP 3,5-Cyclic guanosine monophosphate

ELISA Enzyme-linked immunosorbent assay

NPR1 Natriuretic peptide receptor 1

NSB Non-specific binding

PDE9 Phosphodiesterase 9

WB Western Blotting

TA Total activity

GAPDH Glyceraldehyde-3-phosphate dehydrogenase

Materials and Instruments

Experimental Instruments and Consumables

| Name | Source |
|---|---|
| cGMP ELISA Kit (Cyclic GMP ELISA Kit) | Cayman |
| PolyFect Transfection Reagent | QIAGEN |
| Atrial natriuretic factor (1-28) (rat) | TOCRIS |
| DYKDDDK (Flag) (Rabbit) | CST |
| GAPDH (Rabbit) | CST |
| Exposure apparatus | Tanon |
| Multi-mode microplate reader | PerkinElmer |

Plasmid

| Name | Species | Source |
|---|---|---|
| NPR1 | Human | Genscript |
| PDE9 | Human | Genscript |

Cell Line

Cell name: Human embryonic kidney cell HEK293T

Experimental Method:

1. Cell Plating and Transfection 1.1 Cell Plating

HEK293T cells were plated in a 6-well plate at 2×10$^6$ cells/well and cultured for 6 h to allow for adherence of cells.

1.2 Transfection

The medium of each well was changed to 1.5 mL DMEM complete medium;

Transfected wells: 0.333 μg of NPR1 and 0.333 μg of PDE9 plasmid were added to each 100 μL of FBS-free DMEM starvation medium and blended evenly with a pipette, then 20 μL of PolyFect transfection reagent was added and blended evenly with a pipette, and after standing for 10 min, 600 μL of DMEM complete medium was added and blended evenly with a pipette. 700 μL of mixture was added dropwise into wells slowly, and incubated for 18 h. The method for each transfected well is the same as above. Non-transfected wells: An equal volume of DMEM complete medium (700 μL DMEM complete medium) was added to non-transfected wells.

2. Administration Stimulation 50 mM solution of the compound in DMSO was taken and diluted into a series of gradient concentrations of solutions of the compound of 3 mM, 1 mM, 333 μM, 111 μM, 37 μM, and 12 μM (100×working solution) with the complete medium. The medium in the transfected culture plate was replaced with 1 mL DMEM complete medium, then 10 μL of the above-mentioned 100×working solution with different concentrations was added to each well to obtain a series of gradient concentrations of solutions of the compound of 30 μM, 10 μM, 3.33 μM, 1.11 μM, 0.37 μM and 0.12 μM (final concentration). After incubating in an incubator for 30 min, 3 μL of 326 μM ANF was added to each well to a final concentration of 1 μM, and then coincubated with medicaments for 30 min.

3. cGMP Content Detection (Refer to cGMP ELISA Kit Instructions for Operation)

1.1 Cell Collection

The medium was aspirated from each well. The cells were washed once with PBS, and 250 μL of 0.5 M perchloric acid was added.

The cells were collected with a cell scraper, and transferred into a 1.5 mL centrifuge tube. After homogeneously mixing by vortex, the cells were centrifuged at 6000 g for 20 min at 4° C. 200 μL of supernatants were taken and the pH was adjusted to neutral with 4 M KOH.

Cells in a non-transfected well and cells in a transfected well were additionally taken. RIPA lysis buffer containing a protease inhibitor and a phosphatase inhibitor was added. The cells were collected for a WB test for transfection verification.

1.2 cGMP Content Determination

After formulating a cGMP standard in the concentration range of 30-0.23 pmol/mL (2-fold gradient dilution), samples were added according to the table below and incubated at 4° C. for 18 h.

| Sample name | ELISA Buffer | Standard/sample | Tracer | Antiserum |
|---|---|---|---|---|
| NSB | 100 µL | — | 50 µL | — |
| B₀ | 50 µL | — | 50 µL | 50 µL |
| Standard/sample | — | 50 µL | 50 µL | 50 µL |

The plate was washed thoroughly 5 times, then 200 µL of Ellman's Reagent was added to each well. The plate was sealed, shaken in the dark, and color-developed for 60 min, and then detected for absorbance value at 412 nm.

1.3 cGMP Content Determination

Firstly, the non-specific binding (the reading of each well minus the reading of the NSB well) was subtracted, and then $B/B_0$ was calculated, that is, the ratio of the binding of the sample or standard to the maximum binding, and converted according to the following formula, and then the obtained logit(B/B0) and lg (compound concentration) were subjected to linear regression analysis to obtain a standard curve.

$$\text{logit}(B/B0) = \ln[B/B0/(1-B/B0)]$$

The $B/B_0$ value of the sample was converted to the logit(B/B0) value, and the cGMP content in the sample was calculated according to the standard curve.

2. Validation of Transfection Using Western Blotting (WB)

A western blotting method was used to detect the expression of a plasmid Flag tag protein, and expression means successful transfection. The test results are shown in FIG. 1.

In FIG. 1, the upper left-hand diagram means verification of transfection by western blotting. The symbol N represents untransfected HEK293T cells; and T represents HEK293T cells co-transfected with hNPR and hPDE9A.

As shown in FIG. 1, in HEK293T constructed cells co-transfected with human NPR1 and PDE9, ANF can significantly induce the expression of intracellular cGMP. The compound of the present invention can significantly increase ANF-mediated cGMP level by inhibiting PDE9 at the cellular level, and has relatively good application potential in the treatment of heart failure.

Experimental Example 3. Test of the Effect of the Compound of the Present Invention on cGMP Content in RNCM Test substances: For the structure of compound 102 in the present invention, refer to the structure of compound No. 102 in Table 1 herein.

Abbreviations
ANF Atrial natriuretic factor
cGMP 3,5-Cyclic guanosine monophosphate
ELISA Enzyme-linked immunosorbent assay
RNCM Primary cardiomyocytes of neonatal rats
Reagents and Consumables:
1. Experimental Instruments and Reagents

| Name | Source |
|---|---|
| cGMP ELISA Kit (Cyclic GMP ELISA Kit) | Cayman |
| Atrial natriuretic factor (1-28) (rat) | TOCRIS |
| Multi-mode microplate reader | PerkinElmer |
| Gelatin | Aladdin |
| Nocodazole | Sigma |
| L-glutamine | Aladdin |
| Low-sugar DMEM | BI |

-continued

| Name | Source |
|---|---|
| M199 medium | BI |
| Fetal bovine serum | Gibco |
| Horse serum | Gibco |
| Double antibiotics | BI |
| Type II collagenase | Worthington |
| Thermostatic oscillator | Changzhou Langyue Co., Ltd. |

2. Preparation of Primary Cardiomyocytes of SD Neonatal Rats 2.1 Reagent Preparation 2.1.1 1% Gelatin Solution 1% Gelatin is used to coat culture dishes when culturing primary cardiomyocytes of neonatal rats. 1 g of gelatin was weighed, dissolved in 100 mL of deionized water, and diluted to a concentration of 0.2% before use;

2.1.2 Mitotic Inhibitor 10 mM nocodazole DMSO solution was taken and diluted with DMSO to 1 mM to obtain a 20000× solution, which was diluted with culture medium to a final concentration of 1× when used;

2.1.3 L-Glutamine 2.92 g of L-glutamine was taken and dissolved in 100 mL of deionized water to obtain a 200 mM solution;

2.1.4 Primary Cardiomyocyte Culture Solution of Neonatal Rats 150 mL of low-sugar DMEM medium, 50 mL of M199 medium, 10 mL of Gibco fetal bovine serum, 20 mL of horse serum, 2 mL of L-glutamine, 2.34 mL of double antibiotics were taken, and filtered after formulating;

2.1.5 10×ADS buffer 6.8 g of NaCl, 120 mg of $Na_2HPO_4 \cdot 2H_2O$, 400 mg of KCl, 197 mg of $MgSO_4 \cdot 7H_2O$, 1 g of glucose, and 4.8 g of Hepes were weighed and dissolved with 90 mL of deionized water. The pH was adjusted to 7.4, and then the mixture was diluted to 100 mL for later use, and diluted to 1× when used.

2.2 Culture and Extraction of Primary Cardiomyocytes of Neonatal Rats 2.2.1 The hearts of newborn neonatal rats (2-5 days) of SD rats was taken and placed in pre-chilled 1×ADS buffer;

2.2.2 the atrium was cut off firstly, then the blood vessel tissue outside the heart was peeled off, and finally the ventricle was gently cut and then sheared a few times;

2.2.3 1.5 ml of EP tube was taken and added with 900 µL 1×ADS buffer, then 3-5 neonatal rat ventricles were added to the EP tube, and then 10 µL 100×II collagenase was added;

2.2.4 digestion was performed in a thermostatic oscillator at 37° C. and 1100 rpm for 15 min, and the digestion solution was taken and then 1 mL of cardiomyocyte culture solution was added;

2.2.5 after neutralization, centrifugation was performed at 1500 g for 5 min, the supernatant was discarded and 2 mL of cardiomyocyte culture solution was added;

2.2.6 shaking, digestion and centrifugation were repeated twice to obtain 6 mL of primary cardiomyocyte suspension (digested three times in total);

2.2.7 6 mL of the primary cardiomyocyte suspension was transferred to a 50 mL centrifuge tube, then cell culture solution was added and mixed homogeneously, wherein on average, there was 10 mL of cell culture solution for every 10 neonatal rat hearts;

2.2.8 10 mL of the primary cardiomyocyte suspension was added to a culture dish and placed in a cell incubator for normal culture;

2.2.9 after 45 min, the cell culture solution was carefully taken and added to a new culture dish for normal culture;

2.2.10 after 45 min, the cell culture solution was carefully taken and centrifuged at 1500 g for 5 min to obtain primary cardiomyocytes; 2.2.11 the culture plate was coated with 0.2% gelatin and placed in an incubator for at least 30 min;

2.2.12 after resuspension, trypan blue staining method was used for counting, $1 \times 10^6$ cells were added to each well of the 6-well plates, and the mitotic inhibitor nocodazole was added at a ratio of 1:20000; 2.2.13 the cells were plated on a culture plate which had coated with 0.2% gelatin for 30 min, cultured for 3 h and then replaced with a normal cardiomyocyte culture solution;

2.2.14 and the cells were observed on the next day, it can be found that the primary cardiomyocytes showed a rhythmic beat, which was stored for subsequent detection.

Experimental Method:

1. Preparation of a Culture Plate Containing the Compound 50 mM solution of the compound in DMSO was taken, firstly diluted with DMSO to a series of gradient concentrations of solutions of the compound of 30 mM, 10 mM, 3.3 mM, 1.1 mM and 0.37 mM, and then diluted to a series of gradient concentrations of solutions of the compound of 3 mM, 1 mM, 333 µM, 111 µM and 37 µM (100×working solution) with medium.

2. Experimental Steps

According to the above-mentioned method, the primary cardiomyocytes of SD neonatal rats (RNCM) were extracted and plated in a 6-well plate. After RNCM adhered on the wall, stretched and beat, RNCM were starved for 24 hours. The medium was replaced with a fresh complete medium (1 mL/well) before administration. 10 µL of 100×working solution of different concentrations of the compound was added to each well to obtain a series of gradient concentrations of solutions of the compound of 30 µM, 10 µM, 3.33 µM, 1.11 µM, and 0.37 µM (final concentration). After administration and incubation for 30 mM, ANF was added to a final concentration of 1 µM. After further co-incubation for 30 mM, the cells in each well were collected.

3. cGMP Content Detection (Refer to cGMP ELISA Kit Instructions for Operation)

3.1 Cell Collection

The medium was aspirated from each well. The cells were washed once with PBS, and 250 µL of 0.5 M perchloric acid was added.

The cells were collected with a cell scraper, and transferred into a 1.5 mL centrifuge tube. After homogeneously mixing by vortex the cells were centrifuged at 6000 g for 20 mM at 4° C. 200 µL of supernatants were taken and the pH was adjusted to neutral with 4 M KOH.

Cells in a non-transfected well and cells in a transfected well were additionally taken. RIPA lysis buffer containing a protease inhibitor and a phosphatase inhibitor was added. The cells were collected for a WB test for transfection verification.

3.2 cGMP Content Determination

After formulating a cGMP standard in the concentration range of 30-0.23 pmol/mL (2-fold gradient dilution), samples were added according to the table below and incubated at 4° C. for 18 h.

| Sample name | Reagent name | | | |
| --- | --- | --- | --- | --- |
| | ELISA Buffer | Standard/sample | Tracer | Antiserum |
| NSB | 100 µL | — | 50 µL | — |
| B$_0$ | 50 µL | — | 50 µL | 50 µL |
| Standard/sample | — | 50 µL | 50 µL | 50 µL |

The plate was washed thoroughly 5 times, then 200 µL of Ellman's Reagent was added to each well. The plate was sealed, shaken in the dark, color-developed for 60 min, and then detected for absorbance value at 412 nm.

3.3 cGMP Content Determination

Firstly, the non-specific binding (the reading of each well minus the reading of the NSB well) was subtracted, and then B/B0 was calculated, that is, the ratio of the binding of the sample or standard to the maximum binding, and converted according to the following formula, and then the obtained logit(B/B0) and lg (compound concentration) were subjected to linear regression analysis to obtain a standard curve.

$$\text{logit}:(B/B0)=\ln[B/B0/(1-B/B0)]$$

The B/B$_0$ value of the sample was converted to the logit(B/B$_0$) value, and the cGMP content in the sample was calculated according to the standard curve.

Figure 2:
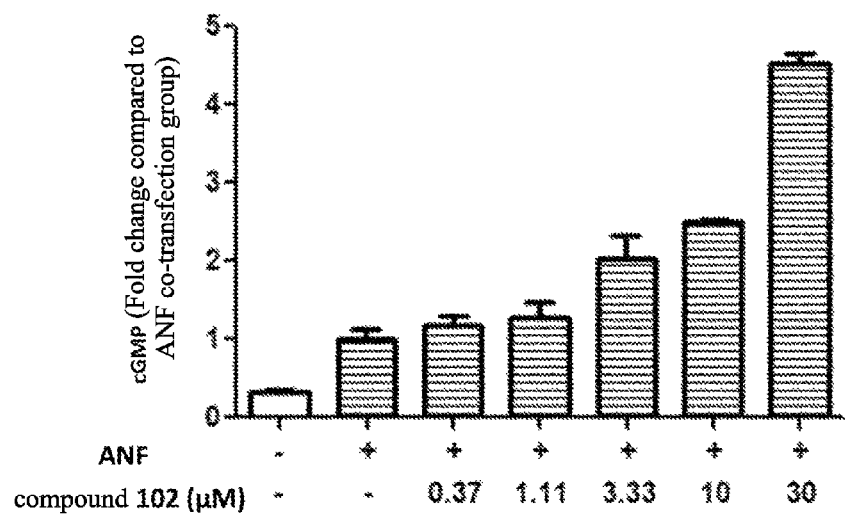
FIG. 2 Effect of compound 102 on cGMP in primary cardiomyocytes of neonatal rats stimulated by atrial natriuretic factor FIG. 3 Effect of the compound on left ventricular ejection fraction in rats with heart failure FIG. 4 Effect of the compound on fractional shortening in rats with heart failure FIG. 5 Effect of the compound on left ventricular systolic volume in rats with heart failure FIG. 6 Effect of the compound on left ventricular diastolic volume in rats with heart failure FIG. 7 Effect of the compound on HR in rats with heart failure FIG. 8 Fibrosis staining of the peri-infarction zone of hearts of rats in various groups

The test results are as shown in FIG. 2:

As shown in FIG. 2, ANF can significantly induce the expression of cGMP in primary cardiomyocytes of neonatal rats, and the compound of the present invention can increase the level of cGMP by inhibiting PDE9 in primary cardiomyocytes of rats. This indicates that the compound of the present invention has the ability to increase myocardial cGMP and has a relatively good clinical application potential in the treatment of heart failure.

Experimental Example 4: Heart Failure Models of Rats Induced by Coronary Artery Ligation In the abbreviation used herein, "bid" refers to dosing twice daily; "LVEF" refers to left ventricular ejection fraction; "EDV" refers to left ventricular end-diastolic volume; "ESV" refers to left ventricular end-systolic volume; "DMSO" refers to dimethyl sulfoxide; "MC" refers to methyl cellulose; "p.o" refers to oral administration; "mpk" refers to mg/kg; "SD" refers to Sprague-Dawley rats. "S.E.M" refers to standard error. "PEG400" refers to polyethylene glycol 400; "captisol" refers to sulfobutyl-beta cyclodextrin. "FS" refers to left ventricular fractional shortening; "HR" refers to heart rate.

Instruments

Small animal ventilator

Powerlab 8/35 signal acquisition processing system;

Millar catheter

Vevo small animal ultrasound imaging system

Analytical balance;

Test Medicaments

Compound 102, dosage of administration 30 mg/kg, vehicle for administration 5% DMSO+10% PEG400+85% (20% Captisol+0.5% MC in water)

Experimental Animals

Sprague Dawley rats (SD rats), male, weight of about 220 g during modeling.

Experimental Method

Before operation, the animals were anesthetized by intraperitoneal injection of sodium pentobarbital injection, and atropine was injected intraperitoneally to eliminate phlegm. After the rat was anesthetized and fixed in supine position, a ventilator was used for assisted breathing, the chest was opened between the third and fourth ribs, and the left anterior descending coronary artery was ligated with a 5-0 suture needle. After the ligation was completed, the chest cavity was closed, the skin was sutured, and the rats were put in an insulation blanket for recovery. The same operation was performed on the sham group, except for the silk ligature operation. After the operation, the rats were subjected to intramuscular injection of meloxicam for pain relief, intraperitoneal injection of gentamicin sulfate injection for eliminating infection, and intraperitoneal injection of lidocaine for preventing ventricular fibrillation. One week after the animals recovered from surgery, the model rats were divided into a model group and a therapeutic drug group (compound 102 group), and the vehicle and compound 102 were administered by gavage, respectively, twice a day for four consecutive weeks. During the experiment, the living status of the animals were observed and abnormal conditions were recorded to evaluate the safety of the compound; and administration was performed for 28 days. The animals were anesthetized by intraperitoneal injection of sodium pentobarbital on the second day after the last administration, and echocardiographic detection and hemodynamic detection were performed to evaluate the effect of the compound on cardiac systolic function and ventricular volume. After the end of the experiment, end point treatment was performed, and the heart was taken for material collection for subsequent related researches on cGMP and protein expression.

One week after the animals recovered from surgery, the rats were anesthetized with isoflurane, and a small animal ultrasound imaging system Vevo was used to examine the left ventricular function of the model rats. The model was considered successful if the LVEF % was reduced by 30%. Except for the sham group, the animals were randomly divided into 2 groups according to LVEF % and body weight. The number of animals in each group and the method of administration were as follows:

At the end of the experiment, rats were sacrificed and the infarct heart tissue was fixed with 4% formaldehyde, dehydrated, embedded in paraffin, and sectioned. Collagen deposition status was observed under a microscope by means of using Sirius red staining, and the Leica aperio digital slice scanning system was used for scanning analysis.

Detection Indexes

The main evaluation indexes are LVEF % (left ventricular ejection fraction), FS (left ventricular fractional shortening), ESV (left ventricular end-systolic volume), EDV (left ventricular end-diastolic volume), and heart rate (HR). At the end of the experiment, the proportion of Sirius red in peri-infarction zone was quantified to evaluate the collagen deposition status.

Data Statistics

The data was represented by Mean±S.E.M, and Graphpad Prism 5.0 was used for statistical mapping. Statistical analysis was performed with T-test. $P<0.05$ indicates that the difference is statistically significant.

Research Results:

After 28 days of continuous administration by bid at 30 mpk, the rats are in good status. Compared with the sham group, there is no abnormality with respect to weight, indicating that the compound is relatively safe.

Figure 3:
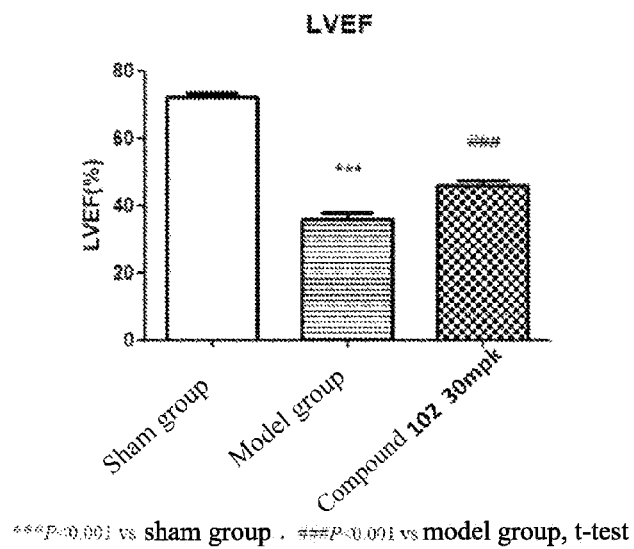
Figure 4:
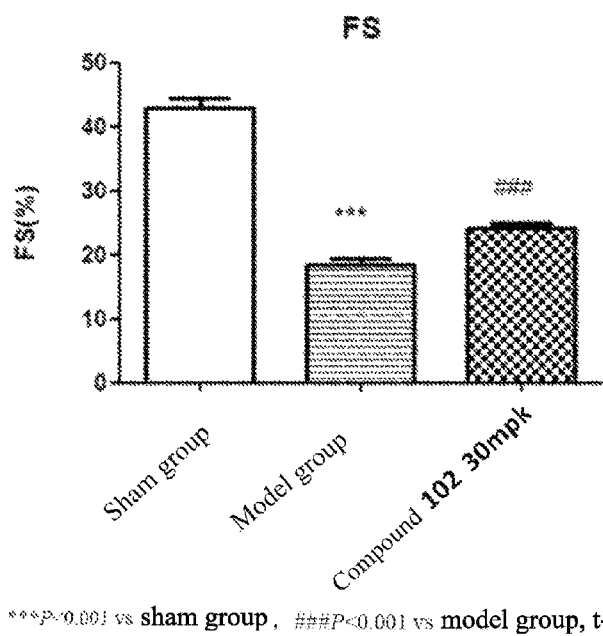
Figure 5:
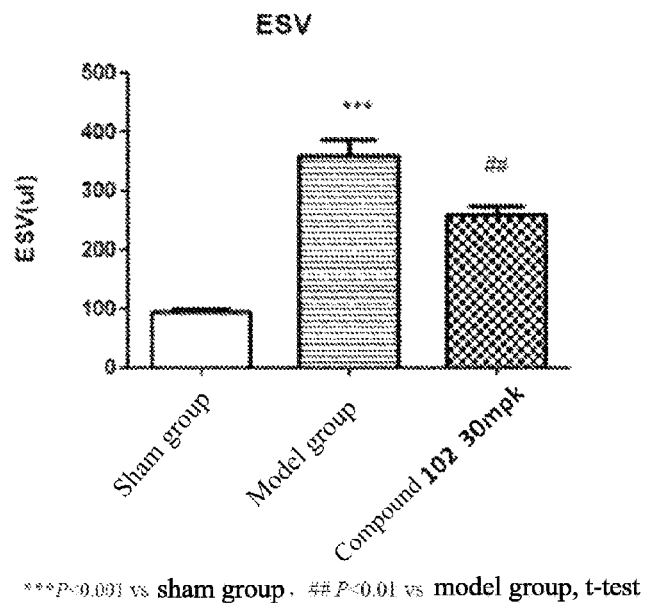
Figure 6:
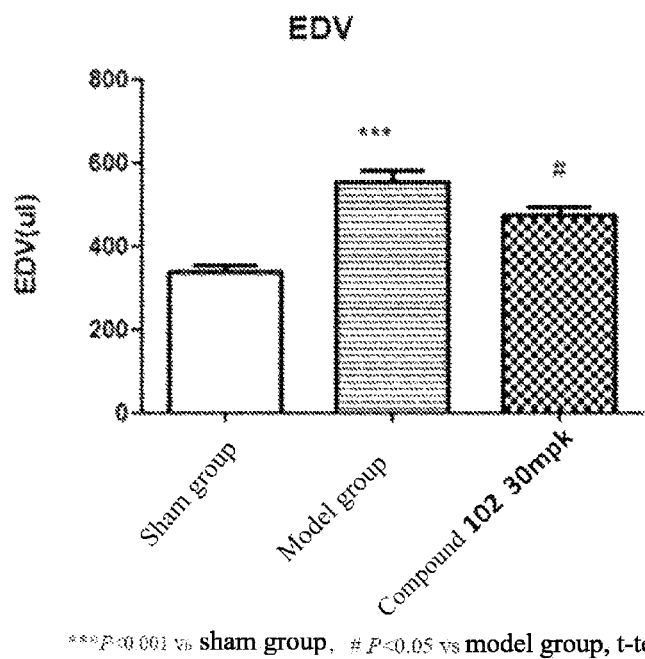

It can be seen from FIGS. 3-4 that LVEF and FS of the model group rats were 36.0±1.86% and 18.3±1.03%, respectively, which are significantly lower than those of the sham group of 72.2±1.40% and 43.0±1.29%, which is statistically significant ($P<0.001$). It can be seen from FIGS. 5-6 that compared with rats in the sham group, EDV and ESV of the heart of the model group rats are significantly increased, which is statistically significant ($P<0.001$). Therefore, the left ventricular systolic function in the model group was significantly reduced, and the myocardial remodeling changed significantly, indicating that the model is successfully established. Compound 102 can improve the reduction of LVEF and FS in rats with heart failure, which has a significant statistical difference compared with the model group ($P<0.001$). At the same time, compound 102 has a significant improvement effect on the increase of cardiac EDV and ESV caused by heart failure ($P<0.05$, $P<0.01$). Therefore, the compound can significantly improve the contractile function and myocardial remodeling in rats with heart failure.

| Group number | Grouping | Number of animals | Dosage of administration | Mode of administration | Administration time |
|---|---|---|---|---|---|
| 1 | Sham group (Sham) | 10 | — | p.o bid | Starting one week after modeling and lasting for four weeks |
| 2 | Model group (Model) | 12 | — | p.o bid | Starting one week after modeling and lasting for four weeks |
| 3 | Compound 102 group | 12 | 30 mpk | p.o bid | Starting one week after modeling and lasting for four weeks |

Figure 7:
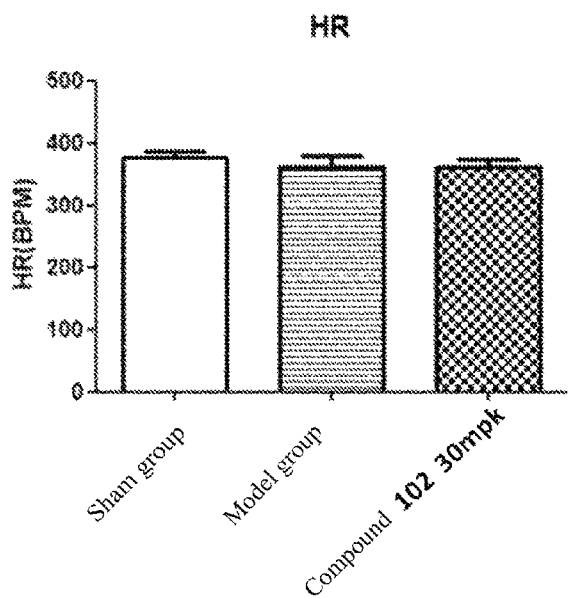

It can be seen from FIG. 7 that compared with the rats in the sham group, no changes in heart rate are observed in the model group and the compound administration group.

TABLE 3

Effects of compounds on cardiac fibrosis in rats with heart failure (Mean ± S.E.M)

| Groups | Dosage | Amount | Percentage (%) of collagen deposition in the peri-infarction zone |
|---|---|---|---|
| Sham | — | 10 | 0.121 ± 0.017 |
| Model group | — | 12 | 28.9 ± 1.35*** |
| Compound 102 | 30 mpk | 12 | 21.5 ± 1.234### |

***P<0.001 vs Sham,
P< 0.001 vs model group, t-test

Figure 8:
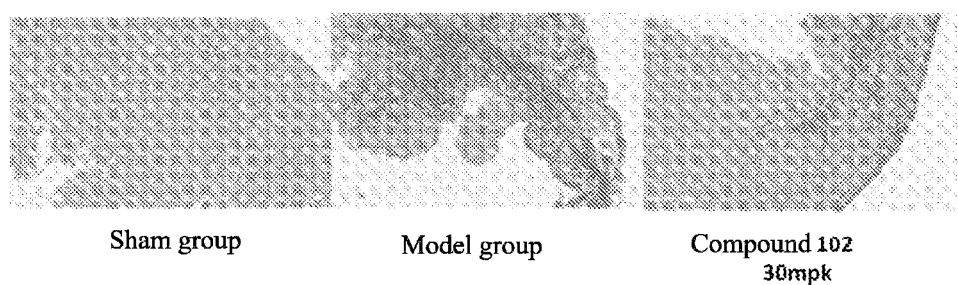

As shown in FIG. 8 and Table 3, the percentage of collagen deposition in the sham group is 0.121±0.017%, while the percentage of collagen deposition in the peri-infarction zone of left ventricular of the model group rats is 28.9±1.35%, which is significantly higher than that in the sham group. The statistical difference is extremely significant (P<0.001). It can be seen that, in the model group, myocardial infarction leads to collagen deposition in the peri-infarction zone, thereby leading to cardiac fibrosis. Compared with the model group, compound 102 can significantly reduce the collagen deposition in the peri-infarction zone (P<0.001), thereby effectively improving cardiac fibrosis caused by the heart failure model.

Conclusion: In summary, compound 102 can improve the heart function of rats with heart failure, reverse myocardial remodeling caused by heart failure, and reduce fibrosis in the peri-infarction zone, thereby having excellent clinical application potential in the treatment of heart failure.

The invention claimed is:

1. A method for treating heart failure diseases in mammals, comprising administering a phosphodiesterase 9 (PDE9) inhibitor compound represented by general formula (I) or pharmaceutically acceptable salts, isomers, and deuterated compounds thereof,

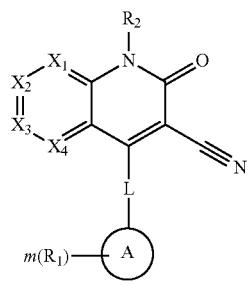

(I)

wherein $X_1$ and $X_4$ are each CH, $X_2$ is N, and $X_3$ is $CR_3$;
$R_3$ at each occurrence is independently selected from hydrogen, deuterium, hydroxyl, amino, carboxyl, cyano, nitro, halogen, $C_{1-6}$ alkyl, $C_{1-6}$ alkoxy, $C_{1-6}$ alkylcarbonyl, wherein the $C_{1-6}$ alkyl is not substituted or optionally substituted with one or more hydroxyl;
L is a bond;
ring A is 3-12 membered heterocyclyl wherein the heteroatom of the 3-12 membered heterocyclyl is selected from one of O, S, and N or any combination thereof;
each $R_1$ is independently selected from hydrogen, deuterium, $C_{1-6}$ alkyl, $C_{1-6}$ alkoxy;
m is 0, 1, 2 or 3; and
$R_2$ is hydrogen.

2. A method for treating heart failure diseases in mammals, comprising administering a phosphodiesterase 9 (PDE9) inhibitor compound selected from the following group consisting of the compounds and pharmaceutically acceptable salts, isomers and deuterated compounds thereof:

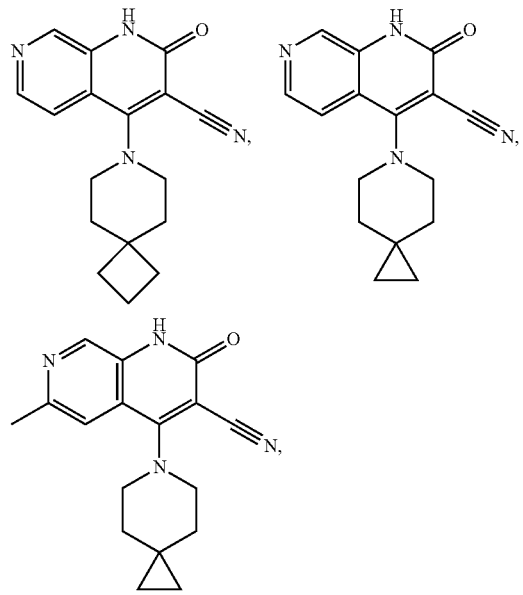

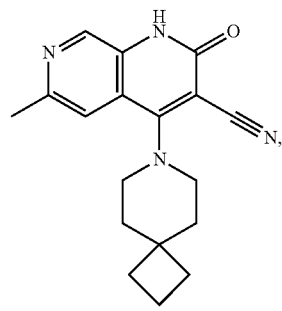

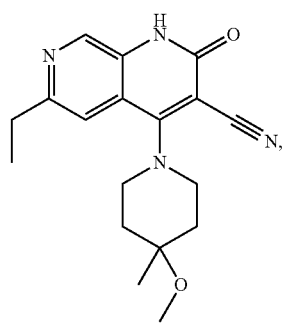

107
-continued
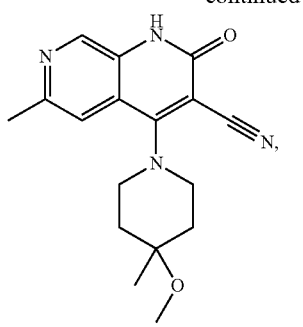
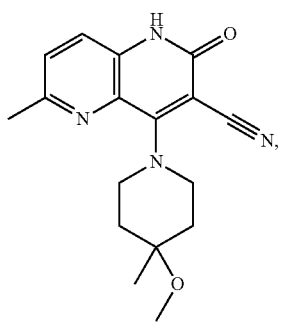
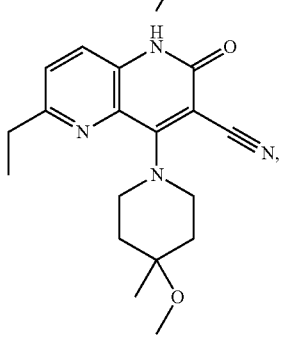
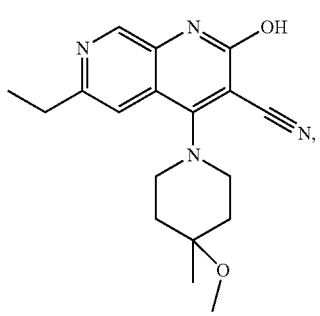
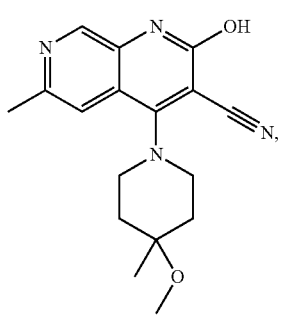
108
-continued
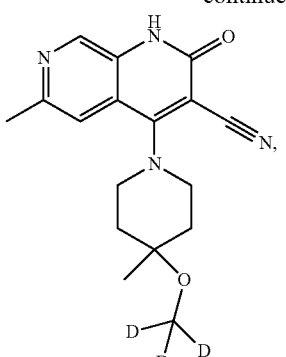
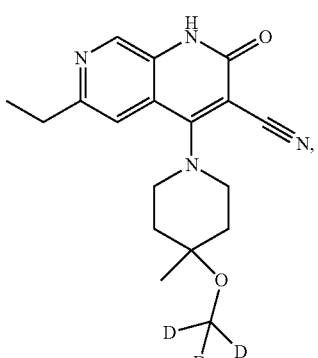
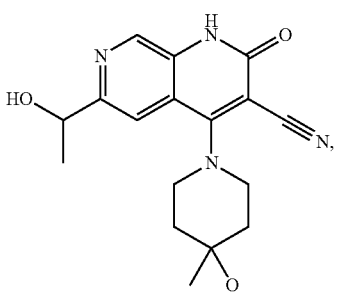
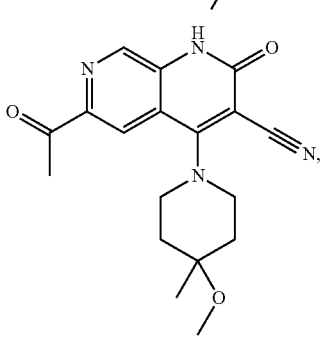
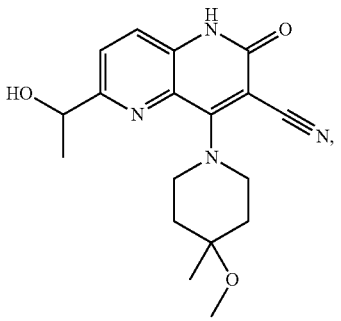

-continued

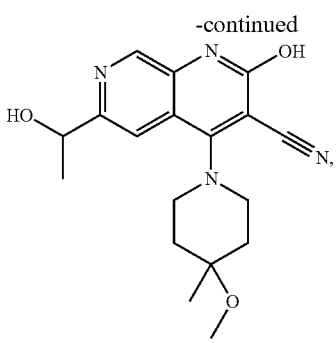

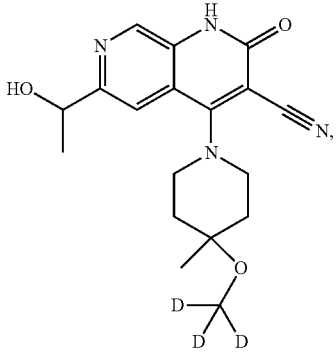

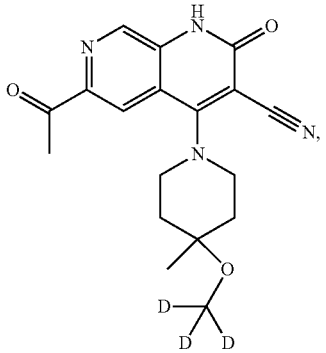

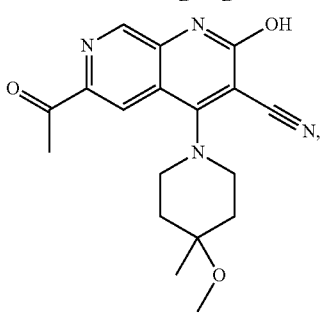

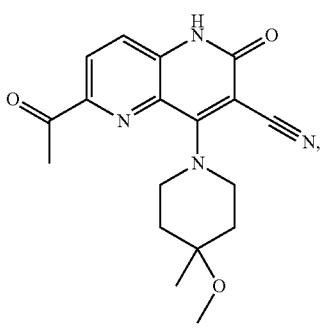

-continued

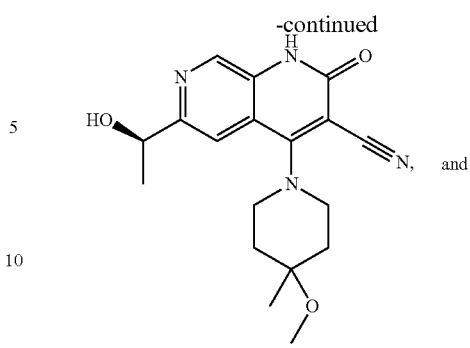

and

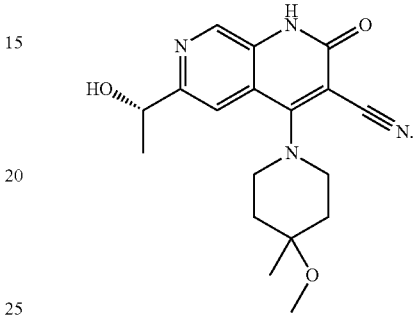

3. The method according to claim 1, wherein the PDE9 inhibitor compound is administered with a second or more therapeutic agents.

4. The method according to claim 1, wherein the PDE9 inhibitor compound is prepared into any pharmaceutically acceptable pharmaceutical preparation with a pharmaceutically acceptable carrier.

5. The method according to claim 1, wherein the PDE9 inhibitor compound is administered to patients or subjects in need of treatment through oral, parenteral, transdermal, rectal, nasal, pulmonary, implantation, or topical administration.

6. The method according to claim 1, wherein the heart failure diseases are selected from the group consisting of left heart failure, right heart failure, and whole heart failure; acute heart failure, chronic heart failure, and decompensated heart failure; systolic and diastolic heart failure; pre-heart failure, pre-clinical heart failure, clinical heart failure and refractory end-stage heart failure; grade I, grade II, grade III, and grade IV heart failure according to heart function by the New York Heart Association (NYHA); and heart failure with reduced left ventricular ejection fraction, heart failure with median left ventricular ejection fraction, and heart failure with preserved left ventricular ejection fraction.

7. The method according to claim 1, wherein the heart failure diseases are selected from the group consisting of heart failure caused by ischemic heart disease, heart failure caused by toxic damage, immune-mediated heart failure and heart failure caused by inflammatory damage, heart failure caused by infiltrative lesion, heart failure caused by metabolic disorder, heart failure caused by genetic abnormality, heart failure caused by abnormal load, and heart failure caused by arrhythmia.

8. The method according to claim 1, wherein the mammals are humans and animals.

9. The method according to claim 1, wherein the compound represented by the general formula (I) and pharmaceutically acceptable salts, isomers and deuterated compounds thereof exert effects in treating heart failure by means of inhibiting the activity of PDE9, and increasing the level of cyclic guanosine monophosphate.

10. The method according to claim 1, wherein the compound represented by the general formula (I) and pharmaceutically acceptable salts, isomers and deuterated compounds thereof exert effects in treating heart failure by means of improving the heart function of patients or subjects with heart failure and reversing the myocardial remodeling of patients or subjects with heart failure.

* * * * *